(12) United States Patent
Garcia Sanchez et al.

(10) Patent No.: US 11,750,864 B2
(45) Date of Patent: Sep. 5, 2023

(54) METHODS AND APPARATUSES FOR INGESTING ONE OR MORE MEDIA ASSETS ACROSS A VIDEO PLATFORM

(71) Applicant: YERBA BUENA VR, INC., San Jose, CA (US)

(72) Inventors: Victor Ernesto Garcia Sanchez, Madrid (ES); Sebastian Amengual Galdon, San Jose, CA (US)

(73) Assignee: YERBA BUENA VR, INC., San Jose, CA (US)

( * ) Notice: Subject to any disclaimer, the term of this patent is extended or adjusted under 35 U.S.C. 154(b) by 0 days.

(21) Appl. No.: 17/650,410

(22) Filed: Feb. 9, 2022

(65) Prior Publication Data

US 2022/0167032 A1    May 26, 2022

Related U.S. Application Data

(63) Continuation of application No. 17/123,910, filed on Dec. 16, 2020, now Pat. No. 11,284,141.

(Continued)

(51) Int. Cl.
*H04N 21/242* (2011.01)
*H04N 21/845* (2011.01)
(Continued)

(52) U.S. Cl.
CPC ..... *H04N 21/242* (2013.01); *H04N 21/21805* (2013.01); *H04N 21/241* (2013.01); *H04N 21/2407* (2013.01); *H04N 21/8146* (2013.01); *H04N 21/8456* (2013.01); *H04N 21/8547* (2013.01); *H04N 23/60* (2023.01)

(58) Field of Classification Search
CPC .......... H04N 21/8456; H04N 21/4622; H04N 21/84; H04N 21/6125; H04N 21/8543; H04N 21/43072; H04N 21/812; H04N 21/4821; H04N 21/8586
See application file for complete search history.

(56) References Cited

U.S. PATENT DOCUMENTS

| | | | |
|---|---|---|---|
| 7,671,893 B2 | 3/2010 | Li et al. | |
| 9,839,844 B2 | 12/2017 | Dunstan et al. | |

(Continued)

FOREIGN PATENT DOCUMENTS

| | | |
|---|---|---|
| EP | 2894852 A1 | 7/2015 |
| WO | 2016191694 A1 | 12/2016 |

(Continued)

OTHER PUBLICATIONS

Carlsson, et al., Optimized Adaptive Streaming of Multi-video Stream Bundles, IEEE Transactions on Multimedia, 2017.

(Continued)

*Primary Examiner* — Samira Monshi
(74) *Attorney, Agent, or Firm* — BUCHALTER; Cecily Anne O'Regan

(57) ABSTRACT

The disclosure relates to creating and consuming video-centric experiences with additional interactivity and immersion capabilities. The process involves receiving multiple video and media signals, ensuring their synchronization, uploading them to processing engines, enabling manual and autopilot-driven camera changes, and presenting them in immersive and non-immersive devices.

18 Claims, 42 Drawing Sheets

Related U.S. Application Data

(60) Provisional application No. 62/949,775, filed on Dec. 18, 2019.

(51) Int. Cl.
| | |
|---|---|
| *H04N 21/8547* | (2011.01) |
| *H04N 21/24* | (2011.01) |
| *H04N 21/241* | (2011.01) |
| *H04N 21/81* | (2011.01) |
| *H04N 21/218* | (2011.01) |
| *H04N 23/60* | (2023.01) |

(56) References Cited

U.S. PATENT DOCUMENTS

| | | | |
|---|---|---|---|
| 10,979,663 | B2 | 4/2021 | Amengual et al. |
| 11,284,141 | B2 | 3/2022 | Garcia-Sanchez |
| 2006/0023073 | A1 | 2/2006 | Li et al. |
| 2014/0373081 | A1 | 12/2014 | Dodson et al. |
| 2015/0019670 | A1 | 1/2015 | Redmann |
| 2015/0124171 | A1 | 5/2015 | King |
| 2015/0184416 | A1 | 7/2015 | Cochran et al. |
| 2015/0346812 | A1 | 12/2015 | Cole et al. |
| 2016/0012855 | A1 | 1/2016 | Krishnan |
| 2016/0165309 | A1 | 6/2016 | Brandenburg et al. |
| 2016/0241837 | A1 | 8/2016 | Cole et al. |
| 2016/0353146 | A1 | 12/2016 | Weaver et al. |
| 2017/0006314 | A1* | 1/2017 | Danovitz .............. G06F 16/152 |
| 2017/0078447 | A1 | 3/2017 | Hancock et al. |
| 2017/0285738 | A1 | 10/2017 | Khalid |
| 2018/0007422 | A1 | 1/2018 | Castleman |
| 2018/0176621 | A1 | 6/2018 | Grubbs et al. |
| 2018/0255332 | A1 | 9/2018 | Heusser |
| 2018/0288363 | A1 | 10/2018 | Amengual et al. |
| 2019/0028691 | A1 | 1/2019 | Hinds et al. |
| 2019/0179407 | A1 | 6/2019 | Ziegler et al. |
| 2019/0182554 | A1 | 6/2019 | Schupak et al. |
| 2021/0195263 | A1 | 6/2021 | Garcia Sanchez et al. |

FOREIGN PATENT DOCUMENTS

| | | |
|---|---|---|
| WO | 2017205648 A1 | 11/2017 |
| WO | 2018183257 A1 | 10/2018 |
| WO | 2021127090 A1 | 6/2021 |

OTHER PUBLICATIONS

Mavlankar et al. "An Interactive Region-of-Interest Video Streaming System for Online Lecture Viewing" Proc. 2010 18th International Packet Video Workshop, pp. 64-71 (2010).

Mavlankar et al. "Peer-to-Peer Multicast Live Video Streaming with Interactive Virtual Pan/Tilt/Zoom Functionality" 15th IEEE Int'l Conf. on Image Processing, pp. 2296-2299 (2008).

Vaishnavi, et al. From IPTV to Synchronous shared experiences challenges in Designs, Signal Processing Image Communications 26:370-377 (2011).

YBVR Press Release, Transforming Video VR in an Interactive experience, Nov. 14, 2019.

\* cited by examiner

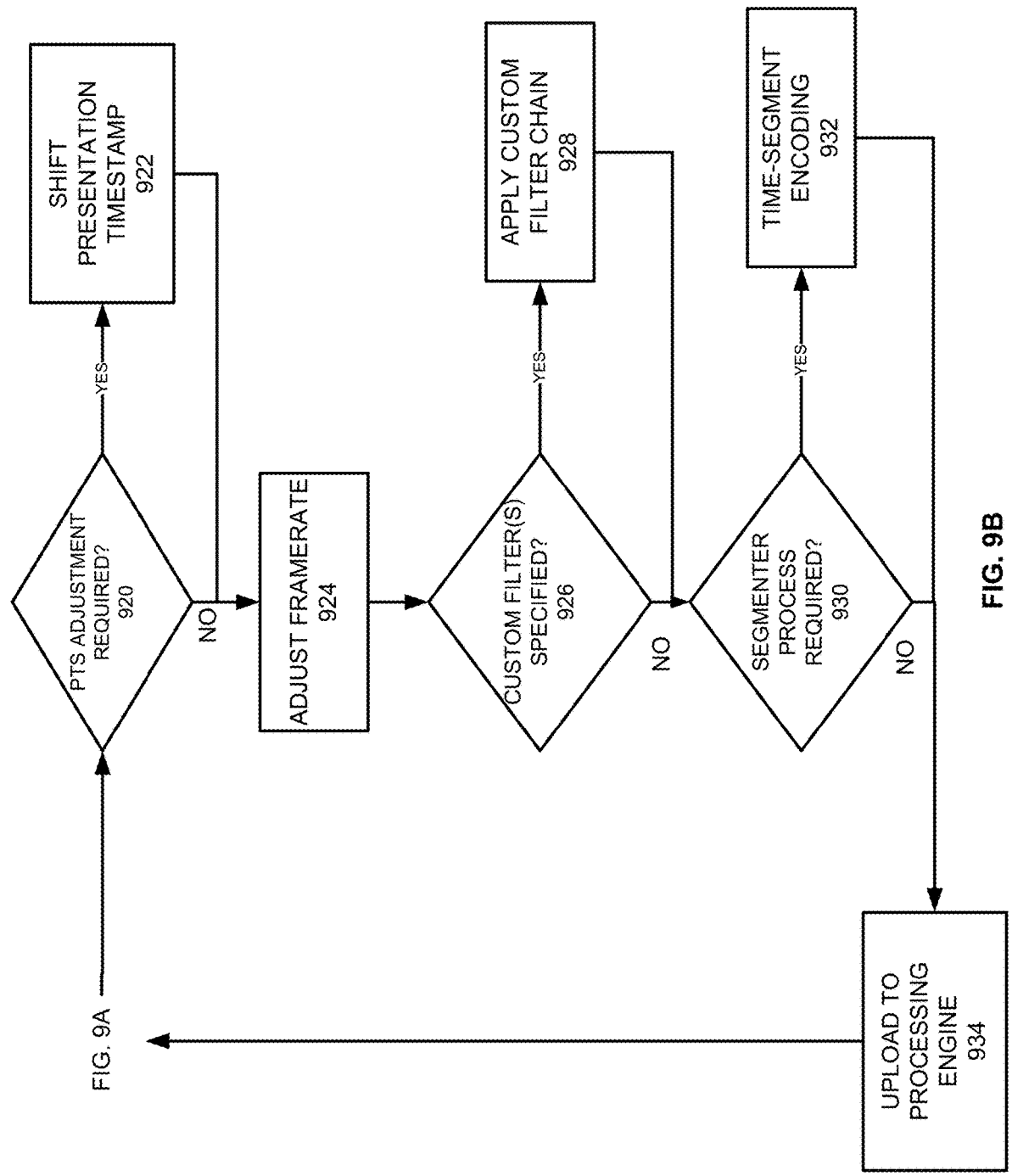

```
"media":{
    "mainVideo":{
        id:"main-video",
        "name": "Main Video Experience",
        "endpoint":"https://protect-us.mimecast.com/s/QrfvCXDMwqCXr8A7tm-cDZ?domain=url.to"
        viewports:[
        [... collection of viewports ...]
            {
                "yaw": "xx",
                "pitch": "yy",
                "roll": "zz",
                "representations": [
                    {"id": "n-m"}
                ]
            }
        ],
        "cameras":[
            [... collection of cameras ...]
            {
                "name": "Main Camera - center stage",
                "id": "cam-x",
                "viewportRange": "xxx-yyy",
                "geometries": "geo-a,geo-b,geo-c"
            }
        ]
    },
```

FIG. 14

```
"media":{
    "mainVideo": {
    [+]   (FIG. 14)
    "otherMedia":[
        {
            id:"media-1",
            "name": "Highlights 1st Quarter",
            mediaType:"altVideo"
            "renderPaths":[
                {
                    "endpoint":"https://protect-us.mimecast.com/s/OuLICYEMxrtLBnYoFZigcV?domain=url.to",
                    "renderType":"video",
                    "rotation":{
                        "x": 90,"y": 0, "z": 0
                    }
                }
            ]
        },
```

FIG. 15

```
"media":{
  [+]  "mainVideo": {
  (FIG. 14)
       "otherMedia": [
  [+]  {
  (FIG. 15)
       id:"media-10",
       "name": "Main Score",
       mediaType:"dynamicScore"
       "renderPaths":[
            {
            "journalEndpoint":"https://protect-us.mimecast.com/s/
KgMzCZ6WyvS5BkvnhX1E2h?domain=url.to",
            "socketEndpoint":"https://protect-us.mimecast.com/s/Vo1WC1w9qEtMWPgwFO_5Tc",
            "timescale":"video-ts"
            "renderType":"dynamicGraphicFeed"
            },
            {
            "endpoint":"https://protect-us.mimecast.com/s/Gg8eC2k9r2UpyBroFLS-
vk?domain=url.to",
            "timescale":"video-ts"
            "renderType":"sprite",
            "updateRateMs":1000,
            "scale": {
                 "x": 0.5, "y": 0.5, "z": 1.0
                 }
            }
       ]
       },
       {

```
id:"media-court",
"name": "Court 3D Model",
mediaType:"3dModel"
"renderPaths":[
    {
        "endpoint":"https://protect-us.mimecast.com/s/mp-AC319vEtpNy3YFpsCvc?domain=url.to",
        "renderType":"fbx-3d"
    },
    {
        "endpoint":"https://protect-us.mimecast.com/s/fW8wC4x9wVCBkDPAC5eFVd?domain=url.to",
        "renderType":"gltf-3d",
        "scale": {
            "x": 0.2,"y": 0.2,"z": 0.2
        }
    },
    {
        "endpoint":"https://protect-us.mimecast.com/s/igMrC5yWxVHZNX8YFViilc?domain=url.to",
        "renderType":"sprite",
        "rotation": {
            "x": 60,"y": 10,"z": 0
        }
    }
]
}
```

©YERBA BUENA VR, INC.

FIG. 16B

```
"timescales":[
    {
        "timescale-id":"video-ts",
        "scale:"ms"
    },
    {
        "timescale-id":"device-epoch",
        "scale:"ms"
    },
    {
        "timescale-id":"experience-timer",
        "scale:"ms"
    },
    {
        "timescale-id":"app-timer",
        "scale:"ms"
    }
],
```

©YERBA BUENA VR, INC.

FIG. 17

```
"autopilot"{
    "journalEndpoint":"http://url-to-autopilot/feed?experience={{[experience-id]}}&program={{[program-id]}}&time={{[timestamp]}}",
    "socketEndpoint":"ws://url-to-autopilot/feed?experience={{[experience-id]}}&program={{[program-id]}}",
    "timescale":"video-ts"
    "programs":[
        {
            "id":"autopilot-1",
            "name":"neutral production",
            enabled:"true"
        },
        {
            "id":"autopilot-2",
            "name":"team A production",
            enabled:"false"
        },
        {
            "id":"autopilot-3",
            "name":"team B production",
            enabled:"true"
        }
    ]
},
```

©YERBA BUENA VR, INC.

FIG. 18

```
"presentation":[
  {
    id:"cameramap-1",
    "enabled": true,
    "sphericalPosition": {
      "radius": "4",
      "horizontalAngle": "-20",
      "verticalAngle": "-2"
    },
    "scale": {
      "x": 1.0,"y": 1.0,"z": 1.0
    },
    "position": {
      "x": "-4","y": "-10","z": "20"
    },
    "rotation": {
      "x": "0","y": "0","z": "0"
    },
    "cameraIDs": "*",
    "lookToCamera": true,
    "isHUD": false,
    "alpha": "1",
    "graphics": [
```

```
},
{
  "id":"mapBackground",
  "media-id": "media-court",
  "alpha": 0.8
},
{
  id:"camx-button-1"
  "media-id": "round-button-icon",
  "enabled": true,
  "position":{
    "x": -0.35, "y": "0", "z": "0"
  },
  "scale": {
    "x": 1.0, "y": 1.0, "z": 1.0
  },
  "rotation":{
    "x": "0", "y": "0", "z": "0"
  },
  "events"[
    {
      "event":"click",
      "action":"camchange",
      args:{
        "cameraId":"cam-x"
      }
    }
  ]
},
```

©YERBA BUENA VR, INC.

FIG. 19B

```
"presentation": [
(FIGS. 19A-B)  {
        "id": "highlight-vid-container",
        "enabled": true,
        "sphericalPosition": {
            "radius": "4",
            "horizontalAngle": "-20",
            "verticalAngle": "-2"
        },
        "scale": {
            "x": 2.0, "y": 2.0, "z": 1.0
        },
        "position": {
            "x": "0", "y": "10", "z": "30"
        },
        "rotation": {
            "x": "0", "y": "0", "z": "0"
        },
        "cameraIDs": "cam-x,cam-y",
        "lookToCamera": true,
        "isHUD": false,
        "timeScale": "[[[timescales.video-ts]]]",
        "alpha": "1",
        "transitions": [
            {
                "on": "show",
                "effect": "fade",
                "effectDetails": [
                    "durationMs": "250"
                ]
            }
        ]
    },
(FIG. 20B)
```

```
"on":"hide",
"effect":"fade",
"effectDetails":[
    "durationMs":"250"
  ]
},
"graphics": [
  {
    id:"highlightvid",
    "timeline": [
      {
        "start": "50000",
        "end": "100000"
      }
    ],
    "media-id": "media-1"
  },
  {
    id:"highlightvidbutton",
    "timeline": [
      {
        "start": "50000",
        "end": "100000"
      }
    ],
    "media-id": "xbutton",
    "alpha": "0.0",
    "transitions":[
      {
```

```
        "on":"parentFocus",
        "effect":"alpha",
        "effectDetails":{
                "alpha":"1.0"
                "durationMs":"300"
        }
    },
    {
        "on":"parentLostFocus",
        "effect":"alpha",
        "effectDetails":{
                "alpha":"0.0"
                "durationMs":"100"
        }
    },
"events":[
    {
        "event":"click",
        "action":"hide",
        "target":"highlight-vid"
    }
    ]
  }
 ]
}
```

FIG. 20C

```
{
  "appearance": {
  },
  "panels": [+],
  "mainPanel": {
    "columns": 3,
    "experiences": [
      {
        "endpoint": "https://path-to-experience1/experience-manifest",
        "name": "Tennis",
        "type": "mono",
        "isDisabled": false,
        "isLive": false,
        "poster": "https://path-to-experience1/poster",
        "description": "R. Federer v R. Nadal",
        "metadata": {
          "duration": "06:00",
          "producers": "YBVR",
          "isHighQuality": true,
          [...more metadata...]
        },
        "sortingIndex": "1"
      },
      [...more videos...]
      {
        "endpoint": "https://path-to-experience2/experience-manifest",
```

```
            "name": "Concert",
            "type": "mono",
            "isDisabled": false,
            "isLive": false,
            "poster": "https://path-to-experience2/poster",
            "description": "MTV unplugged",
            "metadata":{
                     "duration": "06:00",
                     "producers": "YBVR",
                     "isHighQuality": true,
                     [...more metadata...]
            "sortingIndex": "1"
      },
   "sidePanels":
      [{
         "placement":"left",
         "isDisabled":false,
         "experiences":
         [{
            "endpoint": "https://path-to-experience3/experience-manifest",
            "name": "Live Stream",
            "type": "mono",
            "isDisabled":true,
            "isLive": true,
            "poster": "https://path-to-experience3/poster",
            "description":"\nStay tuned for our next live events",
```

FIG. 21B

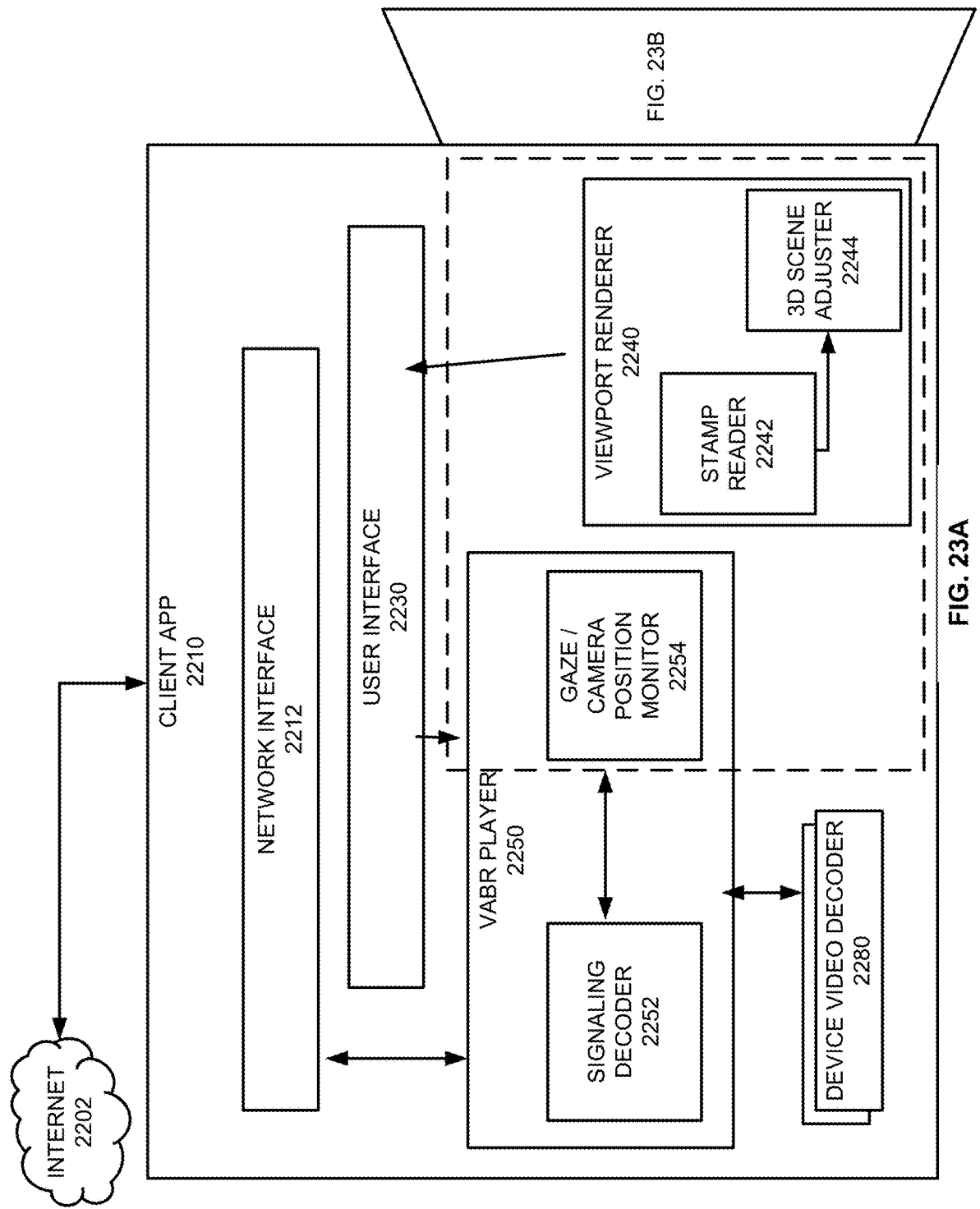

METHODS AND APPARATUSES FOR INGESTING ONE OR MORE MEDIA ASSETS ACROSS A VIDEO PLATFORM

CROSS-REFERENCE

This application is a continuation application of U.S. application Ser. No. 17/123,910 filed Dec. 16, 2020, which claims the benefit of U.S. Provisional Application No. 62/949,775, filed Dec. 18, 2019, entitled Methods and Apparatuses for Producing and Consuming Synchronized, Immersive Interactive Video-Centric Experiences, which applications are incorporated herein in their entirety by reference.

NOTICE OF COPYRIGHTS

A portion of the disclosure of this patent document contains material which is subject to copyright protection. The copyright owner has no objection to the facsimile reproduction of the patent disclosure as it appears in the Patent and Trademark Office patent files or records, but otherwise reserves all copyright rights whatsoever.

BACKGROUND

Advances in the graphics processing and network power of consumer devices allow for much richer types of media to be consumed. High resolution video, dynamic 2D and 3D graphics and network-connected social experiences are only some examples of the different types of media that even portable mobile devices are capable of bringing to the average consumer. The recent addition of devices designed specifically for augmented reality ("AR"), virtual reality ("VR") and mixed reality ("MR") are a new step in the same trend, often taking the foundation of hardware and software already laid out by the mobile and desktop computing equipment to bring yet new dimensions and means of consumption to end users. VR and AR are referred together as extended reality ("XR"). Video-centric experiences continue to be one of the most effective media to produce and consume experiences happening elsewhere, especially, but not limited to, live events. While AR adds digital elements to a live view, often by using the camera on a smartphone, VR provides a completely immersive experience.

As the range of possible means of consumption grows, the tools that exist to enable the creation and consumption of experiences start to show their limitations, either because of a lack of orchestration with each other, or because of the stress the tools put into the existing computing equipment running these experiences. For example, efforts have been taken to improve immersive video quality over streaming quality, but the experience provided by video experiences alone can leave out more interactive elements such as 3D graphics or social experiences. Efforts have also been made to provide synchronized camera signals for streaming a live event, including user-controlled stream switching and social media interaction; however, these mechanisms often ignore the added burden to the consumption devices, especially when attempting to obtain the maximum possible image quality, which can negatively affect the overall experience.

Social media integrations have been developed for live events, but the consumption of the live event by a user typically occurs via independent devices, with each going at its own pace, without synchronization, resulting in one source providing information that spoils the element of surprise while the user is enjoying the live event. Without an orchestrator ensuring that both production, individual consumption, and shared consumption of these experiences remain consistent enough, it is very easy for the intended effects of these cross-media experiences to be lost or greatly diminished.

Socially shared experiences add another layer of complexity to the problem: if we take shared AR/VR experiences as an example, it is becoming possible to enjoy the same experience with friends physically located in different places while in real-time communication as a group e.g. voice or chat communications. However, even if all the elements of this experience are presented in the correct sequence and synchrony, if the content delivery is not also synchronized within the group, different group members will potentially be shown critical parts of the experience before others, thus ruining the sense of community for the social experience.

SUMMARY

A part of the present disclosure is directed to a set of mechanisms dedicated to ensure creation of synchronized immersive cross-media experiences providing a plurality of media sources, centered around multiple streams of immersive video cameras and regular audio/video of television ("TV") cameras but covering other aspects such as 2D graphics, 3D graphics, real-time data sources such as score data feed and data feed statistics in an event (such as a sports event), social media feeds, voice and sound effects. Media includes media asset is consumed as a media experience where the media asset can comprise one or more media components at any point in the media asset. The devices, systems and methods allow experience providers to identify and/or add timestamps for presentation of the content of various types during a live event, ensuring reliable synchronization between the upstream processors. The synchronized content is sent to processors, which may require the input media be synchronized, which define orchestrated consumption paths to provide end users with the freedom to select which elements of the cross-media experience they want to be presented. The various experience elements or media components are then presented in a spatial and chronologically consistent way relative to each media component in a compiled media experience, and information about how the media was consumed by one or more end users can be obtained.

The disclosure also covers a mechanism to allow client applications of cross-media experiences to discover available experiences, parse information about the available media types available for a given experience, determine a correct or optimal rendering path according to the end user device which accounts for technical configuration, present the experience (spatial and chronologically) in accordance with the content creator's designs, interact with a subset of the elements in accordance with the content creator's designs, manage viewing parties to enjoy an experience with a group of multiple end users while maintaining the time consistency within the group, taking into consideration timing, bandwidth and consumption device performance aspects to determine which media elements to present, when to present the media elements and at what level of quality to present the media elements.

Finally, the disclosure contemplates orchestration of an overall end user experience via an experience management system ("XMS"), which coordinates media and information flows across all backend and frontend components of the system. A variety of communication paths for media and data and signaling is provided as illustrated. Media flows include the ingestion of content from one or more originating sources. For example, media source can provide media input to the XMS and/or input to an ingestion service. Media from a media source can be uploaded to one or more dedicated processing engines from the ingestion service(s). From the processing engine(s) media can be sent to one or more content delivery service(s), and from the one or more content delivery service(s) to one or more client application(s). The client application(s) provide delivery of the processed media content to the end user.

Other data flows can include the collection of consumption data from one or more end users for processing by one or more analytics collector(s). Additionally the system can provide for the exchange of security credentials and permissions with one or more external authentication and entitlement services. Collection of data consumption and analytics can be tailored to take into consideration any local privacy regulations and/or user preferences that may be appropriate.

The systems and methods can use any appropriate media capture method to deliver media and content to the ingest engine. The systems and methods are configurable to operate in unmanaged scenarios that do not require tightly managed network controls which provides better reliability and lower cost even if the media delivered does not have a perfect synchronization achieved across all delivery locations. The system also does not require client devices or apps to sync using protocols such as network time protocol ("NTP"). Playback can be achieved with a single playback stream without the need to simultaneously playback on the client which increases streaming efficiency. The systems and methods makes the sync easy and even for upstream processors. The systems and methods also allow clients to consume the same experience which makes media consumption for multiple users easier with no need for complex caching. Additionally, the journal information controls information for other types of actions and considers local lag at a delivery location to prefetch information and only act on the information when the time is right based on the delivered media.

An aspect of the disclosure is directed to systems for providing an experience. The systems are configurable to comprise: a processor; a non-transitory computer-readable medium; and stored instructions translatable by the processor to perform: receiving one or more media assets over a computing network from one or more media sources; ingesting the one or more media assets across a distributed network to create one or more media asset outputs; fetching a remote configuration from an experience management system; synchronizing one or more media asset outputs across a plurality of ingest servers; providing a common set of configuration parameters from an ingest manager to the plurality of ingest servers; uploading the one or more synchronized media asset outputs over a computing network; performing a time segmentation step prior to uploading the ingested media from the ingestion servers to a processing engine; and delivering the ingested and synchronized media asset outputs to one or more end user devices via the experience management system connected to the system over the computer network. The one or more media assets can be processed into a media asset output. Additionally, the plurality of ingest servers are peer ingest servers. The experiences can be one or more of immersive and non-immersive. One or more ingest servers can be managed by a node. Additionally, the systems are configurable to determining if the fetched configuration is a new configuration. In some configurations, the systems are configurable to: push a remote configuration to one or more LAN nodes, scan for changes in one or more LAN nodes, and/or determine whether new devices are in communication with the system. Additionally, the systems can determine if an ingest trigger has been activated. In some configurations, the systems can also be configurable to request and parse a manifest, decode signaling information on one or more available viewports, decode one or more videos, monitor a gaze position, monitor a camera position, and/or adjust a video prior to presentation. The client stack can further comprise a dynamic asset manager configurable to monitor consumption of content and a dynamic asset renderer configurable to present a dynamic asset to a user in some configurations. Additionally a determination can be made if a given media asset is approaching a presentation time wherein the step of determining if the presentation time is approached is determined by at least one of timeline reaching a threshold of proximity with a present time. An asset download manager can be signaled to begin fetching the one or more media asset outputs. Different output formats can also be created for an input media, e.g., media asset, in a cascade and each input media can have a rendering path selected for the input media. Additionally, the system can determine if experience are shared experiences and collecting local experience data if the experience is shared. Status data can also be read to determine if a party receiving data is a party lead followed by determining if a delta of playback position is within a tolerance.

Another aspect of the disclosure is directed to computer implemented methods comprising the steps of: receiving one or more media assets over a computing network from one or more media sources; ingesting the one or more media assets across a distributed network to create one or more media asset outputs; fetching a remote configuration from an experience management system; synchronizing one or more media asset outputs across a plurality of ingest servers; providing a common set of configuration parameters from an ingest manager to the plurality of ingest servers; uploading the one or more synchronized media asset outputs over a computing network; performing a time segmentation step prior to uploading the ingested media from the ingestion servers to a processing engine; and delivering the ingested and synchronized media asset outputs to one or more end user devices via the experience management system connected over the computer network. The one or more media assets can be processed into a media asset output. Additionally, the plurality of ingest servers are peer ingest servers. The experiences can be one or more of immersive and non-immersive. One or more ingest servers can be managed by a node. Additionally, the methods are configurable to determining if the fetched configuration is a new configuration. In some configurations, the methods are configurable to: push a remote configuration to one or more LAN nodes, scan for changes in one or more LAN nodes, and/or determine whether new devices are in communication within the system. Additionally, the methods can determine if an ingest trigger has been activated. In some configurations, the methods can also be configurable to request and parse a manifest, decode signaling information on one or more available viewports, decode one or more videos, monitor a gaze position, monitor a camera position, and/or adjust a video prior to presentation. The client stack can further comprise a dynamic asset manager configurable to monitor consumption of content and a dynamic asset renderer configurable to present a dynamic asset to a user in some configurations. Additionally a determination can be made if a given media asset is approaching a presentation time wherein the step of determining if the presentation time is approached is determined by at least one of timeline reaching a threshold of proximity with a present time. An asset download manager can be signaled to begin fetching the one or more media asset outputs. Different output formats can also be created for an input media, e.g., media asset, in a cascade and each input media can have a rendering path selected for the input media. Additionally, the methods can determine if experience are shared experiences and collecting local experience data if the experience is shared. Status data can also be read to determine if a party receiving data is a party lead followed by determining if a delta of playback position is within a tolerance.

Still another aspect of the disclosure is directed to a product comprising one or more tangible computer-readable non-transitory storage media comprising computer-executable instructions operable to, when executed by at least one processor, enable the at least one processor to cause an experience management system to: receive one or more media assets over a computing network from one or more media sources; ingest the one or more media assets across a distributed network to create one or more media asset outputs; fetch a remote configuration from an experience management system; synchronize one or more media asset outputs across a plurality of ingest servers; provide a common set of configuration parameters from an ingest manager to the plurality of ingest servers; upload the one or more synchronized media asset outputs over a computing network; perform a time segmentation prior to uploading the ingested media from the ingestion servers to a processing engine; and deliver the ingested and synchronized media asset outputs to one or more end user devices via the experience management system connected over the computer network. The one or more media assets can be processed into a media asset output. Additionally, the plurality of ingest servers are peer ingest servers. The experiences can be one or more of immersive and non-immersive. One or more ingest servers can be managed by a node. Additionally, the products are configurable to determine if the fetched configuration is a new configuration. In some configurations, the products are configurable to: push a remote configuration to one or more LAN nodes, scan for changes in one or more LAN nodes, and/or determine whether new devices are in communication with the product. Additionally, the products can determine if an ingest trigger has been activated. In some configurations, the products can also be configurable to request and parse a manifest, decode signal information on one or more available viewports, decode one or more videos, monitor a gaze position, monitor a camera position, and/or adjust a video prior to presentation. The client stack can further comprise a dynamic asset manager configurable to monitor consumption of content and a dynamic asset renderer configurable to present a dynamic asset to a user in some configurations. Additionally a determination can be made if a given media asset approaches a presentation time wherein the step of determine if the presentation time is approached is determined by at least one of timeline reaching a threshold of proximity with a present time. An asset download manager can be signaled to begin fetching the one or more media asset outputs. Different output formats can also be created for an input media, e.g., media asset, in a cascade and each input media can have a rendering path selected for the input media. Additionally, the products can determine if experience are shared experiences and collecting local experience data if the experience is shared. Status data can also be read to determine if a party receiving data is a party lead followed by determining if a delta of playback position is within a tolerance.

Another aspect of the disclosure is directed to systems for providing an experience to a user. The systems are configurable to comprise: a processor; a non-transitory computer-readable medium; and stored instructions translatable by the processor to perform: receiving one or more media assets over a computing network from one or more media sources; ingesting the one or more media assets to create one or more media asset outputs; fetching a remote configuration from an experience management system; synchronizing one or more media asset outputs; delivering the ingested and synchronized media asset outputs to one or more end user devices via an experience management system connected to the system over the computer network; monitoring the consumption of the delivered media asset outputs; determining, based on the monitored consumption, a next media asset output for delivery; determining if a media asset output is approaching a presentation time; and applying a local lag mechanic to trigger dynamic asset pre-fetching while preventing an out-of-sequence presentation of the dynamic media asset outputs within the experience. Additionally, in some configurations, the step of ingesting occurs on a plurality of ingest servers, such as peer ingest servers. The experiences can be one or more of immersive and non-immersive. Additionally, one or more ingest servers can be managed by a node. In some configurations, the system determines if the pre-fetched configuration is a new configuration. A remote configuration can also be pushed to one or more LAN nodes. The system can also scan for changes in one or more LAN nodes, determine whether new devices are in communication with the system, and/or determine if an ingest trigger has been activated. It at least some configurations, the systems are configurable to request and parse a manifest, decode of signaling information on one or more available viewports, decode one or more videos, monitor a gaze position, monitor a camera position, and/or adjust a video prior to output. A client stack can be provided. The client stack can include a dynamic asset manager configurable to monitor consumption of content and a dynamic asset renderer configurable to present a dynamic asset to a user. Additionally, the system is configurable to determine if a given media asset output is approaching a presentation time wherein the step of determining if the presentation time is approached is determined by at least one of timeline reaching a threshold of proximity with a present time. The system can also signal an asset download manager to begin fetching the media asset output.

Yet another aspect of the disclosure is directed to computer implemented methods comprising the steps of: receiving one or more media assets over a computing network from one or more media sources; ingesting the one or more media assets to create one or more media asset outputs; fetching a remote configuration from an experience management system; synchronizing one or more media asset outputs; delivering the ingested and synchronized media asset outputs to one or more end user devices via an experience management system connected to the over a computer network; monitoring the consumption of the delivered media asset outputs; determining, based on the monitored consumption, a next media asset output for delivery; determining if a media asset output is approaching a presentation time; and applying a local lag mechanic to trigger dynamic asset pre-fetching while preventing an out-of-sequence presentation of the dynamic media asset outputs within the experience. Additionally, in some configurations, the step of ingesting occurs on a plurality of ingest servers, such as peer ingest servers. The experiences can be one or more of immersive and non-immersive. Additionally, one or more ingest servers can be managed by a node. In some configurations, the methods determine if the pre-fetched configuration is a new configuration. A remote configuration can also be pushed to one or more LAN nodes. The methods can also scan for changes in one or more LAN nodes, determine whether new devices are in communication with the networked devices, and/or determine if an ingest trigger has been activated. It at least some configurations, the methods are configurable to request and parse a manifest, decode of signaling information on one or more available viewports, decode one or more videos, monitor a gaze position, monitor a camera position, and/or adjust a video prior to output. A client stack can be provided. The client stack can include a dynamic asset manager configurable to monitor consumption of content and a dynamic asset renderer configurable to present a dynamic asset to a user. Additionally, the methods are configurable to determine if a given media asset output is approaching a presentation time wherein the step of determining if the presentation time is approached is determined by at least one of timeline reaching a threshold of proximity with a present time. The methods can also signal an asset download manager to begin fetching the media asset output.

Still another aspect of the disclosure is directed to a product comprising one or more tangible computer-readable non-transitory storage media comprising computer-executable instructions operable to, when executed by at least one processor, enable the at least one processor to cause an experience management system to: receive one or more media assets over a computing network from one or more media sources; ingest the one or more media assets to create one or more media asset outputs; fetch a remote configuration from an experience management system; synchronize one or more media asset outputs; deliver the ingested and synchronized media asset outputs to one or more end user devices via an experience management system connected to the system over the computer network; monitor the consumption of the delivered media asset outputs; determining, based on the monitored consumption, a next media asset output for delivery; determine if a media asset output is approach a presentation time; and apply a local lag mechanic to trigger dynamic asset pre-fetch while prevent an out-of-sequence presentation of the dynamic media asset outputs within the experience. Additionally, in some configurations, the ingest process occurs on a plurality of ingest servers, such as peer ingest servers. The experiences can be one or more of immersive and non-immersive. Additionally, one or more ingest servers can be managed by a node. In some configurations, the system determines if the pre-fetched configuration is a new configuration. A remote configuration can also be pushed to one or more LAN nodes. The system can also scan for changes in one or more LAN nodes, determine whether new devices are in communication with the system, and/or determine if an ingest trigger has been activated. It at least some configurations, the systems are configurable to request and parse a manifest, decode of signal information on one or more available viewports, decode one or more videos, monitor a gaze position, monitor a camera position, and/or adjust a video prior to output. A client stack can be provided. The client stack can include a dynamic asset manager configurable to monitor consumption of content and a dynamic asset renderer configurable to present a dynamic asset to a user. Additionally, the system is configurable to determine if a given media asset output is approach a presentation time wherein the step of determine if the presentation time is approached is determined by at least one of timeline reach a threshold of proximity with a present time. The system can also signal an asset download manager to begin fetch the media asset output.

Another aspect of the disclosure is directed to systems for providing an experience. The systems can comprise: a processor; a non-transitory computer-readable medium; and stored instructions translatable by the processor to perform: receiving one or more media assets over a computing network from one or more media sources; muxing one or more media assets into media asset outputs for a single monitoring feed which is consumed by one or more autopilot servers to allow generation of one or more autopilot programs; preparing autopilot program distribution wherein a first mode of distribution is generating autopilot journals from one or more commands received from each autopilot generator, and a second mode of distribution is embedding autopilot information as an alternative track into the one or more media asset outputs; generating autopilot metadata describing the available autopilot programs in the experience; delivering the media asset outputs including any embedded autopilot information to one or more end user devices via an experience management system connected to the system over the computer network; reading the autopilot information, wherein the step of reading is selected from obtaining autopilot information from embedded metadata in the media asset outputs, and fetching information from an event journal based on the autopilot metadata; operating an autopilot in an ongoing mode; selecting a camera match based on the autopilot program indication; issuing a camera change command wherein the camera change command is optimized based on local lag mechanics to enable a preemptive camera changes; loading and substituting video chunks from a new camera based on a playback position; and loading a camera change when the autopilot is in the ongoing mode at a future timestamp in an updated autopilot information. Ingesting of the one or more media asset can occur on a plurality of ingest servers, such as peer ingest servers. The experiences can be one or more of immersive and non-immersive. Additionally, the ingest servers can be managed by a node. A remote configuration can be fetched from an experience management system, in some configurations. Additionally, the system can be configurable to determine if the fetched configuration is a new configuration. In some configurations a remote configuration can be pushed to one or more LAN nodes. Additionally, the system can scan for changes in one or more LAN nodes, determine whether new devices are in communication with the system, and/or determine if an ingest trigger has been activated. In some configurations, the system can request and parse a manifest, decode signaling information on one or more available viewports, decode one or more videos, monitor of a gaze position, monitor of a camera position, and/or adjust a video prior to output. A client stack can also be provided that comprises a dynamic asset manager configurable to monitor consumption of content and a dynamic asset renderer configurable to present a dynamic asset to a user. The system can also be configurable to determine if a given media asset output is approaching a presentation time wherein the step of determining if the presentation time is approached is determined by at least one of timeline reaching a threshold of proximity with a present time. Additionally the system is configurable to signal an asset download manager to begin fetching the media asset, and/or subscribe or unsubscribe from autopilot programs Yet another aspect of the disclosure is directed to computer implemented methods comprising the steps of: receiving one or more media assets over a computing network from one or more media sources; muxing one or more media assets into media asset outputs for a single monitoring feed which is consumed by one or more autopilot servers to allow generation of one or more autopilot programs; preparing autopilot program distribution wherein a first mode of distribution is generating autopilot journals from one or more commands received from each autopilot generator, and a second mode of distribution is embedding autopilot information as an alternative track into the one or more media asset outputs; generating autopilot metadata describing the available autopilot programs in the experience; delivering the media asset outputs including any embedded autopilot information to one or more end user devices via an experience management system connected over the computer network; reading the autopilot information, wherein the step of reading is selected from obtaining autopilot information from embedded metadata in the media asset outputs, and fetching information from an event journal based on the autopilot metadata; operating an autopilot in an ongoing mode; selecting a camera match based on the autopilot program indication; issuing a camera change command wherein the camera change command is optimized based on local lag mechanics to enable a preemptive camera changes; loading and substituting video chunks from a new camera based on a playback position; and loading a camera change when the autopilot is in the ongoing mode at a future timestamp in an updated autopilot information. Ingesting of the one or more media asset can occur on a plurality of ingest servers, such as peer ingest servers. The experiences can be one or more of immersive and non-immersive. Additionally, the ingest servers can be managed by a node. A remote configuration can be fetched from an experience management system, in some configurations. Additionally, the methods can be configurable to determine if the fetched configuration is a new configuration. In some configurations a remote configuration can be pushed to one or more LAN nodes. Additionally, the methods can scan for changes in one or more LAN nodes, determine whether new devices are in communication over a computing network or system, and/or determine if an ingest trigger has been activated. In some configurations, the methods can request and parse a manifest, decode signaling information on one or more available viewports, decode one or more videos, monitor of a gaze position, monitor of a camera position, and/or adjust a video prior to output. A client stack can also be provided that comprises a dynamic asset manager configurable to monitor consumption of content and a dynamic asset renderer configurable to present a dynamic asset to a user. The methods can also be configurable to determine if a given media asset output is approaching a presentation time wherein the step of determining if the presentation time is approached is determined by at least one of timeline reaching a threshold of proximity with a present time. Additionally the methods are configurable to signal an asset download manager to begin fetching the media asset, and/or subscribe or unsubscribe from autopilot programs Still another aspect of the disclosure is directed to a product comprising one or more tangible computer-readable non-transitory storage media comprising computer-executable instructions operable to, when executed by at least one processor, enable the at least one processor to cause an experience management system to: receiving one or more media assets over a computing network from one or more media sources; muxing one or more media assets into media asset outputs for a single monitoring feed which is consumed by one or more autopilot servers to allow generation of one or more autopilot programs; preparing autopilot program distribution wherein a first mode of distribution is generating autopilot journals from one or more commands received from each autopilot generator, and a second mode of distribution is embedding autopilot information as an alternative track into the one or more media asset outputs; generating autopilot metadata describing the available autopilot programs in the experience; delivering the media asset outputs including any embedded autopilot information to one or more end user devices via an experience management system connected over the computer network; reading the autopilot information, wherein the step of reading is selected from obtaining autopilot information from embedded metadata in the media asset outputs, and fetching information from an event journal based on the autopilot metadata; operating an autopilot in an ongoing mode; selecting a camera match based on the autopilot program indication; issuing a camera change command wherein the camera change command is optimized based on local lag mechanics to enable a preemptive camera changes; loading and substituting video chunks from a new camera based on a playback position; and loading a camera change when the autopilot is in the ongoing mode at a future timestamp in an updated autopilot information. Ingesting of the one or more media asset can occur on a plurality of ingest servers, such as peer ingest servers. The experiences can be one or more of immersive and non-immersive. Additionally, the ingest servers can be managed by a node. A remote configuration can be fetched from an experience management system, in some configurations. Additionally, the products can be configurable to determine if the fetched configuration is a new configuration. In some configurations a remote configuration can be pushed to one or more LAN nodes. Additionally, the products can scan for changes in one or more LAN nodes, determine whether new devices are in communication with the product, and/or determine if an ingest trigger has been activated. In some configurations, the product can request and parse a manifest, decode signaling information on one or more available viewports, decode one or more videos, monitor of a gaze position, monitor of a camera position, and/or adjust a video prior to output. A client stack can also be provided that comprises a dynamic asset manager configurable to monitor consumption of content and a dynamic asset renderer configurable to present a dynamic asset to a user. The product can also be configurable to determine if a given media asset output is approaching a presentation time wherein the step of determining if the presentation time is approached is determined by at least one of timeline reaching a threshold of proximity with a present time. Additionally the product is configurable to signal an asset download manager to begin fetching the media asset, and/or subscribe or unsubscribe from autopilot programs Another aspect of the disclosure is directed to experience management systems for providing an experience comprising: a processor; a non-transitory computer-readable medium; stored instructions translatable by the processor: a frontend in communication with a database; a backend in communication with the frontend and the database; one or more media sources and authorization systems configurable to provide at least one of media and data to the backend; and one or more ingestion servers, processing engines, analytics collectors, client applications, and content delivery services configurable to provide and receive signaling information from the backend. The frontend is configurable to provide user access to the system. The frontend is also configurable to obtain information about available ingest managers, processing engines and delivery methods from the backend. In at least some configurations, the frontend provides production users to define experiences using one or more of the available ingest managers, processing engines and delivery methods from the backend. An admin module can also be provided wherein the admin modules is configurable to register and link media inputs.

Yet another aspect of the disclosure is directed to computer implemented methods comprising the steps of: storing instructions translatable by a processor, communicating via a frontend with a database, communicating via a backend with the frontend and the database; providing at least one media from one or more media sources and/or authorization systems to the backend, and providing and receiving signaling information from the back end via one or more ingestion servers, processing engines, analytics collectors, client applications and content delivery services. The methods also include providing a user access to the system. Additionally, the front end can be configurable to obtain information about available ingest managers, processing engines and delivery methods from the backend. The frontend is also configurable to provide production users experiences using one or more of the available ingest managers, processing engines and delivery methods form the back end. Additionally, the frontend is also configurable to allow production users to define experiences using one or more of the available ingest managers, processing engines and delivery methods form the back end. An admin module can be provided wherein the admin modules is configurable to register and link media inputs.

Still another aspect of the disclosure is directed to a product comprising one or more tangible computer-readable non-transitory storage media comprising computer-executable instructions operable to, when executed by at least one processor, enable the at least one processor to cause an experience management system to provide an experience using: a frontend in communication with a database; a backend in communication with the frontend and the database; one or more media sources and authorization systems configurable to provide at least one of media and data to the backend; and one or more ingestion servers, processing engines, analytics collectors, client applications, and content delivery services configurable to provide and receive signaling information from the backend. The frontend is configurable to provide user access to the product. The frontend is also configurable to obtain information about available ingest managers, processing engines and delivery methods from the backend. In at least some configurations, the frontend provides production users to define experiences using one or more of the available ingest managers, processing engines and delivery methods from the backend. An admin module can also be provided wherein the admin modules is configurable to register and link media inputs.

INCORPORATION BY REFERENCE

All publications, patents, and patent applications mentioned in this specification are herein incorporated by reference to the same extent as if each individual publication, patent, or patent application was specifically and individually indicated to be incorporated by reference.

US 2006/0023073 A1 published Feb. 2, 2006, for System and Method for Interactive Multi-View Video;

US 2014/0373081 A1 published Dec. 18, 2014, for Playback Synchronization in a Group Viewing A Media Title;

US 2015/0019670 A1 published Jan. 15, 2015, for Distributed Control of Synchronized Content;

US 2015/0124171 A1 published May 7, 2015, for Multiple Vantage Point Viewing Platform and User Interface;

US 2018/0255332 A1 published Sep. 6, 2018, for Multi-Angle Video Synchronization and Multi-Angle Video Interface;

US 2018/0288363 A1 published Oct. 4, 2018, for Methods and Apparatuses for Image Processing to Optimize Image Resolution and for Optimizing Video Streaming Bandwidth for VR Videos;

US 2019/0182554 A1 published Jun. 13, 2019, for Systems, Apparatus, and Methods for Scalable Low -Latency Viewing of Broadcast Digital Content Streams of Live Events, and Synchronization of Event Information with Viewed Streams, Via Multiple Internet Channels;

U.S. Pat. No. 7,671,893 B2 published Mar. 2, 2010, for System and Method for Interactive Multi-View Video;

U.S. Pat. No. 9,839,844 B2 published Dec. 12, 2017 for Sprite Strip Renderer;

Carlsson et al. "Optimized Adaptive Streaming of Multi-video Stream Bundles", IEEE Transactions on Multimedia, 2017; and Vaishnavi et al. From IPTV to Synchronous shared experiences challenges in Designs, Signal Processing Image Communications 26:370-377 (2011).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 9A-B are a detailed flow of step 105 from FIG. 8;

FIG. 14 illustrates an experience presentation manifest section dedicated to a main immersive video description;

FIG. 15 illustrates an experience presentation manifest with an other media section;

FIGS. 16A-B illustrate an experience presentation manifest with other media and multiple rendering paths suitable for 3D models and data streams;

FIG. 17 illustrates an experience presentation manifest with declaration of available timelines within the experience;

FIG. 18 illustrate an experience presentation manifest with a declaration of an autopilot program;

FIGS. 19A-B illustrate an experience presentation manifest with a declaration of an actionable camera change map;

FIGS. 20A-C illustrate an experience presentation manifest with a declaration of a highlight alternative video with an actionable hide button;

FIGS. 21A-B illustrate a discovery endpoint;

FIGS. 23A-B illustrate additions to a client stack to allow for dynamic asset lifecycle management;

DETAILED DESCRIPTION

Figure 1:
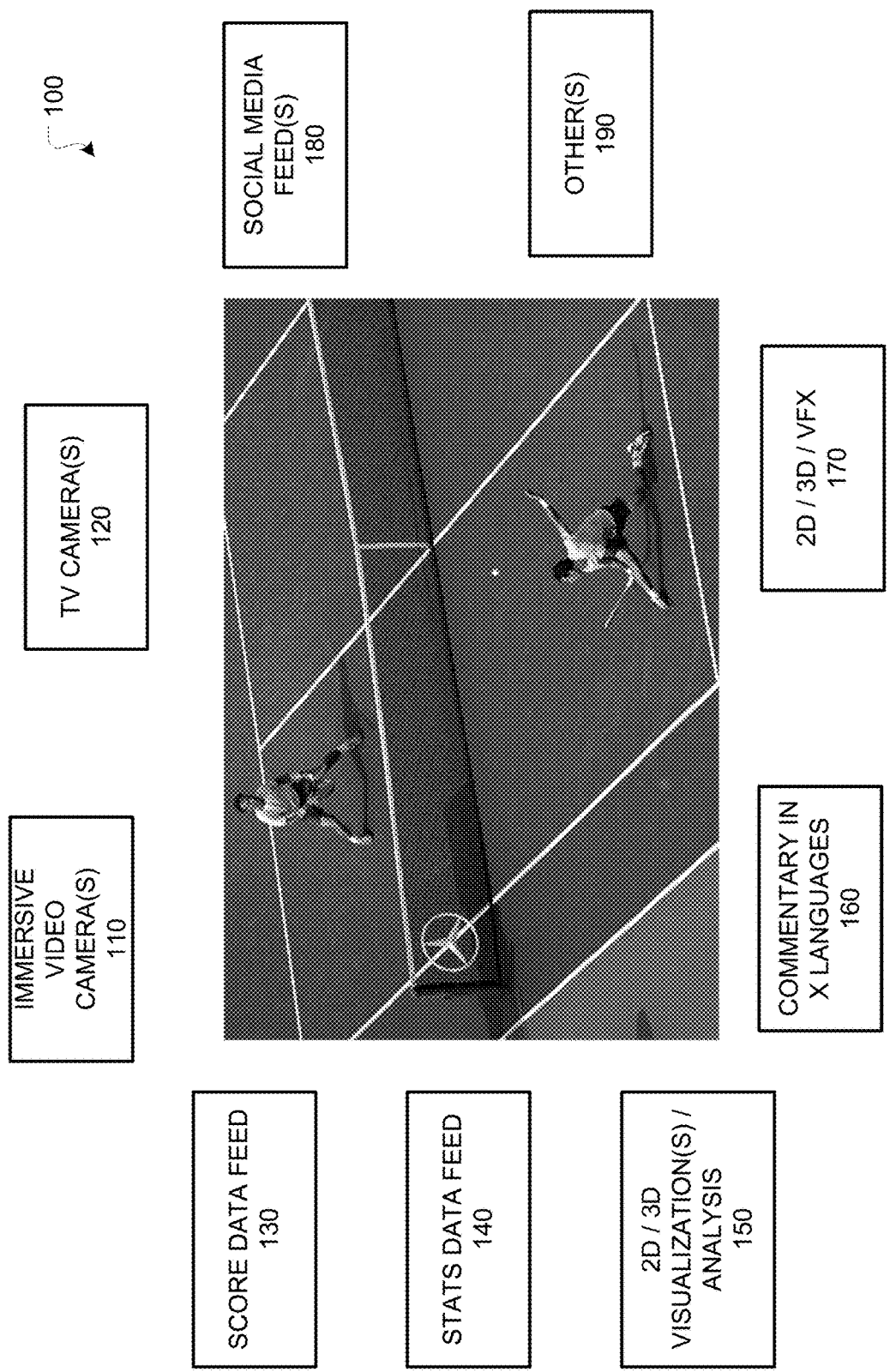
FIG. 1 is a high-level depiction of the plurality of media types that may be ingested during a single live event.

Turning now to FIG. 1, a part of the present disclosure is directed to a set of mechanisms dedicated to ensuring the creation of synchronized immersive cross-media experiences. An overview of available media sources 100 at a live event 102 is shown. Media types include, but are not limited to, media centered around multiple streams of immersive video cameras 110 and regular audio/video of television ("TV") cameras 120 but covering other aspects such as 2D graphics, 3D graphics and video effects ("VFX") 170, real-time data sources such as score data feed 130 and data feed statistics 140 in an event (such as a sports event), social media feeds 180, 2D/3D visualization analysis 150, commentary in a plurality (x) of languages 160, and voice and sound effects. Each of the media sources of FIG. 1 can provide a potential media asset to the systems and devices.

The devices, systems and methods allow experience providers (e.g., services and systems generating media assets) to identify and/or add timestamps for presentation of the content of various types during a live event, ensuring reliable synchronization between the upstream processors. The media assets from the various media sources can be processed into one or more media asset outputs using, for example, techniques described in US2018/0288363A1.

The synchronized content is sent to one or more processors, which may require the input media be synchronized. Media sources and media assets do not need to have the same timestamp because the system applies a universal timestamp to the content overriding the timestamp from the source, thus simplifying the preservation of the sync of the media sources after that point. The one or more processors are configurable to define orchestrated consumption paths to provide one or more end users with the ability to select which elements of the cross-media experience they want to be presented on their local electronic device. The various experience elements are then presentable in a spatially and chronologically consistent way. Additionally, information about how the media was consumed can be obtained. As will be appreciated by those skilled in the art, other sources 190 of media can also contribute to the available types of media at a live event.

The disclosure also covers a mechanism to allow client applications of cross-media experiences to discover available experiences, parse information about the available media types available for a given experience, determine a correct or optimal rendering path according to the end user device which accounts for technical configuration, present the experience (spatial and chronologically) in accordance with the content creator's designs, interact with a subset of the elements in accordance with the content creator's designs, manage viewing parties to enjoy an experience with a group of multiple end users while maintaining the time consistency within the group, taking into consideration timing, bandwidth and consumption device performance aspects to determine which media elements to present, when to present the media elements and at what level of quality to present the media elements.

Figure 2:
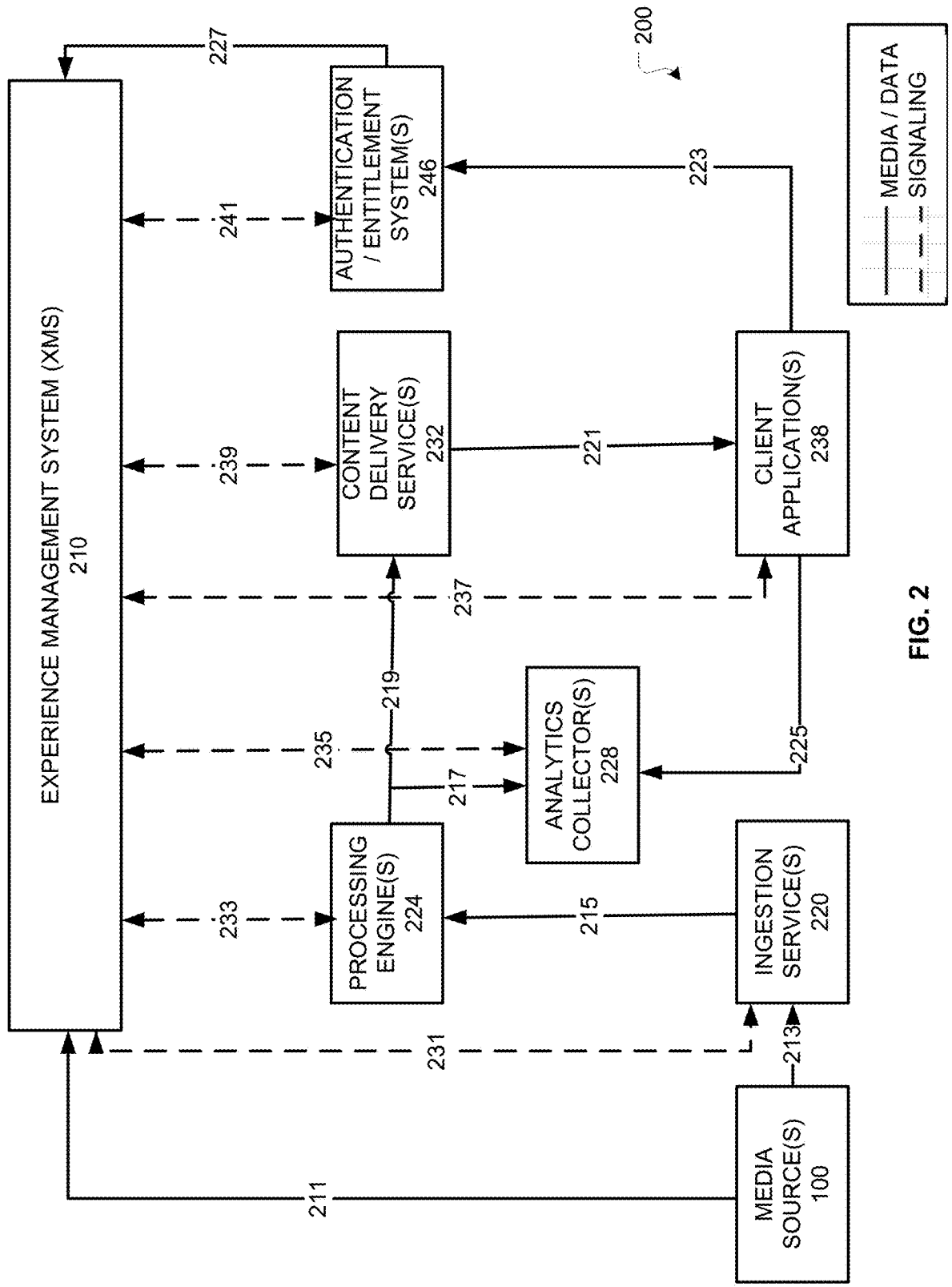
FIG. 2 illustrates a high-level overview of the architecture of components the experience management system within this disclosure connects with, distinguishing between signaling information flows and media/data flows.

Turning now to FIG. 2, orchestration of an overall end user experience via an experience management system 210 ("XMS") for an experience management system main components 200 is disclosed. The system coordinates and transfers media and information or data flows across all backend and frontend components of the system. The system also provides signaling between various components.

Turning to the media flows, the media/data flow includes the ingestion of content from one or more originating sources, such as media sources 100. The media sources 100 provides media and/or data to the XMS 210 via media-XMS data path 211. The media sources 100 can also provide media and/or data to the ingestion service(s) 220 via media-ingestion data path 213. The ingestion service(s) 220 can provide media and/or data to processing engine(s) 224 via ingestion-processing data path 215. The processing engine 224 can provide the media and/or data to content delivery service(s) 232 via processing-content delivery data path 217. Alternatively, and additionally, the processing engine(s) can provide media and/or data to the analytics collector(s) 228 via the processing-analytics collector data path 219. Content delivery service 232 can provide media and/or data to one or more client application(s) 238 via content delivery-client application data path 221. The one or more client application(s) 238 can provide media and/or data to an authentication/entitlement system(s) 246 via client application-authentication data path 223. The one or more client application(s) 238 can also, or alternatively, provide media and/or data to analytic collector(s) 228 via client application-analytic collector(s) data path 225. Authentication/entitled system(s) 246 can provide media and/or data to the XMS 210 via authentication-XMS data path 227.

Other data flows can include the collection of consumption data from one or more end users for analytics and the exchange of security credentials and permissions with external authentication and entitlement services. Collection of data consumption and analytics can also be tailored to take into consideration any local privacy regulations or user preferences that may be appropriate.

Additionally, signaling can be provided between one or more of the experience management system components

200. The XMS 210 can provide signaling to and from: ingestion services 220 via XMS-ingestion signaling path 231; processing engine(s) 224 via XMS-processing engine signaling path 233; analytic collector(s) 228 via XMS-analytics signaling path 235; client application(s) 238 via XMS-client application signaling path 237; content delivery service(s) 232 via CMS-content delivery signaling path 239; and authentication/entitlement system(s) 246 via authentication-XMS signaling path 241.

The media is uploaded to dedicated processing engines 224, media from the processing engines 224 is sent to one or more content delivery service(s) 232, and from the content delivery service(s) 232 to one or more client application(s) 238. The client application(s) 238 provide delivery of the media content to the end user via the client application(s) 238.

Signaling information includes configuration parameters to control media and data flows, and include direct communication channels with all entities previously outlined. Signaling information allows multiple sources of media to be orchestrated into a coherent and enriched consumption experience for the end user via the client application. Signaling information includes, but is not limited to:

Synchronized generation of immersive audio/video content where the synchronized immersive audio/video content is a media asset or components comprised of two or more audio/video components that are compiled and synchronized prior to delivery;

Mechanisms to fine-tune a synchronized presentation of media, even if the original sources are not synchronized at their origin;

Ingestion of external media sources, with a time-stamping mechanism;

The ability of a backend system to create different output formats for a given input media in a cascade, so that client systems can decide which rendering path to take;

Optimization of the input elements for distribution, according to the media type, with special emphasis on the immersive audio/video content optimization;

The ability of the backend system to compose an experience using one or more of the media elements ingested, resulting in the composition of an experience presentation manifest;

The ability of the backend system to publish the composed experiences for discovery by client systems;

The ability of the client system to help users discover available consumption experiences from the publishing system;

The ability of the client system to, upon a choice by the user, parse an experience presentation manifest to determine the available elements;

The ability of the client system to decide what elements to load, in accordance to several considerations:
  a. Experience manifest contents;
  b. Local user preferences;
  c. Device capabilities;
  d. Absolute and relative timelines (e.g. current global time, time spent in an experience, time stamp of the video); and
  e. Network performance;

The ability of the backend system to provide information to the client system to automatically switch to a specific camera within the experience, and the ability of the client system to adjust the content being presented based on the information provided by the backend system; and The ability of client systems to perform synchronization of an experience in a shared experience scenario, e.g. when the experience is being consumed by more than one end user on more than one end user device.

Although in some implementations an immersive video is presented, as will be appreciated by those skilled in the art, experiences produced with the disclosed methods and processes can also use non-immersive video. The disclosed techniques are applicable to any electronic device capable of decoding video and presenting three dimensional ("3D") geometries.

Immersive video ingest servers 312 can utilize an immersive video processing engine, such as the immersive video processing engine described in US2018/0288363A1. The immersive video processing engine described in US2018/0288363A1 can also perform the optimization of multiple cameras in real-time and preserve synchronization across its entire backend and during client consumption moments. However, the prior immersive video processing engine does not provide a sync method, and therefore requires that all source audios/videos provided to the video processing engine are in sync with each other at the point of entering the engine. Given this constraint on the processing engine, and the heterogeneous nature for the audio/video sources, the present method provides a mechanism to ensure a video frame/audio sample synchronization prior to its entry into the processing engine is correctly passed-on by enabling the disclosed ingest servers to operate in a synchronized distributed fashion.

Figure 3:
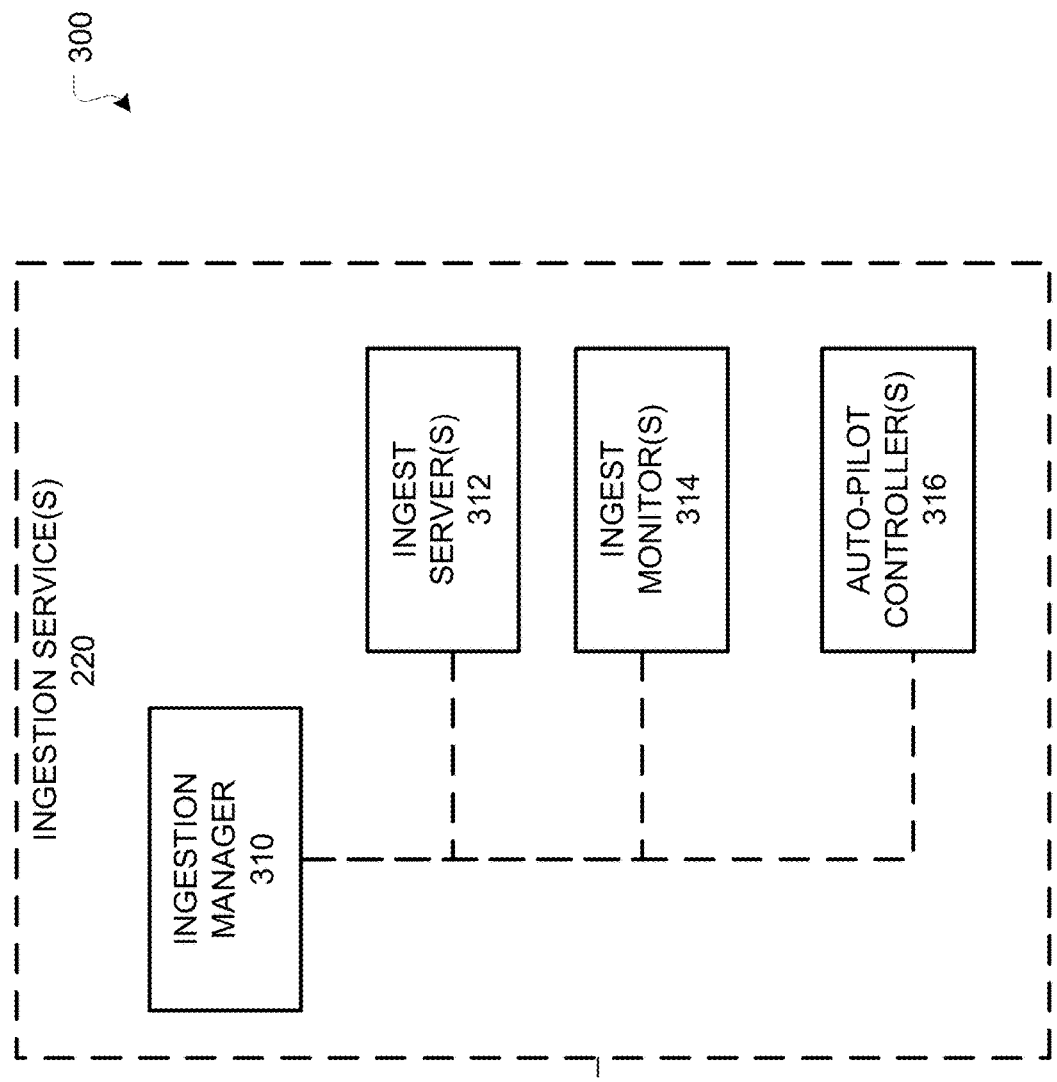
FIG. 3 illustrates exemplar main components and hierarchy within the ingestion system outlined in FIG. 2.

In order to enable the ingest servers to operate in a synchronized distributed fashion, the first problem to address is that of having the video frames/audio samples in sync prior to even uploading to the processing engines. FIG. 3 illustrates an ingestion service 220 that includes an ingest manager 310, one or more ingest server(s) 312, one or more ingest monitor(s) 314, and/or one or more auto-pilot controller(s) 316.

Figure 4:
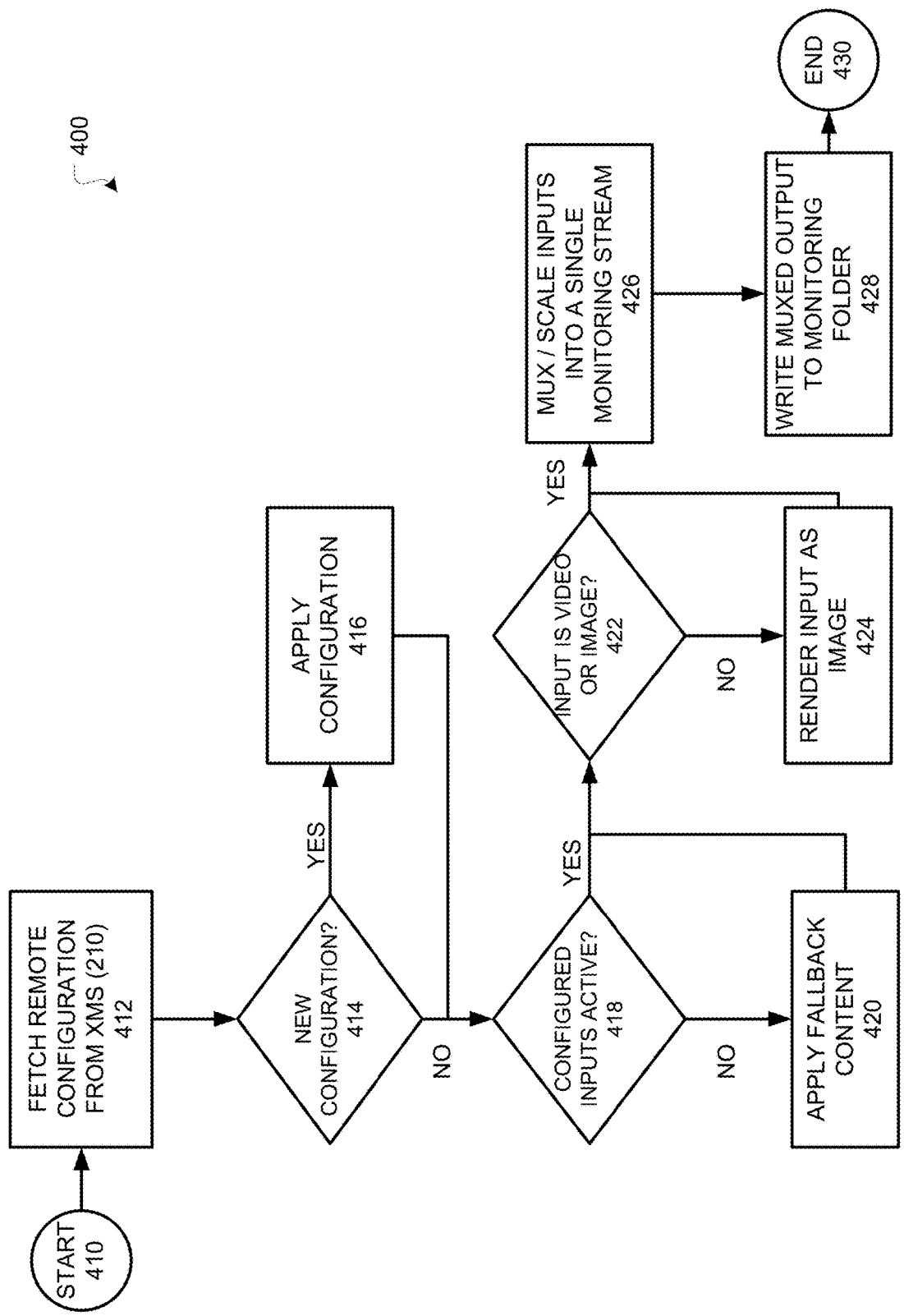
FIG. 4 depicts an exemplar main workflow the flow of the monitoring node outlined in FIG. 3.

FIG. 4 illustrates the main flow of the video sync monitor 400. The process starts 410 and fetches or obtains a remote configuration from the XMS 412. The process determines if a new configuration is present 414. If a new configuration is present (YES), the process applies configuration settings from the XMS 416. If a new configuration is not present (NO), then the process proceeds to determine if the configured inputs are active 418. If the configured inputs are not active (NO), then fallback content is applied 420 and the process continues to determine if the input is a video or image 422. If configured inputs are active (YES), then the process continues directly to determine if the input is a video or image 422. If the input is not a video or image (NO), then the process proceeds to render the input as an image 424 before proceeding to mux/scale input into a single monitoring stream 426. For example, non-video and non-image input includes, but is not limited to, 3D models in various formats (e.g., fbx and obj files), HTML pages, data feeds from external sources such as social media, or score/statistics data in the case of sport events. If the input is a video or image (YES), then the process muxes all media sources to be sent to the upstream processor into a single monitoring stream 426 and then writes the muxed output to a monitoring folder 428 before the process ends 420. When the muxed output is written to a monitoring folder it combines the muxed output in a lightweight representation e.g. lowering the overall resolution of videos and images or quick-rendering 3D models into a simpler image. This muxed representation can be reproduced for manual verification and adjustment of the sync of the source media sources.

Figure 5:
FIG. 5 illustrates a possible output of the monitoring node flow depicted in FIG. 4.

As shown in FIG. 5, illustrates an output obtained from the mux/scale inputs step 426 in FIG. 4 for the simplest mechanism of frame synchronization is to use an ingestion service 220 that includes a video sync monitor 500, which is a monitoring module of an overall immersive experience. The overall immersive experience presents panoramic images to the user. The video sync monitor 500 has, for example, a first image 510, a second image 520, and a third image 530. FIG. 5 is an illustration of a resulting image from a muxed representation. The images illustrate a single screen for a potential output for immersive cameras providing visual effects. Each available data feed is presented from a vantage point. For example, first image 510 is presented by a camera located partially within passageway into the tennis courts. A first part 512 of the first image 510 provides a VR experience of the activity on the court. A second part 514 of the first image provides an AR experiences embedded into the VR experience. A third part 516 can provide additional data about the images being consumed, such as players and score. Second image 520 is presented by a camera located along a sideline of a tennis court and third image 520 is presented by a camera located at a baseline of a tennis court. As will be appreciated by those skilled in the art, more than three available views can be presented in the user interface and/or be available to a user by scrolling and/or toggling. Additionally, one or more AR embedded components can be provided on each feed or just the main feed currently being consumed by the user. In addition, as illustrated, a top band 518 and a bottom band 518' can be added that provides additional information such as branding information.

More sophisticated methods for attaining frame synchronizations include making use of existing technologies such as timecodes from the audio/video source, assuming the source camera and live stitching system can provide them, or audio-based synchronization, which can be used then the source feeds each contain their own audio channels to provide an estimation of the relative delay between sources. Either of these mechanisms result in an estimated relative delay between sources that can be further fine turned in the video sync monitor as a final overriding tool.

With frame/sample consistency ensured, the next step is to ensure this sync is preserved in the immersive video processing engine. For this task, providing a distributed mode of operation is key, because video in the workflow of this method is expected to be of extremely high resolutions, bitrates and frame rates. The input is typically at the limit of the operating parameters of currently available hardware (particularly when dealing with immersive 360 video). Therefore, it will be highly impractical, if not directly impossible, to assume that a multi-camera immersive experience can be handled by a single ingest server 312. In this context, ensuring synchronization across a plurality of separate ingest servers 312 is achieved by having the ingest servers 312 connected to a computer network and coordinated by a node called ingest manager 310 as shown in FIG. 3.

Figure 6:
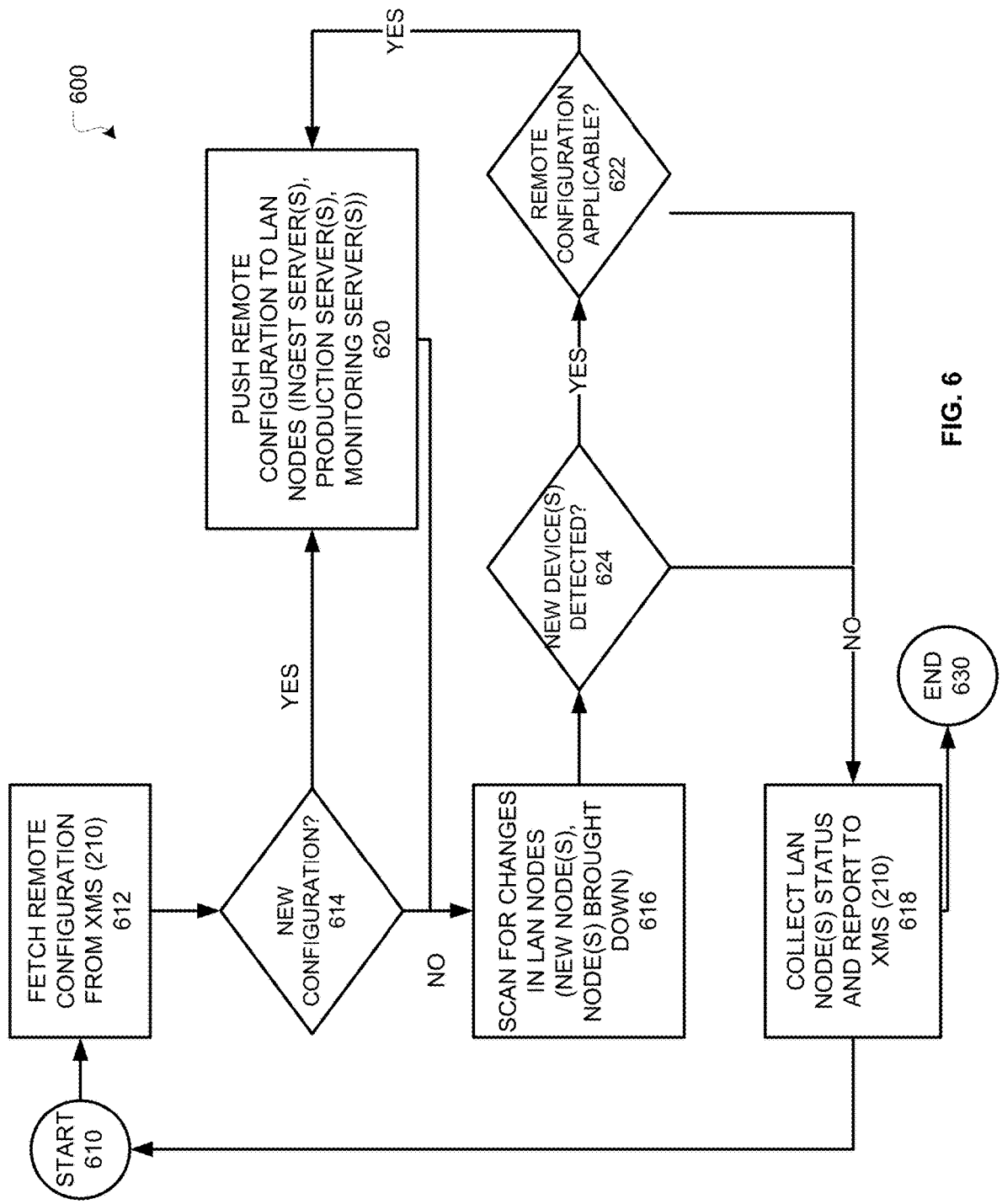
FIG. 6 depicts an exemplar flow of the monitoring node of the ingest manager process outlined in FIG. 3.

FIG. 6 illustrates an exemplar main process flow of an ingest manager 600, which is connected to the XMS 210 and to all ingest servers 312, either previously configured or recently added in the configuration, and provides a common set of configuration parameters and commands to them, as well as reporting back about the status of each system to the XMS.

The main process flow of the ingest manager 600 starts 610 after a remote configuration is fetched from the XMS 612. Once the remote configuration is fetched from the XMS, the system determines if this fetched configuration is new 614. A configuration is new if it differs from the current configuration or has new or different variables or values in the configuration. If there is a new configuration (YES), then the system pushes the new remote configuration to the known LAN nodes connected to the ingest manager 620 (e.g. one or more of each of ingest servers 312, production servers (e.g., servers associate with media sources 100) and/or monitoring servers 314 before proceeding to scan for changes in LAN nodes 616. If there is not a new configuration (NO), then the system skips the configuration push and proceeds directly to scan for changes in the LAN nodes 616 (e.g. one or more of each new node and/or nodes brought down). Once the scan is complete, ingest manager 310 then evaluates whether new device(s) are detected 624. If new device(s) are detected (YES), then the system determines if a remote configuration is applicable 622. If a remote configuration is applicable (YES), the system pushes remote configuration to LAN nodes 620 before returning to the process of scanning for changes in LAN nodes 616. If there no new devices are detected (NO), or no remote configuration is applicable (NO), then the system collects LAN nodes status and reports the LAN node status to the XMS 618. Once the LAN nodes are collected and the status is provided to the CMS, the process flow can re-start at start 610 or end 630.

Notable elements of the process configuration illustrated in FIG. 6 include:
Output frequencies: frame rate for video and sample rate for audio;
Stream commencement time: an absolute epoch-based timestamp of when a live even should begin to be live streamed; and
Descriptor files for their specific audio/video streams, including aspects such as resolution, interface, projection and bitrates.

For this purpose, media ingestion in the system is normally controlled by dedicated server nodes denominated ingest servers 312. In the case of immersive video, each ingest server 312 is tasked with receiving video ready to be streamed to users and perform an upload of content from video sources 710 through a video ingestion service 220 to a video processing engine 750. The video ingestion service 220 can provide synchronized content 754 via one or more peer ingest servers 744, 746, 748.

Figure 8:
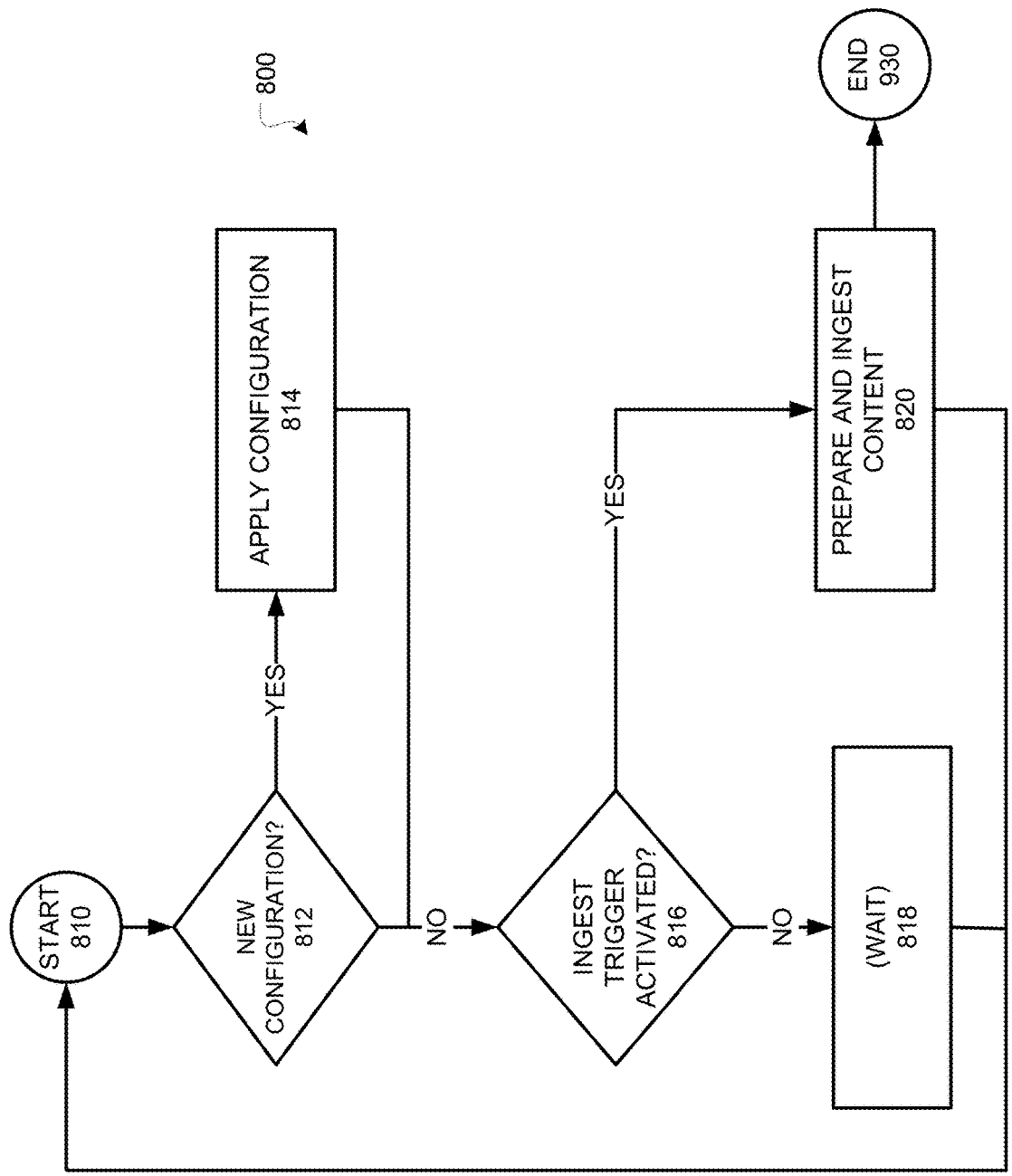
FIG. 8 illustrates a generic process for an ingest server.

Individually, each of the one or more peer ingest server(s) 744, 746, 748 are configurable to run the process illustrated in FIG. 8. FIG. 8 illustrates a generic ingest server process 800. The generic ingest service process starts 810. The process obtains its configuration from the ingest manager 620 and, upon changes in the configuration, applies the settings as part of a startup sequence 814, then the system awaits for a command from the ingest manager 310 to begin performing a process of preparation and ingestion of content 820. As shown, after the process starts 810, the process determines whether a new configuration 812 is present. If a new configuration is present (YES), the ingest server process applies the new configuration 814 and proceeds to the step of determining whether an ingest trigger has been activated 816. The new configuration is applied within the ingest server running the process. If a new configuration is not present (NO), then the process proceeds to the step of determining whether an ingest trigger has been activated 816. The process then determines whether an ingest trigger has been activate 816. If the ingest trigger has been activated (YES), then the process proceeds to step of preparing and ingesting the content 820. If the ingest trigger has not been activated (NO), then the process proceeds to step of waiting 818 a set amount of time, at the end of which the process cycles starts 810 again. After the content is prepared and ingested 820 or the waiting period has passed 818 the process can proceed to start 810 in order to restart the process or end 830 the process. The waiting period can be very short, e.g., less than a second, or any time suitable to check triggering and configuration fetches.

Figure 9A:
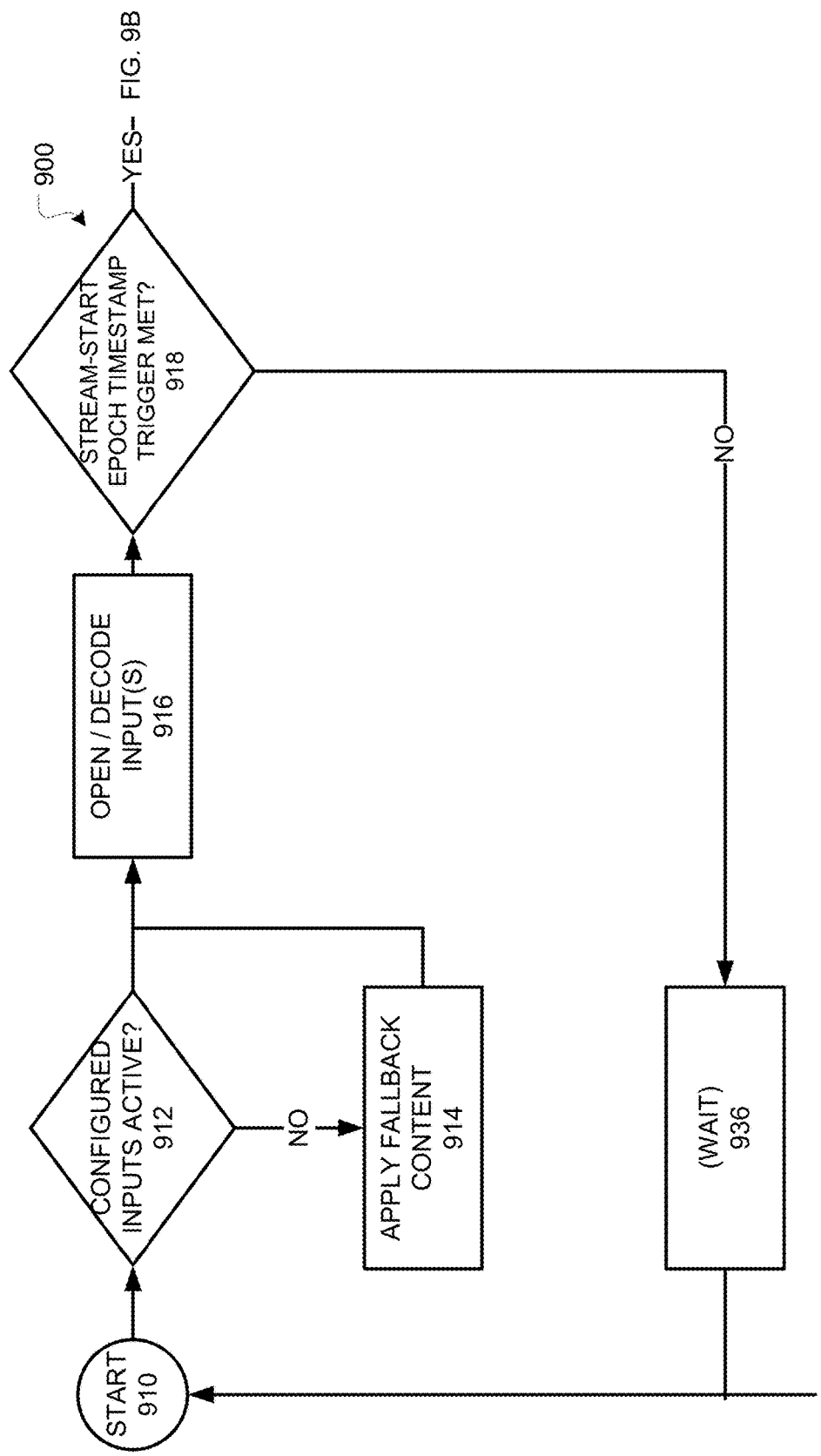

FIGS. 9A-B illustrate a process for an immersive video ingest server for implementing and ingesting content 900. The process of FIGS. 9A-B can, potentially, repeat in an endless or substantially endless loop as long as content is being prepared and ingested. FIG. 9 is a detailed flow of step 820 from FIG. 8. The process starts 910. The process then determines if the configured inputs are active 912. If the configured inputs are not active (NO), then the system applies fallback content 914 and then opens and/or decodes the input 916. The input is considered active when the media source is delivering media through the configured interface (e.g., network is receiving video packets). The fallback content can be a pre-stored content of a similar format as the expected media source (e/g/. stock video or image) that can be used if the source fails or is otherwise considered inactive.

If the configured inputs are active (YES), then the system opens and/or decodes the input 916. Once the input is opened and/or decoded 916, the system determines if a stream-start epoch timestamp trigger has been met 918. If a stream-start epoch timestamp trigger 918 has not been met (NO), then the process proceeds to wait 936, before returning to the start 910 step. If a stream-start epoch timestamp trigger 918 has been met (YES), then the process proceeds to determine if a presentation timestamp ("PTS") adjustment is required 920. If a PTS adjustment is required (YES), then the system shifts the presentation time stamp 922 before proceeding to adjust the framerate 924. If a PTS adjustment is not required (NO), then the process proceeds to adjusting the framerate 924. After adjusting the framerate 924, the system determines if custom filters have been specified 926. If custom filters have been specified (YES), then the system applies the custom filter chain 928 before proceeding to determining whether a segmenter process is required 930. If custom filters have not been specified (NO), then the system proceeds to determining whether a segmenter process is required 930. If a segmenter process is required (YES), then the system applies time-segment encoding 932 before proceeding to uploading the content to a processing engine 934. After uploading to the processing engine 934, the process can start 910 again.

Figure 7:
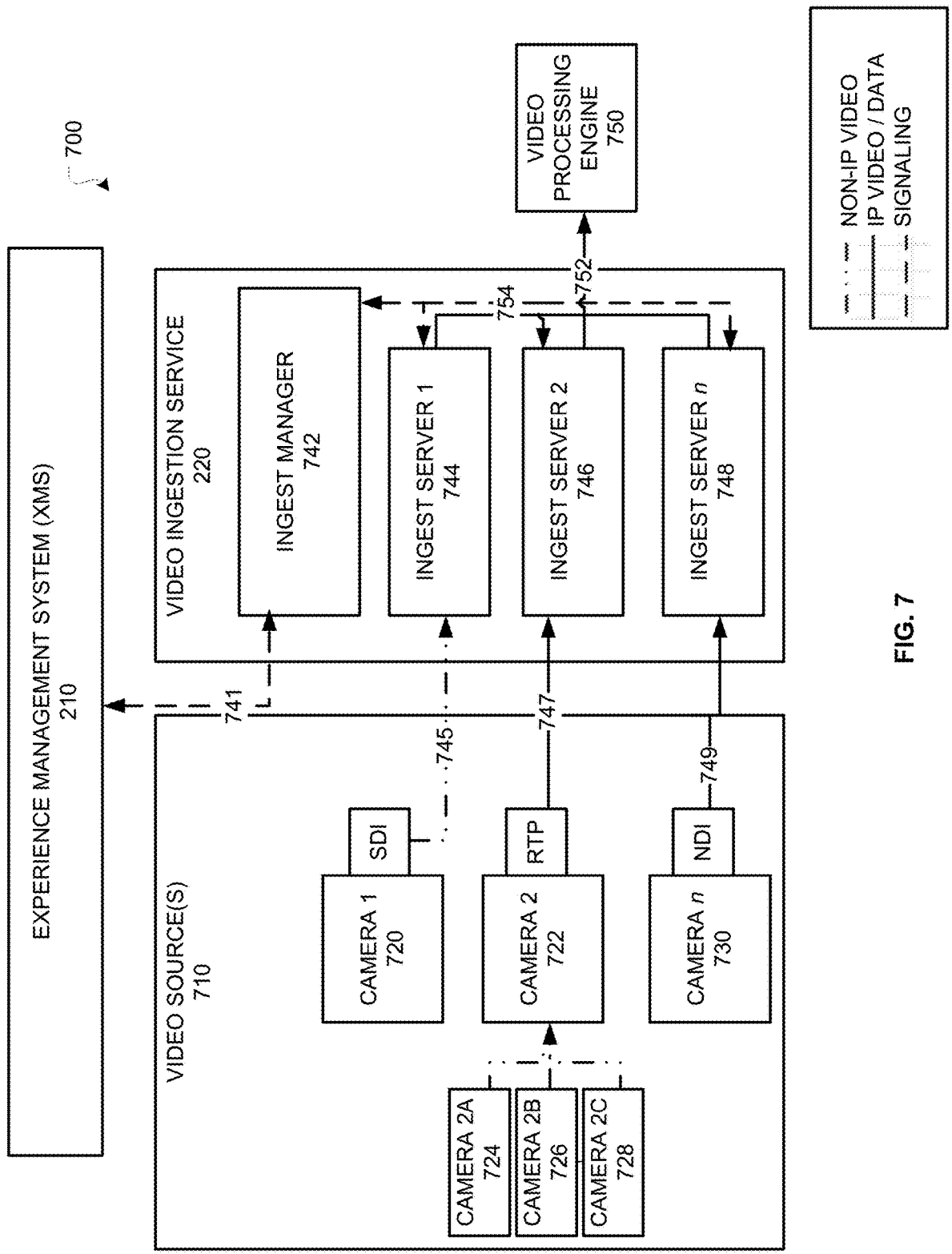
FIG. 7 is a sample architecture for an ingest serve with heterogeneous input capability.

Turning to FIG. 7, a sample architecture depicting ingest services heterogeneous input activity is provided 700. The architecture makes use of clock synchronization protocols (e.g. network time protocol ("NTP")), all the ingest servers 744, 746, 748 can be made to have the same system times, and to be in sync with the ingest manager 742. With the ingest servers having the same system times, the ingest manager 742 is configurable to issue commands to all connected ingest servers 744, 746, 748 to upload logic to initiate an upload at a specified absolute time via the stream commencement time configuration parameter 754. FIG. 7 illustrates sample system architecture configurable to depict ingest services 220 with heterogeneous input capability. The XMS 210 is in communication with a video ingestion service 220. The video ingestion service 220 has an ingest manager 742 that has a bilateral XMS-ingest manager signaling arrangement 941 with the XMS 210. The ingest manager 742 also has a bilateral ingest manager-ingest servers signaling arrangement 754 with a plurality of ingest servers, e.g., ingest server 1–n: ingest server 1 744, ingest server 2 746, and ingest server n 748. The plurality of ingest servers are in communication with a plurality of video sources 710. The video sources 710, can communicate to provide a non-ip video via a serial digital interface 745 (SDI), IP video/data via a real-time transfer protocol 747 (RTP) or IP video/data via a network device interface 749 (NDI).

As illustrated, a video source includes cam 1 720 which provides a non-IP video to ingest server 1 744 via an SDI; cam 2 722 is a live stitcher camera that receives non-IP video from a plurality of cameras such as Cam 2a 724, Cam 2b 726, and Cam 2c 728 and provides IP video/data via RTP; and cam n 730 that provides IP video/data to ingest server n 748 via NDI.

When an event commences, an absolute timestamp of commencement of the event is marked in the system in order to enable creating relative timestamps 922. Relative timestamps consider the moment of commencement of the event as zero and advance at the same pace as absolute timestamps. Relative timestamps are useful for on-demand consumption scenarios, where the content timestamps can be normalized to the relative ones instead of the epoch-base absolute ones.

As will be appreciated by those skilled in the art, as media from various sources are received, the sources may or may not have a media creation that occurs at the same time. The ingest manager 748 issues a command of start stream at time x to all connected ingest servers where x is the absolute timestamp made synchronized with NTP. NTP makes it possible to have relative assurance that the clocks of all the ingest servers are in sync down to the millisecond. All ingest servers begin their ingestion logic preparation (e.g., open/decode inputs 916) and block content from flowing through the rest of the process until the absolute timestamp trigger is met. When the timestamp trigger is met, all media outputs are assigned the same "0" timestamp at the beginning.

In case frames and/or samples from the source audios/videos are not consistent with the desired experience frame rate (e.g. frames being dropped or otherwise lost with causes for this ranging from a slight frame drop due to random transmission errors, different frame rate at the source, or even a complete outage of a video source), each Ingest server 312 will prevent sync drifting by enforcing a consistent frame rate in the adjust framerate 924 step for its stream (e.g. by. by duplicating the last frame/sample or adding filler frames/samples using a fallback pattern). Enforcing a consistent framerate ensures that, at the output of the ingestion server process, video frame rate(s) and sample rate(s) are stable. The output of the process is uploaded to processing engine 934. In this way, the system ensures that audio and video streams remain time-consistent for the end user during the duration of an immersive experience.

In some implementations custom additional filtering is needed to generate the frames or samples (e.g. by muxing multiple inputs handled by a single ingest server into a single frame with a specific frame layout). For this purpose, a custom filtering step can be added to the ingest server logic at the apply custom filter chain 928 step.

Figure 10:
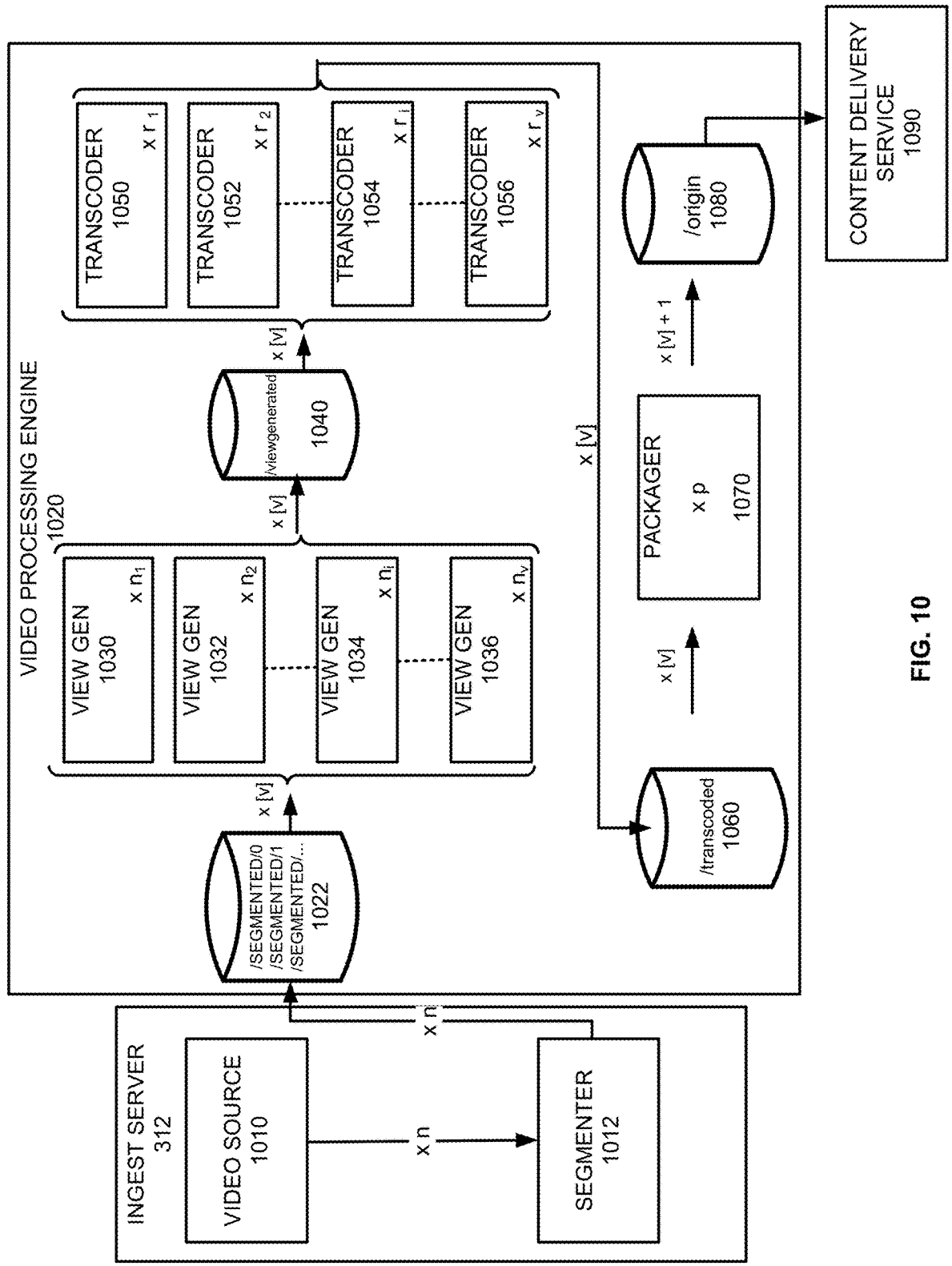
FIG. 10 illustrates an ingest server taking over segmentation function.

FIG. 10 illustrates how, in some implementations, ingest servers 312 can take into consideration the needs of purpose-specific processing engines, such as the processing engine described in US 2018/0288363 A1, by performing the time segmentation step prior to upload 932. The ingest server takes over the segmentation function originally performed by the video processing engine of US 2018/0288363 A1. In this new configuration, the ingest server 312 has a video source 1010 and during its execution 932 runs the equivalent of the segmenter step needed by the engine 1012. The ingest server 312 takes over the step of generating "time segments," and the system of US 2018/0288363 A1 skips this step, making it possible to assume the time segmentation is done by the ingest processor. This tight integration increases the precision of the synchronization process at the source, since the potential loss of packets devices from an upload of a continuous video stream is completely eliminated by changing it to an upload of a pre-segmented set of input files. This is an optional step, which means that, when the need to perform time segmentation is not present (e.g. if a system different from the one published in US 2018/0288363 A1 is used for processing), ingest servers 312 can also provide their outputs in common continuous streaming standards such as real-time protocol ("RTP"), Real-Time Messaging Protocol ("RTMP") etc., skipping the time segmentation step 932.

FIG. 10 shows detailed tasks within the preparation and ingest of content logic 105, where each ingest server 312 opens and/or decodes the input configured to it at the open/decode input(s) 916 step (e.g. from video source 1010) or applies a fallback pattern if the input is not found at the apply fallback content 914 step, then refrains from sending audio/video to one or more upstream processors until the stream commencement time configuration parameter condition is met and will start sending their audio/video feeds at the exact same absolute time until a stop signal is provided. The video source 1010 is delivered to a segmenter 1012 before proceeding to a video processing engine 1020. From the segmenter 1012, the data is transmitted to a segmented database 1022. From the segmented database 1022 a plurality of views are generated 1030-1036. The plurality of views 1030-1036 are delivered to a view generated database 1040 and then provided to a plurality of transcoders 1050-1056. The plurality of transcoders 1050-1056 is delivered to the transcoded database 1060 before being provided to the packager 1070 and then the origin database 1080.

The ingest logic in FIG. 10 runs for n sources and x times. Each of the n sources can be split into v viewports and each viewport can be separated into r representations. The packager process takes the v viewports and processing the viewports for optimized transmission. Each of the viewports can be transcoded into several representations. The packaging step provides a way for streaming servers to signal the contents of the files for consumption in standard protocols such as HLS or MPEG-DASH.

Within the remote processing engine 1020, once the adjustment of the time segmentation step is performed 1012 so that the step can be performed externally, the reuse of the workflow is complete, since each of the uploaded inputs is treated as a separate set of viewports by the video processing engine 1020, with all viewports (e.g., view gens 1030, 1032, 1034, 1036) being considered as a single experience stream at the packaging step by the packager 1070, which allows the content delivery service 1090 to still consider the input as a single stream package.

Ingest servers 312 in the system can receive audio/video signals into the XMS 210 from several different and heterogeneous sources. Some examples of the different characteristics that can be accepted in the system are:

Stream type: depending on the type of immersive videos, it might be possible to user a camera feed directly (e.g. 180 degree videos can be done using a fisheye lens and taking that feed directly from the camera), or it might be necessary to have various levels of re-projections and pre-processing (e.g. to compose a single equirectangular panorama image, or to embed visual effects into the camera signal). In the case of audio, it might be possible to use direct microphone sources, or to go through a mixing system to produce surrounding or positional audio (e.g. ambisonics, which provides a full-sphere surround sound format).

Intended projection: audio/video ingested for the experience can be shown or projected different ways. For example, some video streams might be intended for a flat screen, others video streams for a 180 video and still others for 360 video projections.

Transmission protocol: both IP-based (e.g. RTP, RTMP, network device interface ("NDI") and non-IP-based (e.g. high-definition multimedia interface ("HDMI"), serial digital interface ("SDI")) video transmission protocols can be used as source for the videos.

Codecs: input audios/videos might be encoded with different codecs

Frame rate/Sample rate: At the input, videos of various frame rates/sample rates can be ingested.

Inherent signal delay: As explained before, the distributed system will start all streams at once. But it is still possible that the source streams present delays with each other that cannot be otherwise controlled. In that case, the ingest server can perform delay adjustments (either forward or backward) prior to upload. This final step can be verified using the video sync monitor Any combination of these variables can be mixed for a single experience. To provide a concrete and descriptive example scenario, in FIG. 7, an example is depicted where flat videos at 1080p (1920 x. 1080 px) resolution at 30 frames per second delivered from camera 1 720 over serial digital interface (SDI) 745 which can be ingested together with 360 videos from camera 2 922 of 8K resolution and 60 frames per second encoded with H.265 codec and delivered over RTP 947 and yet other 4K video from camera n 930 might arrive over NDI 949. As explained before, ingest servers 312 handle a plurality of data received from input sources by uniformizing time-sensitive elements such as video frame rate or audio sample frequency to a predetermined set of values.

Uniformizing time-sensitive elements provides flexibility and improves the ability of the system to adapt in the environment of delivering a live event in a wide range of production challenges and circumstances while maintaining a multi-camera synchronization.

The logic and workflow created in the disclosed methods to ingest and process synchronized immersive video can also be applied to several other types of media that are different from audio/video media. Each of these different media types are handled by ingest servers 312 configured and able to ingest that specific media type. The system requires that ingested media ingested is tied with a metadata element to track the media creation time which is called a timestamp (e.g., the same epoch-based absolute and relative timestamps used for audio/video can be used for this type of content, which helps to keep the consistency across all elements). Ingest servers 312 then pass this information, or generate and append the information if the source media does not have it, to an appropriate and/or associated content processor for the media type. Several mechanisms can be used to tie this metadata to the media, including:

Embedding in file structure (e.g. creating files and/or folders with the epoch times of each instance of the media being ingested). This approach is more suitable for sample-based media elements such as images or 3D models.

Appending to data objects (e.g. by adding the timestamp field in data feeds).

Similar to what happens in the case of immersive video, certain media formats can become too heavy and/or too complex for a client device to reproduce at an adequate level of performance if the media is kept in its original format, especially in the context of an experience that is likely to be intensive in its usage of network and multimedia resources due to immersive video that already requires optimization techniques to be shown at the desired levels of quality.

Figure 11:
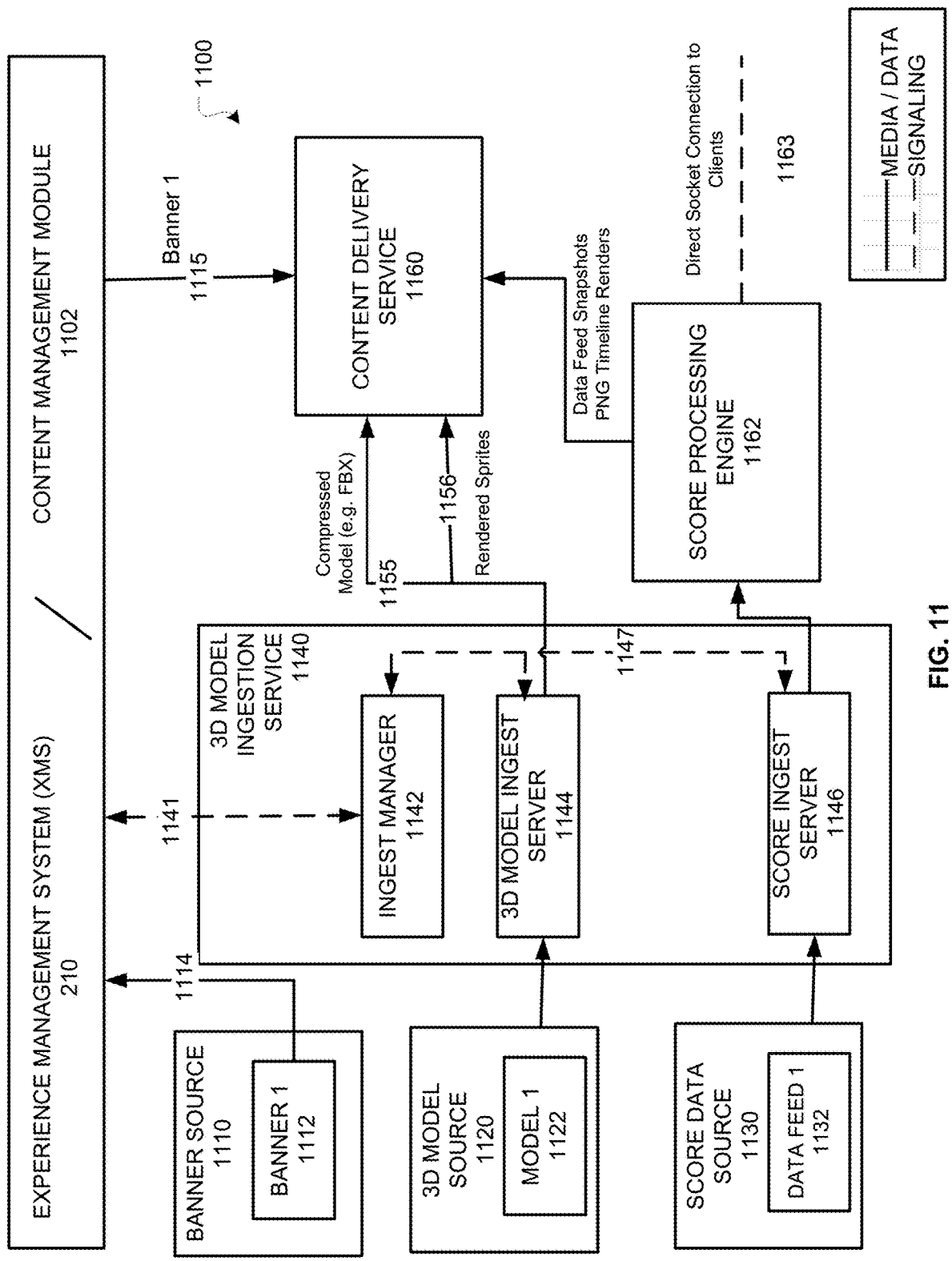
FIG. 11 illustrates alternative media nodes.

FIG. 11 depicts how the disclosed method differs from and improves the logic disclosed in US 2018/0288363 A1 and considers in its workflow the existence of mechanisms to facilitate rendering/playback of a media asset by changing the media asset format to a lighter type of media. More specifically, FIG. 11 illustrates alternative media nodes 1100: images, 3D models and data feeds. XMS 210 system is a content management module 1102. The type of output media can range from output with simple modifications without changing the original media type (e.g. compressing textures, resizing images, transcoding video, image filtering) to output where the base media type has been transformed or converted (e.g. transforming a 3D object into a flat sprite). The step of transforming media can be taken by remote processing engines 224, or by ingest servers 312, depending on factors such as the computational complexity of the transformation, bandwidth requirements both at the uplink and downlink, desired computing footprint at a venue, data security, among others. For example, the pre-processing step for dynamic statistic stats and charts for a sports event can be done by an ingest server 312 at the venue if the chart processing is light (as in the case of generating at regular intervals stills of the chart in formats such as portable network graphic ("PNG") or joint photographic experts group standard ("JPEG")), or if the source data for producing the chart is only available on a local private network. Alternatively, remote engines can be used to generate the data feeds or image-based stills of the desired score visualization.

In some implementations, ingest servers, such as ingest servers 312 in FIG. 3, may allow more than one pre-processing workflow for a given input asset, which is particularly useful to create cascading rendering paths for the input asset while maintaining synchronization. For example, given a 3D model source 1120 taken as input from Model 1 1122 to 3D model ingest server 1144 in FIG. 11, two pre-processing workflows can be assigned to be performed to the 3D model input before delivery to the content delivery service 1160: a first pre-processing workflow that compresses the input asset as 3D model 1155, keeping the input asset as a 3D model; and a second pre-processing workflow that creates a flat sprite of the input asset, which is the considered a "cascade" of the first 1156. In runtime, depending on runtime-specific considerations by the client, one of these rendering paths for the two pre-processing workflows will be chosen to be displayed.

As will be appreciated by those skilled in the art, certain media types do not change over time (e.g. static images or 3D models that do not move), and it might be interesting for the end user experience to include the static elements (static media) for creative reasons. The methods allow for ingestion of static elements. For static media, an ingest server, such as 3D model ingest server 1144, may not be needed for pre-processing (e.g. the case of a simple image, which is so simple that no ingestion control is needed). The XMS system allows for the inclusion of these static elements, for example, from banner 1 1112 from banner source 1110, which can be delivered via media/data path 1114 to the XMS 210 and then from the XMS 210 to the content delivery service 1160 via media/data path 1115 in a presentation manifest.

The overall creation of the experience to be consumed by a user is coordinated with an XMS 210, where media elements forming part of the augmented experience are defined, configured and structured for consumption.

The 3D model ingestion service 1140 and ingest manager 1142 can have a direct two-way signaling 1141 relationship with the XMS 210. Additionally a score data source 1130 with a data feed 1 1132 can provide media/data 1134 to core ingest server 1146 which is part of the 3D model ingestion service 1140. The score ingest server 1146 can have a two-way signally relationship 1147 between the ingest manager 1142 and the 3D model ingest server 1144. Media/data can also be provided from the score ingest server 1146 to the score processing engine 1162 before delivery to the content delivery service 1160. Mediate/data transfer 1162 between the score processing engine 1162 and the content delivery service 1160 can provide data feed snapshots and PNG timeline renders. The score processing engine 1162 can also have a signaling relationship 1163 that provides a direct socket connection to client devices.

Figure 12:
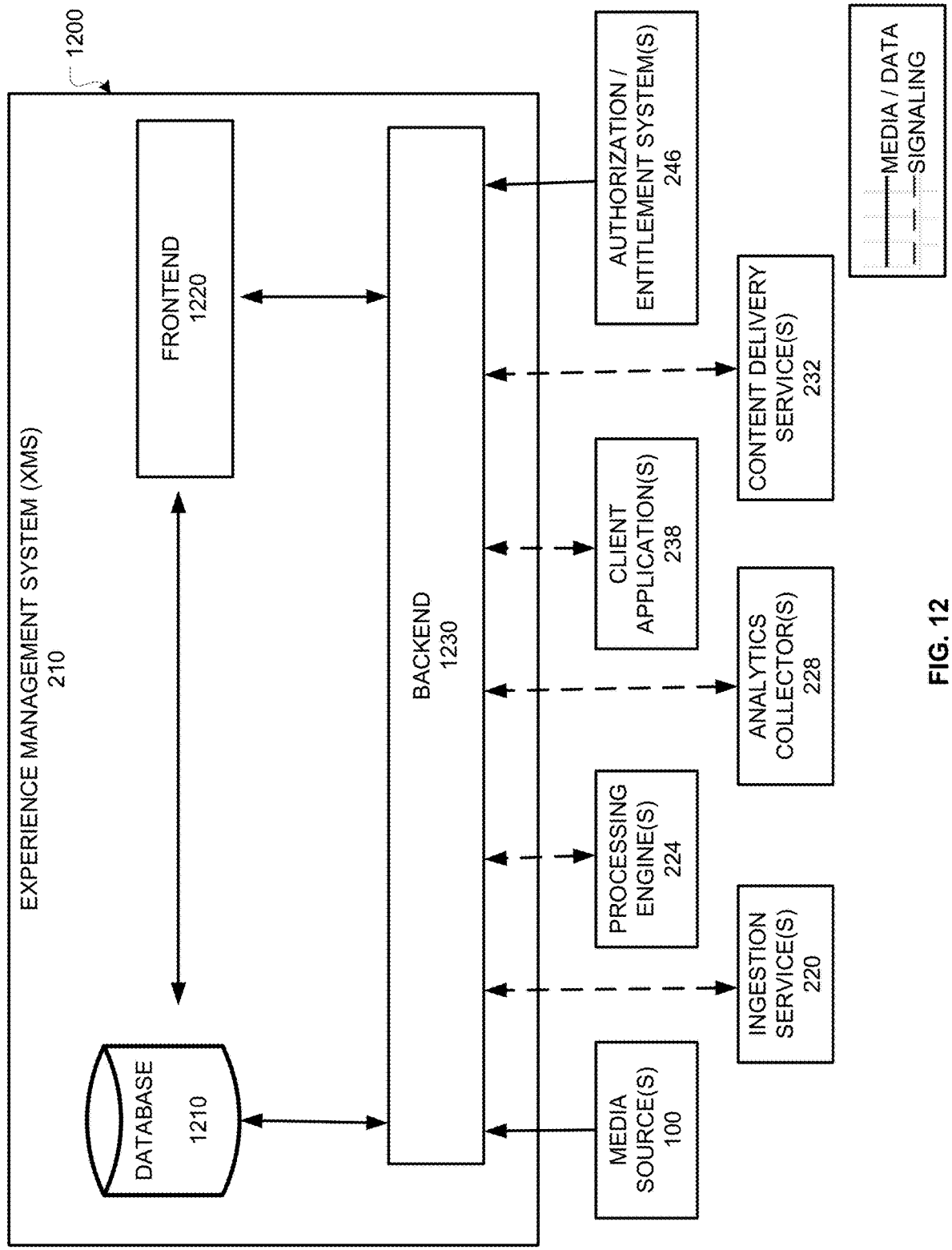
FIG. 12 illustrates exemplar main internal components for an experience management system.

FIG. 12 illustrates elements connecting the XMS main internal components 1200. Main XMS 210 components include: database 1210, frontend 1220 and backend 1230 XMS servers. The database 1210 provides media and/or data to the front end 1220 and the backend 1230. The database 1210 also receives media and/or data to the front end 1220 and the backend 1230.

The XMS backend 1230 is the element in the architecture with visibility across all resources of the experience delivery workflow, and with the ability to link them in a workflow. The XMS frontend 1220 provides a user-friendly access to the system capabilities, typically in the form of a multi-device interface (web, mobile and desktop forms, among others, depending on the nature of the task required to manage: web for administration, mobile for monitoring, desktop for on-site production), from which the modules of the XMS can be viewed and controlled. The XMS frontend 1220 connects to the XMS backend 1230 to obtain information about the available ingest managers, processing engines and delivery methods, and allows production users to define experiences combining these elements. The XMS frontend 1220 provides role-specific access in their modules, so each of the modules (overall system administration 1322 or management, content management 1324, client experience management 1328 and analytics 1330) can be accessed by the appropriate set of users. The authentication and authorization flows in the frontend 1220 can be either within the system itself, or delegated to a third party using standard protocols such as Oauth2.

The backend 1230 receives media/data from media sources 100 and authentication/entitled systems 246. Additionally, the backend 1230 has a two-way signaling relationship with ingestion service(s) 220, processing engine(s) 224, analytic collector(s) 228, client application(s) 238, content delivery service(s) 232, and authentication/entitled system(s) 246.

Figure 13:
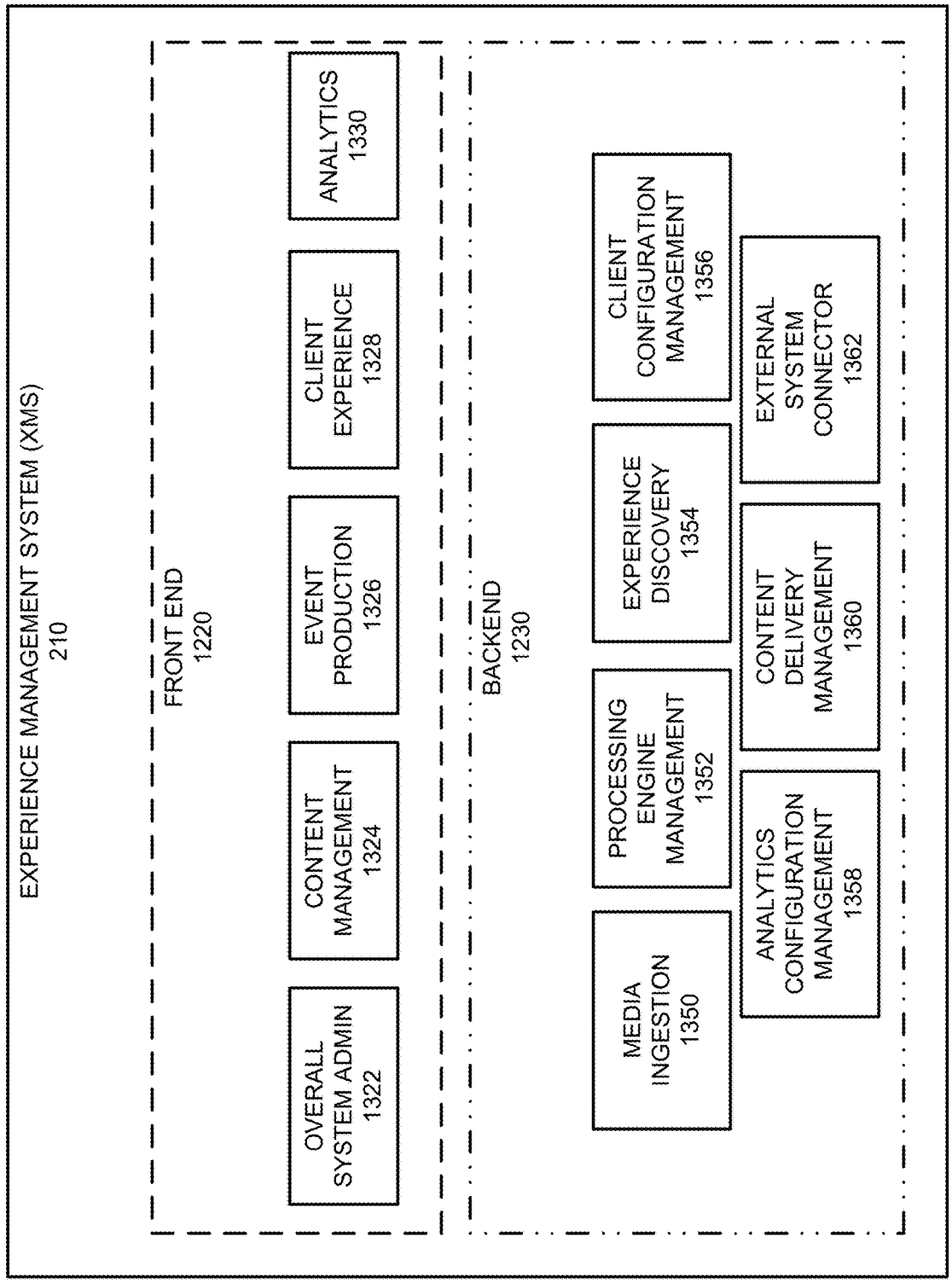
FIG. 13 illustrates main modules within components for an experience management system.

FIG. 13 shows the main XMS modules within components of the experience management system. The XMS 210 system has a front end 1220 and a backend 1230. The front end 1220 has an overall system admin module 1322, a content management module 1102, an event production module 1326, a client experience module 1328 and an analytics module 1330. The backend 1230 has a media ingestion modules 1350, a processing engine management module 1352, an experience discovery module 1354, a client configuration management modules 1356, an analytics configuration management module 1358, a content delivery management module 1360, and an external system connector module 1362.

The frontend 1220 of the XMS 210 has an overall system admin module 1322 that is used to register and link the various media inputs (both when connected to ingest servers and when delivered directly to the XMS) to content processing engines, delivery mechanisms, and to specific sets of devices and experiences. As will be appreciated by those skilled in the art, the exact linking between components and modules depends on the type of media being transferred, with some media (such as immersive video) coming from a processing engine and other media (such as plain images) being passed directly. These registering and linking operations are managed in the overall system admin module 1322 of the XMS. The elements that can be connected and managed by the XMS 210 include the following:

Media sources 100 directly, when the media is simple enough (e.g. plain images for static banners, or non-live on demand videos);

Ingestion services 220, via the ingest manager node, which are in turn connected to one or more ingest servers. Typically, one ingest manager is needed for each live event streamed. The ingest manager provides the XMS backend with information on the types of media contained within the manager's context;

Content processing engines 224. The processing engines provide information to the XMS backend about their overall health and work load status;

Analytics services 228: For data visualization purposes, the analytics modules 1330 can connect to one or more big data/analytics services form where to extract and visualize the information collected by the various nodes comprising the experience. Note the client information is the most relevant component to data analytics in this use case, but not the only one, as ingestion, processing and delivery nodes may also report back about their health status for visualization;

Content delivery services 232 such as content delivery network ("CDN"), which can be linked to media inputs and processing engines 224;

Client applications 238, for orchestrating content discovery: the decision of configuration parameters depending on various parameters such as device characteristics, location, or underlying operating system, as well as for determining the endpoints to which they will deliver analytics data;

Optional external systems such as those for authentication, authorization and entitlement 246, which provide, when necessary, supplementary information about the rights a specific user has to open a determined experience. The logic for determining the permission is not part of this method, only the ability to obtain a final GO/no-go from these external systems.

Basic and standard internal user management workflows are also part of the overall system admin module 1322.

As discussed above, FIG. 3 illustrates an overall hierarchy of nodes within the ingest system 300. The ingestion service 220 has an ingest manager 310. The ingest manager 310. The ingest manager 310 has one or more ingest services 312, one or more ingest monitors 314, and/or one or more auto-pilot controllers 316. The system is normally controlled by dedicated server nodes denominated ingest servers 312.

The content management module 1324 of the XMS 210 allows the system to manage various ways in which a plurality of media can be added to an experience:

The simplest way is the direct media source connection, which consists of a direct file upload, which will be shown as-is to the end user regardless of form factor. This is restricted to the simplest of media, such as plain text files or images, or non-live on demand videos provided, for example, by banner source 1110 in FIG. 11.

The next way is to connect ingestion services via ingest managers 312, which occurs through standard IP-based networking and application layers (with HTTP REST Application Program Interface ("API") for session control and websocket for continuous signaling information streams being the most common ones). Ingest managers periodically inform about the existence, configuration status and health of local ingest servers to the XMS backend. This information is exposed by the XMS backend to XMS frontend for setting up live events with the event production module 1326. With this information, it is possible in the XMS system to alter aspects of the configuration of individual ingest servers, and to propagate this configuration changes from the XMS system to the intended individual ingest servers 62, doing so again with standard IP-based transmission protocols for this purpose (e.g. PUT HTTP API endpoints).

Content delivery mechanisms are also controlled in this module by, for example, content delivery service 1160. The connection between the XMS and the delivery nodes consists of a similar set of parameters to those for Ingest managers, mostly aimed to connecting to CDNs. The entry endpoints for delivery methods tend to be file transfer protocols such as secure file transfer protocol ("SFTP").

The connection with content processing and delivery engines is definable by parameters including, for example:

Content entry endpoint: end endpoint in which the content processing engine/delivery service is expecting its input data.
  a. Location specification (e.g. a uniform resource locator ("URL"), or an IP+folder location)
  b. Protocol (e.g. SFTP, HTTP PUT, or proprietary protocols like those of Amazon® Application Web Services ("AWS") S3 API)
  c. Credentials (if needed, in the form of username+password, secure shell ("SSH") certificates, or equivalent)

Type: what type of content is this node suitable for

Status API: the endpoint in which the node reports about its status.

The client experience management module 1328 in the front end 1220 of the XMS 210 allows control over how client applications managed by the system discover and present experiences defined in the system to the user. In some implementations, this module is further subdivided on the backend side into client configuration and content discovery in the XMS backend:

The client configuration module 1356 caters mostly to bootstrapping the client application with the best fitting set of configuration parameters. The best fitting configuration parameters depends on factors related to the specific hardware/software characteristics of the user's device, the physical location of the user (e.g., where in the world the user is located), the form factor used to access the media (e.g. VR headset, mobile phone, desktop personal computer ("PC") or Smart TV). The bootstrap process initializes various performance parameters controlling network use, playback, rendering and reporting. This step ensures the system retains a way to fine tune performance centrally while deploying to a large scale of experiences to a large number of devices around the world.

The experience discovery module 1354 covers two discovery steps: the first discovery step pertains to visibility on the client application menu (in some implementation where the system controls the end user application, this first aspect is relevant). The second discovery step pertains to the experience features available in each individual experience. Aspects such as video feeds available, camera change maps, dynamic graphical elements, content layout, display timeline of dynamic elements, autopilot programs available, content availability window and metadata about content.

Business rules can be defined in the XMS backend 1230 to control access to aspects of the content discovery layout (e.g. allow/restrict access to specific experiences, modify appearance and/or layout of discovery menus, enable/disable experience features) according to various client-specific criteria (e.g. user identity, geography, type of device, time, random factors for A/B testing).

An important task of the client experience management module 1328 is to expose to the client application an application programming interface (API), which is treated by the client device(s) as a signaling file, describing the processed media elements available for a specific experience, as well as details on how to present the processed media elements. This file is called the experience presentation manifest. The elements that can be present in an experience presentation manifest are illustrated FIGS. 14-20C and are described in the following paragraphs.

A list of the media elements or descriptors available for experience by the user via the methods and processes of the system include:

For a URL of a main immersive video experience streaming manifest (see FIG. 14) of the experience presentation manifest—the system is centered-around video, and thus experiences processed in the system will typically include a streaming manifest for what is considered to be the "main" experience for the user. The playback timestamps of this video can be considered by the system as the main synchronization time code.

For a secondary video URL for other media in an experience presentation manifest (see FIG. 15)—the experience can contain secondary video experiences (e.g. to see satellite content such as highlights of a match within a live stream).

2D sprite—flat images, or animated sprites.

Dynamic graphics: data feeds (or image feeds) for graphics dynamically updated (e.g. feeds for scores and stats about a game, feeds from social media).

3D model—URL to the 3D model in a format friendly to display in headsets (e.g. fbx, GL Transmission Format ("glTF")).

Audio effects—custom audio effects aside from those present in the main or secondary videos.

Each media element other than the main video may contain metadata on how it should be rendered. These metadata tags are a set of common flags shared with the client-side dynamic asset renderer. For example, 2D sprites, 3D models and data feeds may each have their own specific implementation for rendering.

A media descriptor may include a specification on "cascading" rendering paths, which means that a concrete media element may be rendered by different paradigms and levels of quality, leaving the decision of which rendering path to use to the client device. This decision will be taken based on technical (the device's own capabilities, network conditions) and business (user preferences, authorization flows, paywalls) aspects.

For example, FIGS. 16A-B illustrates other media with multiple rendering paths suitable for 3D models and data streams that are part of the experience presentation manifest. FIGS. 16A-B shows how a media element having a map of a stadium court can be described as having three rendering paths: a detailed 3D model, a simplified and compressed model, or as a flat sprite. As another example, a dynamic graphic of a score can be described as having two render paths: one as a client-generated graphic (for which the client will need a data feed only), and another one a periodically updated set of sprites.

A declaration of available timelines within the experience can also be part of the experience presentation manifest. For example, a list of different possible time scales that can be used in the experience to evaluate when to display elements as shown in FIG. 17. Some examples are:

Video timestamp—use the presentation time stamps of the video, useful when synchronizing events to a real-time feed. Both "absolute" and "relative" timestamps can be used, with absolute timestamps being more common in ongoing live events, and relative timestamps being more common in on-demand contents.

Device time—useful for events that may not be necessary to sync with a main video, but with the present real-time. Using device time can be useful for non-video experiences.

Experience/App timer—a scale measuring the time spent in a specific experience, or in the app as such.

Declarations of autopilot programs can also be part of the experience presentation manifest. FIG. 18 illustrates a list of possibly available autopilot programs and associated data endpoints.

Presentation element descriptors: The specification of how the media described in the media descriptors section will be shown during the experience. Some of the aspects controlled in this section are:

Which graphics will be shown (reference to one or more media elements in the descriptors zone)?

Where will the presentation element be shown (position, scale, rotation, camera positions)?

When should the presentation element be shown (timing, time scale used)?

How should the original element be adjusted before showing (alpha, custom shading application)?

How should the element appear/disappear (transition specification)?

What interactions does the presentation element allow, and how does it affect other parts of the experience (interaction specifications)?

FIGS. 19A-B illustrate an example of a declaration of an actionable camera change map for an experience presentation manifest. FIGS. 20A-C illustrate a declaration of highlight alternative video with an actionable hide button for an experience presentation manifest.

In some implementations, a set of built-in media elements are added to the experience manifest by default in the client application, without the need to declare them in the presentation manifest. These media elements have reserved identifier values that can be used in presentation descriptors. This allows a rich set of common elements (e.g. buttons, headers) as prefabs to use when building an experience, making it easier for users employing the event production module 1326 and client experience module 1328 of the XMS 210 to design sophisticated interactions with ease. This approach also allows a reuse of common graphical elements in multiple parts of the experience (e.g. the same button being used in several sections).

The experience manifest can be modified and updated at any point of an event. This is useful to allow for mid-event updates and changes if necessary. This capability also produces the flexibility to add or remove elements to the experience, or experiment with different configurations as an event progresses. Upon reload, the client app will re-parse the experience manifest searching for new and deleted elements, then apply the presentation logic instructed in the new version of the manifest.

In some implementations a full-blown client application is part of the system. This application is responsible for presenting the full menu of possible experiences to the end user 1000 and, upon selection, open the adequate immersive experience 1001. In other implementations, this application is handled outside of the context of this method, with player from this mechanism being bundled in these externally developed applications as a software development kit ("SDK"). The playback in both scenarios is handled by the same component once an experience begins.

For the situation where the system manages the entire user experience, the client experience module 1328 of the XMS exposes an endpoint API (using standard technologies such as REST API) with the specification of the elements to be presented as possible experiences for the user. External systems for authentication and authorization may be used within the system to dictate the decision to present specific experiences: content discovery requests may be forwarded to these systems to perform an entitlements check prior to returning the menu response.

The endpoint (see an example discovery endpoint illustrated in FIGS. 21A-B) comprises a listing of the available experience, with metadata detailing some of its characteristics. In some implementations, external standard metadata databases may be integrated in the XMS content management module 1324 to enrich this metadata with information collected externally. The client application ("client app"), upon bootstrap, requests this endpoint 1000, and upon receiving 1001, parses it to construct the user interface.

Figure 22A:
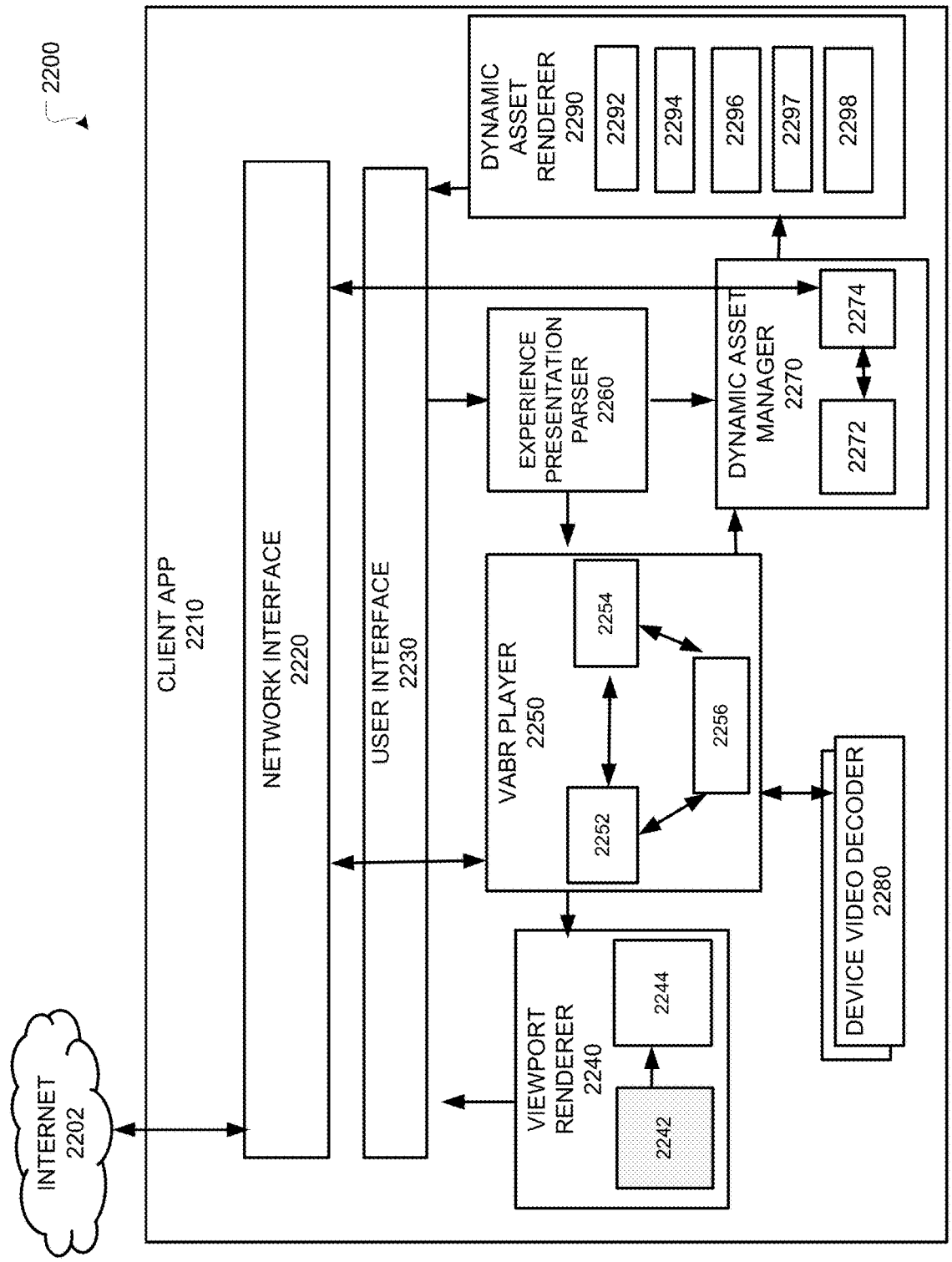
FIGS. 22A-B illustrate an overall client stack and components.
Figure 22B:
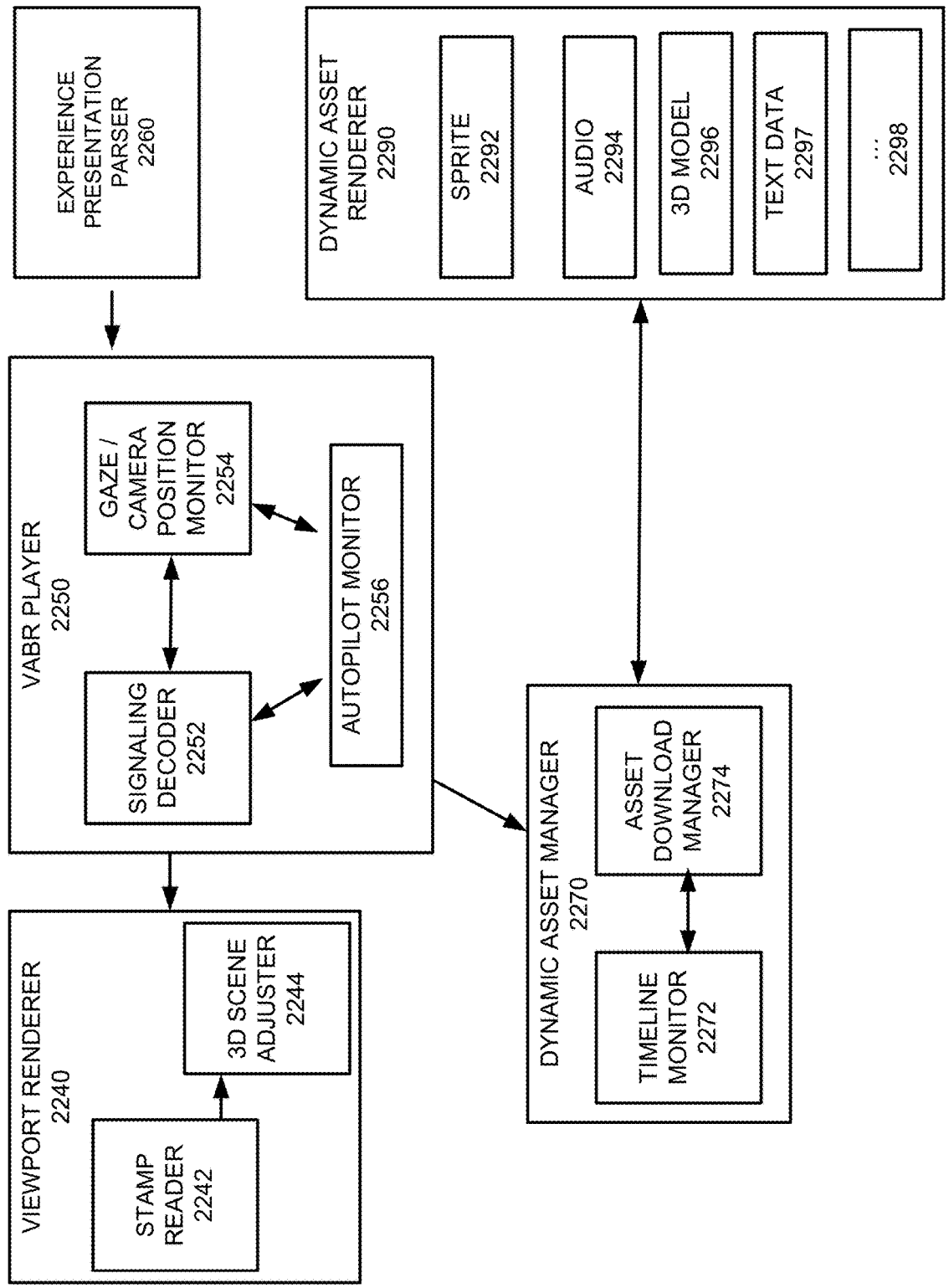

FIGS. 22A-B show an overall client stack 2200 usable in the disclosed method. Once an experience has been selected 1101, the client app 2210 will begin by fetching and parse the experience presentation manifest. This is performed by the experience presentation parser component 2260. The modules are shown in more detail in FIG. 22B.

The client app 2210 includes a network interface 2220 and a user interface 2230. The client app 2210 and the network interface 2220 are in communication with the internet 2202 A view port rendered 2240 having a stamp reader 2242 in communication with a 3D scene adjustor 2244 is provided which is in communication with the user interface 2230. A VABR player 2250 is provided that has a signal decoder 2252 in two-way communication with a gaze/camera position monitor 1154 and an autopilot monitor 2256. The VABR player 2250 provides data to the viewport rendered 2240 and is in two-way communication with the network interface 2220 and one or more device video decoders 2280. An experience presentation parser 2260 can receive data or input from the user interface 2230 and provide data or input to one or more of the VABR player 2250 and the dynamic asset manager 2270. The dynamic asset manager 2270 has a timeline monitor 2272 in two-way communication with an asset download manager 2274. The asset download manager 2274 is also configurable to be in two-way communication with the network interface 2220. A dynamic asset renderer 2290 has a sprite module 2292, an audio module 2294, a 3D model module 2296, text data 2297, and one or more additional modules 2298. The dynamic asset renderer 2290 is configurable to receive data or input from the dynamic asset manager 2270 and to provide data or input to the user interface 2230.

An element of the presentation manifest of the client stack 2200 is a main immersive video element, which is passed from the experience presentation parser 2260 to the virtual reality-adaptive bitrate ("VABR") player 2250 (as described in further detail in US 2018/0288363 A1) which allows for an adaptive playback of the immersive content. The way the VABR player disclosed in US 2018/0288363 A1 works is mostly unchanged: Manifest request and parsing occurs as data is transferred between the network interface 2220 and the VABR player 2250, decoding of signaling information on the available immersive viewports occurs via the signaling decoder 2252, video decoding occurs as data is transferred between the VABR player 2250 and the device video decoder 2280, constant monitoring of the gaze and camera position occurs via the gaze/camera position monitor 2254 of the VABR player 2250, 3D geometry adjustments to properly present optimized video which occurs when data is communicated from the VABR player 2250 to the viewport renderer 2240 and from the viewport renderer 2240 to the user interface 1100 all remain unchanged.

Figure 23B:
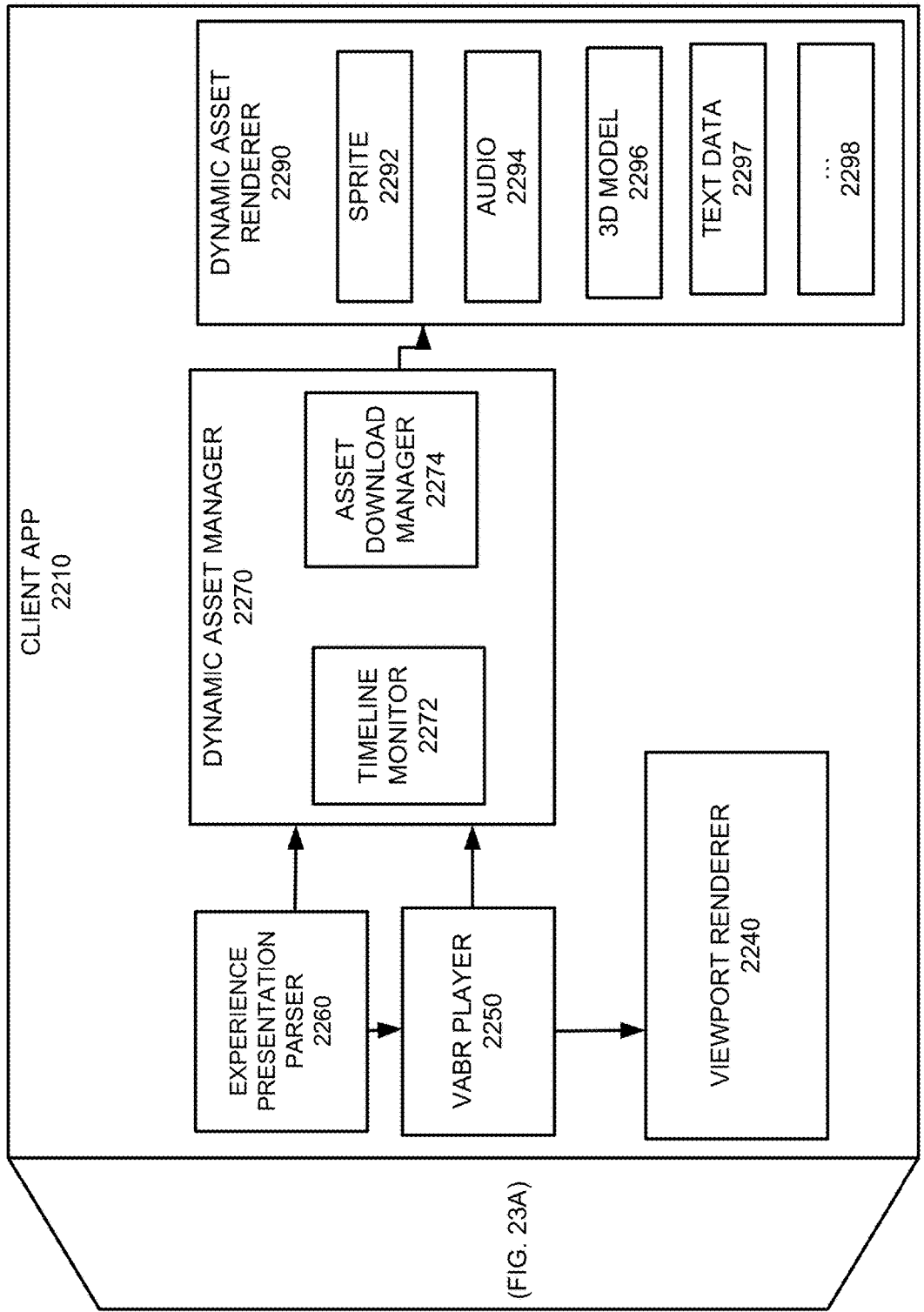

As shown in FIGS. 23A-B, two additional components are added to the experience client stack of FIG. 22 to complement the proper presentation of experiences.

Dynamic Asset Manager 2270. The component in charge of monitoring various aspects of how the experience is being consumed (e.g. time spent on the experience, time stamps according to the various timelines defined for the experience, current active camera), in order to determine which assets to download next and which ones to prepare for start/stop rendering.

Dynamic Asset Renderer 2290. The component in charge of presenting the dynamic assets to the user, in accordance with the indication of the asset manager. Specific renderers per dynamic media type are defined.

As the timeline monitor 2272 within the dynamic asset manager 2270 detects that a given asset is approaching its presentation time (determined by at least one of the timelines reaching a threshold of proximity with the present), the timeline monitor 2272 signals the asset download manager 2274 to begin fetching the asset from the network interface 2220 of the client device in communication with the network interface 2220 via the internet 2202. Effective bandwidth available (defined at the total bandwidth available minus the bandwidth consumed to keep the main video running at the currently gazed bitrate) and device rendering capabilities (in the cases where more than one rendering path is available) are considered in this decision.

A caching mechanism is implemented in the asset download manager 1174 upon reception of the asset to allow for reuse of common assets and gain efficiency of network resources. Thus, if the same asset is used in different moments of the experience, the asset download manager 2274 can opt to use a locally cached version of an asset instead of re-fetching the asset from the network. Cache hit criteria can follow different logics, with fingerprinting of the asset (via well-known hash mechanisms such as MD5) being the most common implementation.

A local lag mechanic is implemented in the system to provide the advantage of avoiding out-of-sequence events form any of the media types presented as dynamic assets to leak information that could potentially be detrimental to the emotion. For example, if a social media feed is ingested as a data stream and timestamped by an ingest server within the system, the presentation times for messages of key moments such as a goal in a football match are kept in sync with the adequate time the goal happens in the video stream, thus the surprise of the event is not spoiled by external data sources.

Figure 24:
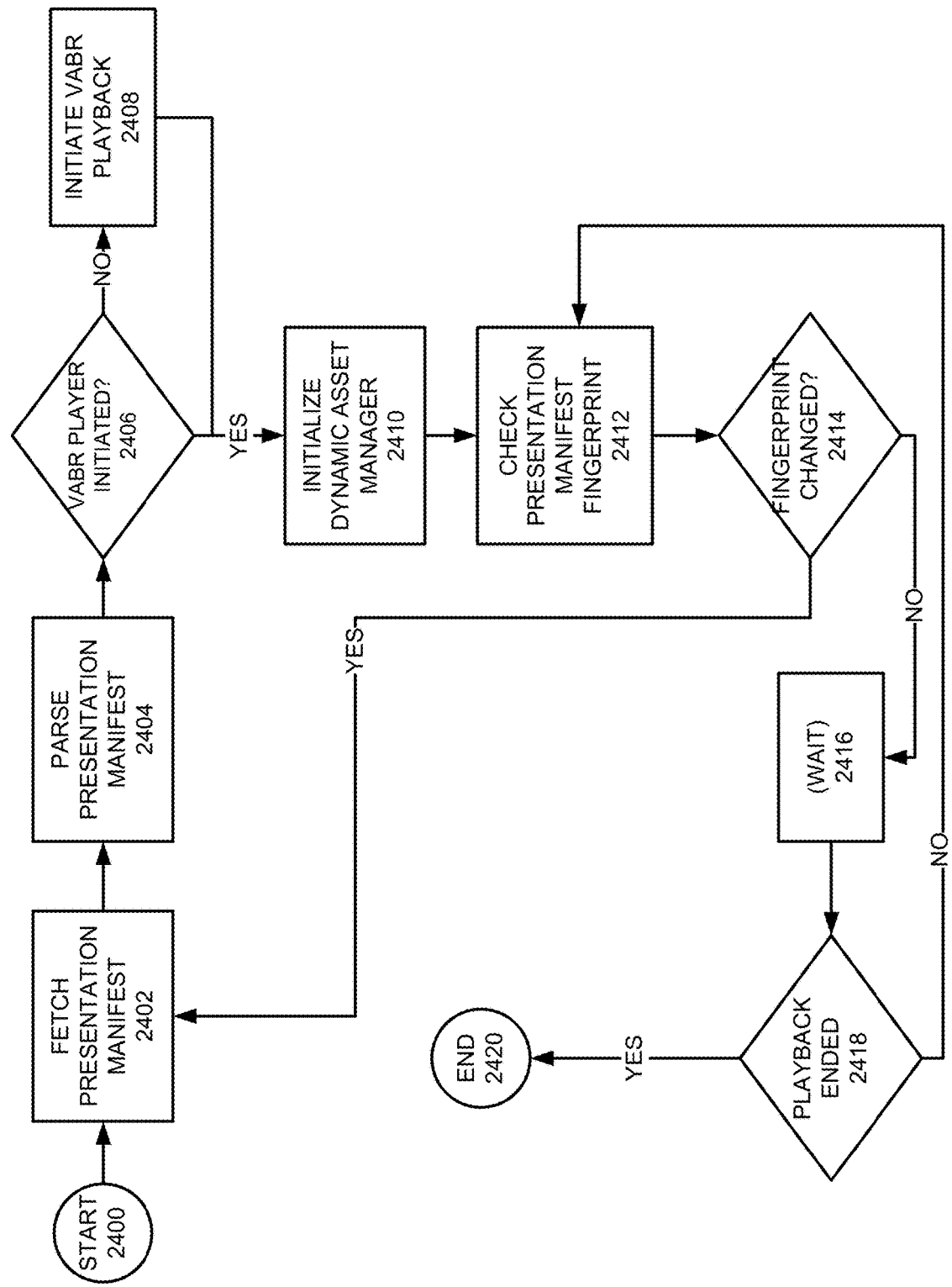
FIG. 24 illustrates a presentation manifest management within a client app.

As mentioned previously, when introducing the experience presentation manifest format, this endpoint can be reloaded throughout the experience. Suitable logic for a presentation manifest overall lifecycle within a client is depicted in FIG. 24: After starting 2400 the basic lifecycle of the presentation manifest overall lifecycle within the client device comprises an initial fetching of the contents at the fetch presentation manifest 2402 step, the initialization of both VABR player 2408 and dynamic asset manager 2410, and of a continuous check for updates in the fingerprint of the presentation manifest 2412, using well known hashing algorithms such as MD5 to determine if the contents of the endpoint have changed, triggering a re-fetching if necessary. The main VABR player is only initialized once, but the dynamic asset manager may be re-initialized one or more times in response to new content.

In addition to a multi-camera capability, the system also provides an "autopilot" capability, where the selection of camera angle at the client side is done automatically, as the content progresses, instead of requiring a manual selection from the end user. This can be useful for end users who may wish for a less interactive and more relaxed viewing experience. For example, focus the attention on a specific athlete, actor, band member, team or member, or simply on what the event producers define are the most relevant angles.

From the start 2400, the process fetches a presentation manifest 2402. The fetched presentation manifest is then parsed 2402. If the VABR player is not initiated 2406 (NO), the VABR playback is initiated 2408 and the process proceeds to initializing the dynamic asset manager 2410. If the VABR player is initiated 2406 (YES), then the process proceeds to initializing the dynamic asset manager 2410. After initializing the dynamic asset manager 2410, the presentation manifest fingerprint is checked 2412. Once the fingerprint is checked, the process determines whether the fingerprint has changed 2414. If the fingerprint has not changed (NO), then the system waits 2416. Suitable waiting time is less than a second. Other wait times can be used without departing from the scope of the disclosure. After waiting 2416, the system determines whether playback has ended 2418. If playback has ended (YES), then the process is ended 2420. If the playback has not ended (NO), then the process returns to the process of checking the presentation manifest fingerprint 2412. If the fingerprint has changed (YES), then the process returns to fetch the presentation manifest 2402.

Figure 25:
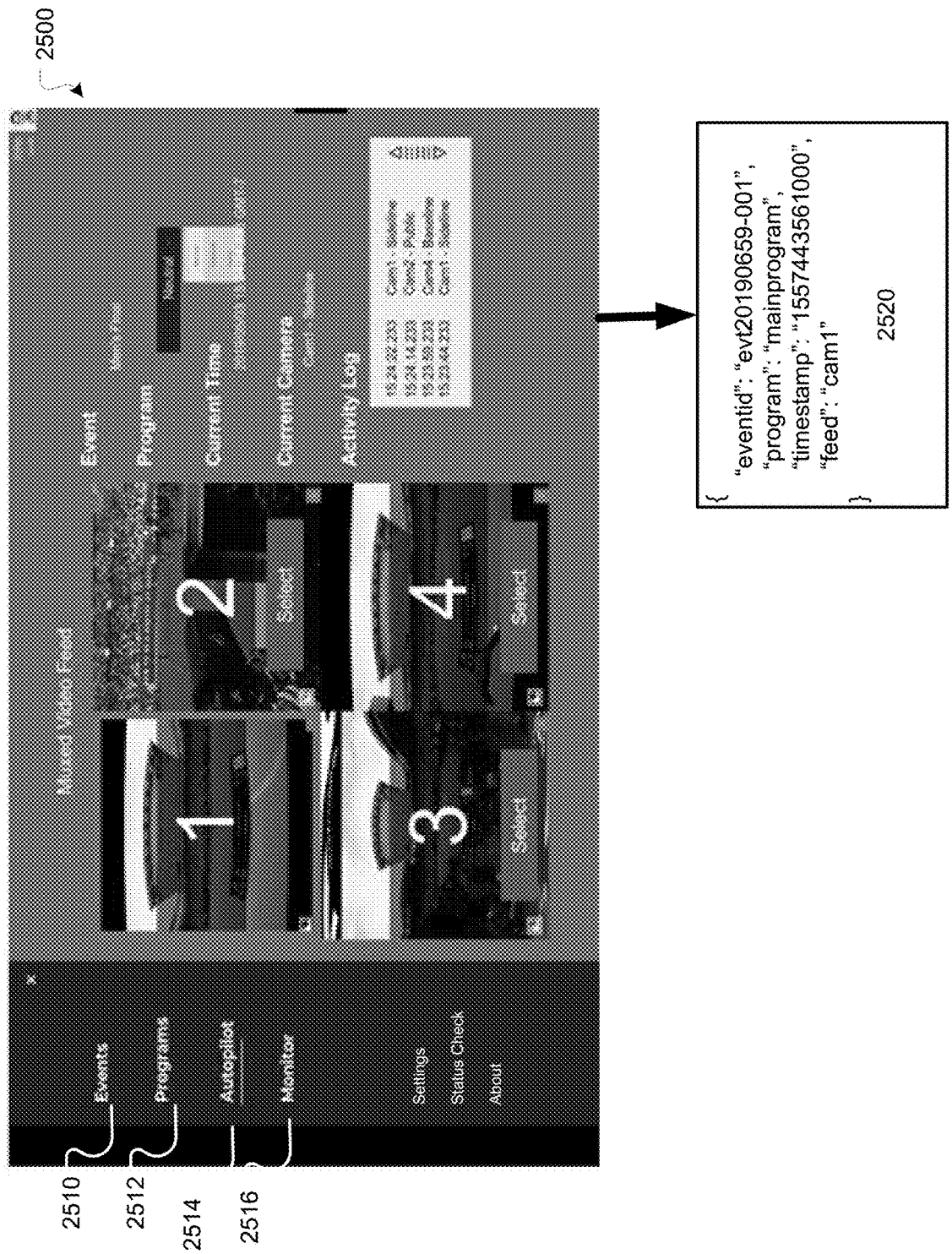
FIG. 25 illustrates an autopilot server user interface with four immersive streams and depictions of the output data feed upon selection of a camera by the user.

FIG. 25 illustrates a user interface 2500 of the autopilot server with exemplar media being consumed, which is added to the system in order to enable this method of consumption on the client device side. The autopilot and generated data elements has a user interface that pushes to the XMS. One or more autopilot controller(s) 316 (FIG. 3) or servers is configurable to enable producers of the event (or content creators) to create one or more autopilot channels. The illustrated interface 2500 has a muxed video feed with four separate videos feeds from four separate cameras.

A user can select events 2510, programs 2512, autopilot 2514, and monitor 2516. Additional commands for settings, status check and information (about) can also be provided. The muxed video feed also has event, program, current time, current camera and an activity log. Generated data elements 2520 for the selected muxed video feed 1 from camera 1, for example. The generated data elements 2520 can include event id, program, main program, time stamp, feed and camera information. From the activity log, camera 1 (muxed video feed 1) is a view from the sideline of a tennis court in a tennis match, camera 2 (muxed video feed 2) is a public view of the tennis match, and camera 4 (muxed video feed 4) is a view from the baseline of a tennis court in the tennis match.

Figure 26:
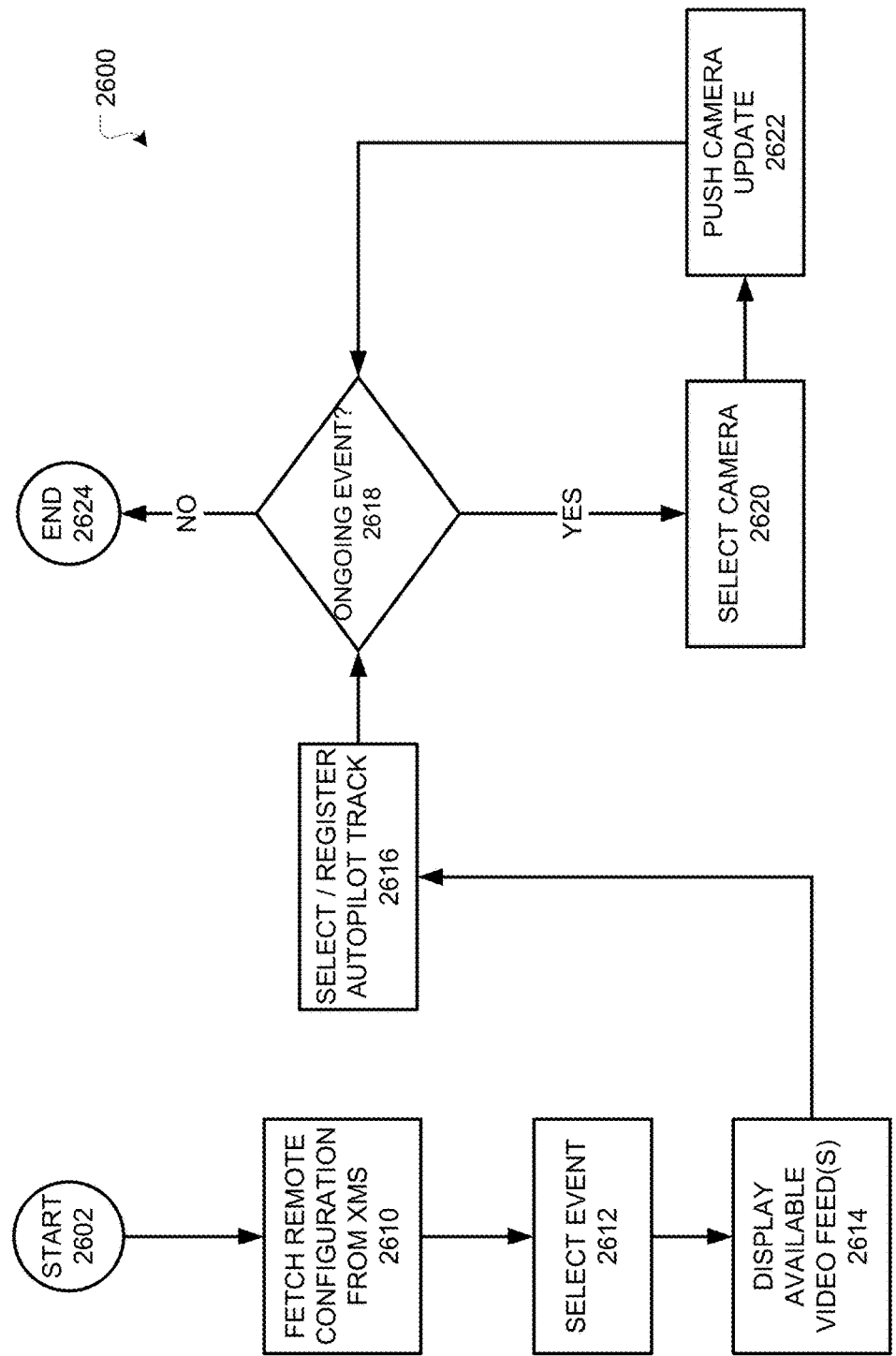
FIG. 26 is an illustration of an autopilot generation process flow.

FIG. 26 shows an autopilot generation process flow 2600. The process can be run by the server when a production user operates the autopilot server in this mode, the server obtains its configuration from the experience management system (XMS) main components 200 and allows the user to select an event 2612. Upon selection, all possible video signals that will be available for users are shown, using the muxing mechanism already in place for the monitor functionality 2614, with a default first camera being selected as per the remote configuration 2616; from this point onwards, the option is given to the producer to establish the active camera at the present moment 2620. The autopilot server stores the camera selection and the timestamps to create data feed, which is sent to a remote processing server for autopilot data processing and distribution 2622.

The process flow in FIG. 26 starts 2602 followed by fetching a remote configuration from the XMS 2610. An event is then selected 2610. Once the event is selected, available video feeds are displayed 2614. Autopilot tracks can be selected and/or registered 2616. After the autopilot selection, the system determines if the event is ongoing 2618. If the event is ongoing (YES), then a camera is selected 2620, and a camera update is pushed 2622. If the event is not ongoing (NO), then the process ends 2624.

Figure 27:
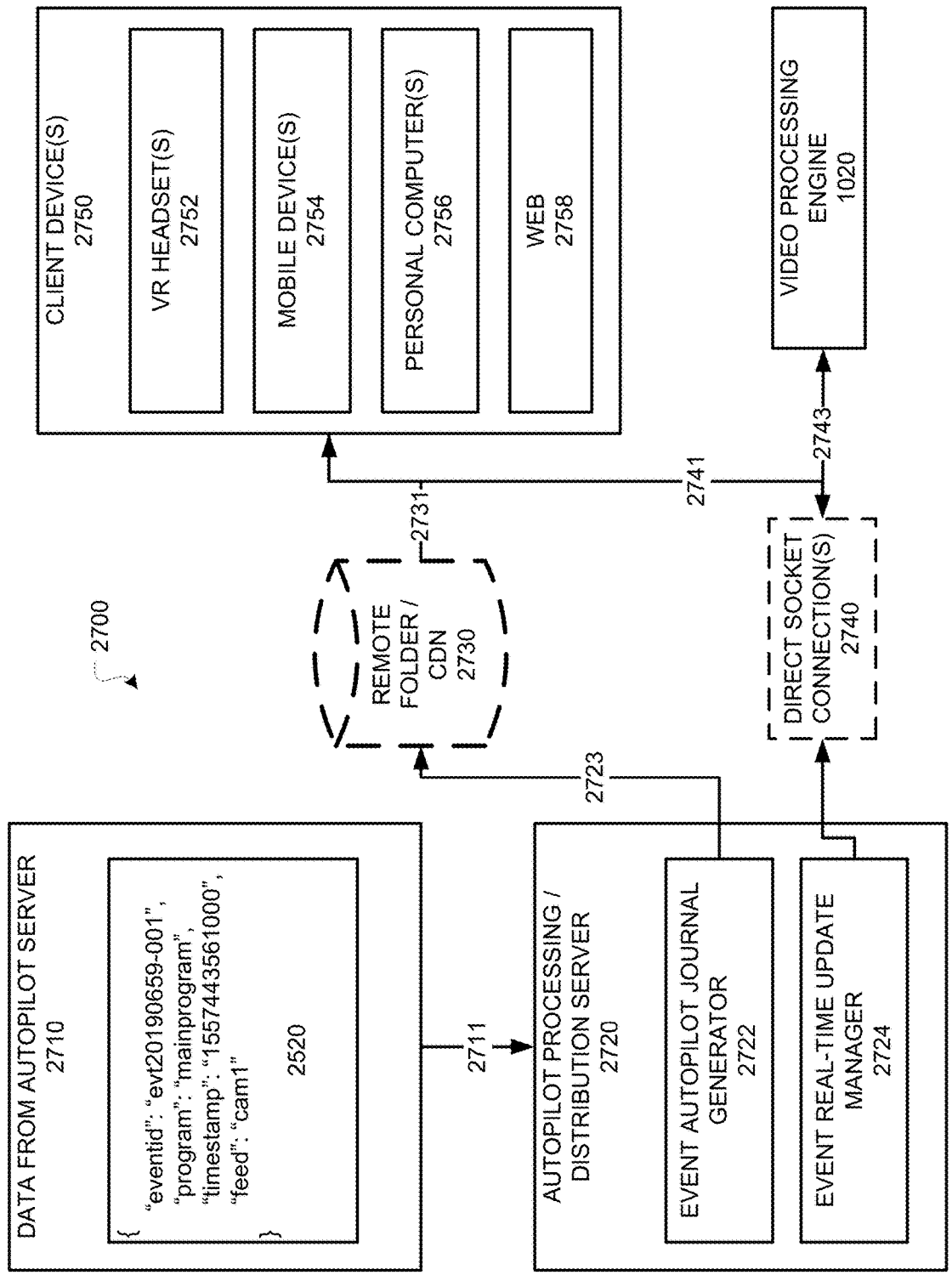
FIG. 27 is an illustration of exemplar main paths for handling the output of autopilot data feeds within an autopilot processing/distribution server.

FIG. 27 shows how the format of the data feed generated by these user actions in the autopilot server can take several forms via an autopilot information feed publishing 2700. Data from autopilot server 2710 has one or more generated data elements 2520. The data from the autopilot server 2710 is provided to autopilot processing/distribution server 2720 via production server-distribution data connection 2711. The autopilot processing/distribution server 2720 has an event autopilot journal generator 2722 in communication with client devices 2750 via a remote folder/CND 2730. The event autopilot journal generator 2722 provides data to remote folder/CDN 2730 via data connection 2723 and the remote folder/CDN 2730 provides data to one or more client devices 2750 via unidirectional data connection 2731.

An event real time update manager 2724 in communication with client devices 2750 and video processing engine 1020 via direct socket connections 2740. Event real-time update manager 2724 is in unidirectional data communication with the direct socket connection(s) 2740 via data connection 2725. The direct socket connection(s) 2740 are in bilateral data communication with the client devices 2750 via data connection 2741 and the video processing engine 1020 via data connection 2743.

The client devices 2750 can be one or more of, for example, VR headsets 2752, mobile devices 2754, personal computers or tablets 2756, and the internet 2758/

In some implementations, it consists of a JavaScript Object Notation ("JSON") formatted data feed 2520, that is sent to a remote autopilot processing and distribution server. This server has two main modes of operation, aiming to achieve at the same time real-time responsiveness and scalability:

The first approach is the generation of an autopilot journal 2722, which consists on compiling the events received into an aggregated data stream containing all past events, called "event journal file" with standard formats (e.g. JSON, XML). This file is updated periodically with each new change logged by the production servers and new version of the journal files are generated, with event and timestamp being the prime identifiers for the files. This set of files is pushed to remote folders and/or standard CDNs to benefit from these systems' caching and large scale footprints. In this way, new clients joining an event can, as a first step, fetch a recent version of the journal from CDNs, which reduces the load the server itself has to manage.

The second approach is the real-time update manager 2724, which consists of dedicated connections using lightweight data transmission protocols (e.g. websocket). Clients, or end users, subscribed to an ongoing lived event can open sockets with the autopilot processing and distribution server, which pushes information about the camera changes, along with the relevant timestamps, to clients for them to process accordingly at consumption time. The information flowing through these channels is guaranteed to be lightweight because of the existence of the journal file method, making it possible to reserve these real-time sockets only for supplementary information.

Figure 28:
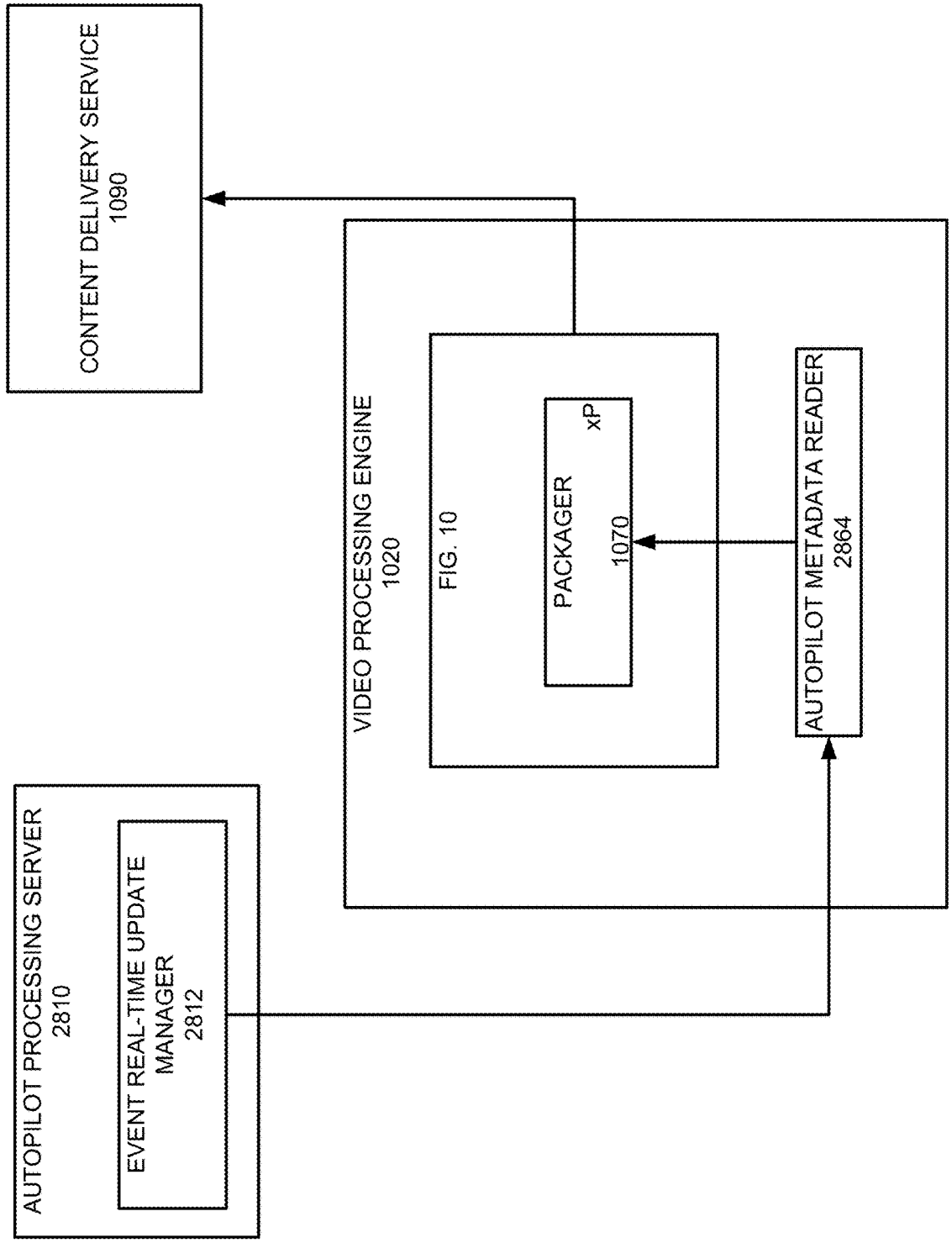
FIG. 28 is an illustration of an addition of an autopilot metadata reader within a processing engine.
Figure 29:
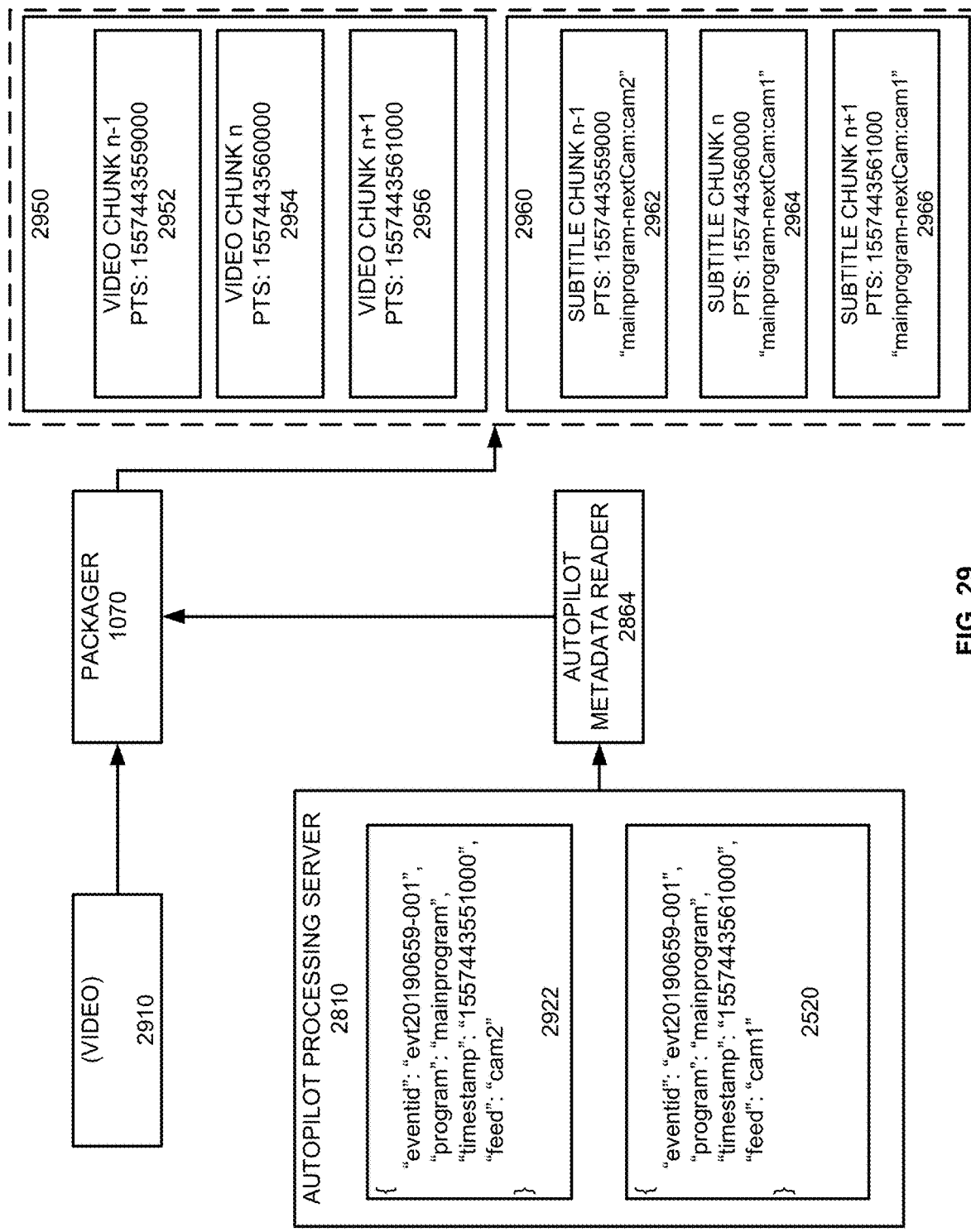
FIG. 29 illustrates treatment of an input autopilot feed to produce a subtitle-like metadata feed pointing to a next camera of the stream.

FIG. 28 and FIG. 29 illustrate that, in some implementations, autopilot information can be embedded as metadata in video alternate tracks (e g taking advantage of the subtitles/closed caption tracks). In such implementations, the direct socket connection 1740 described above can be used to connect to a video processing engine 1020 of FIG. 10.

FIG. 28 illustrates an autopilot embedded metadata approach within a processing engine to handle embedded autopilot metadata. An autopilot processing server 2810 is provided with an event real-time update manager 2812. Video processing engine 1020 from FIG. 10 is provided which receives data from the event real-time update manager 2812 via an autopilot metadata reader 2864. Video processing engine 1020 is further configured to provide an output to content delivery service 1090. An autopilot metadata reader 2864 can be added in order to add a lightweight alternate track of media to be packaged prior to delivering the packaged stream for content delivery network ("CDN"). Additionally, in order to enable the player to know in advance the next camera to be loaded, the information of the camera preferred loaded in the next immediate segment is what is packaged, instead of the preferred camera for the current segment. For example: if for second "n" camera A was selected, the preferred camera in the metadata chunk for second "n-1" will be signaled as being for camera A. This packaging in advance is made possible due to the fact that video segments have to go through the view generation step, making it very likely that they reach the origin folder, and therefore be available for consumption, later than the signaling information.

More than one autopilot server can be active during an experience, in order to allow for multiple programs to be curated.

FIG. 29 illustrates a next camera approach when embedding for handling the output of the autopilot data feeds with autopilot processing/distribution server. Video 2910 provides input to a packager 1070. The packager 1070 can also receive input from the autopilot metadata reader 2864. The autopilot processing server 2810 has a plurality of generated data elements 2922, 2520 for the media. The packager 1070 provides input to one or more of a video chunk 2950 (e.g., video chunk n-1 2952, video chunk n 2954, and video chunk n+1 2956) and subtitle chunk 2960 (e.g., subtitle chunk n-1 2962, subtitle chunk n 2964, and subtitle chunk n+1 2966).

Figure 30A:
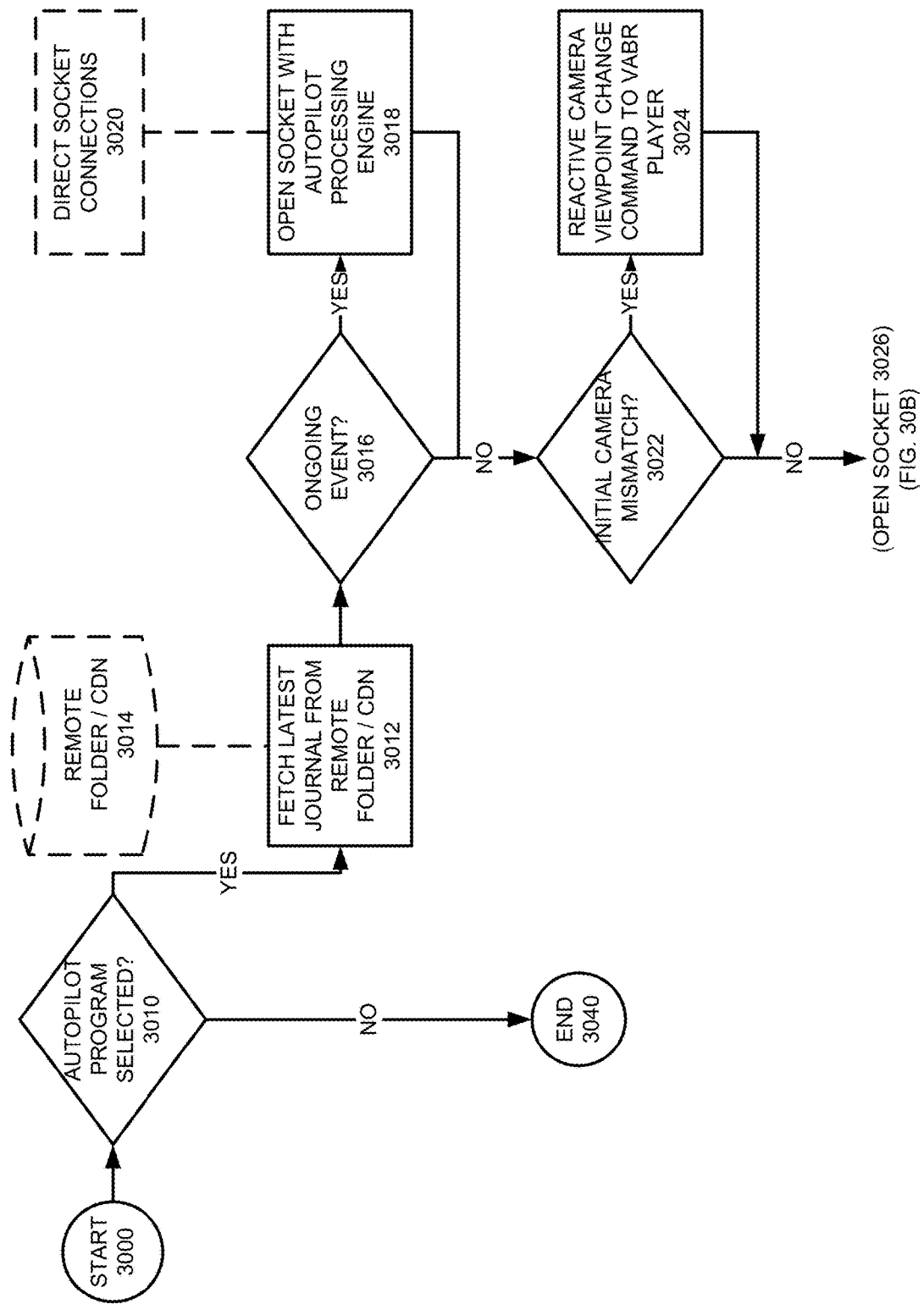
FIGS. 30A-B illustrate an autopilot data feed main client process.
Figure 30B:
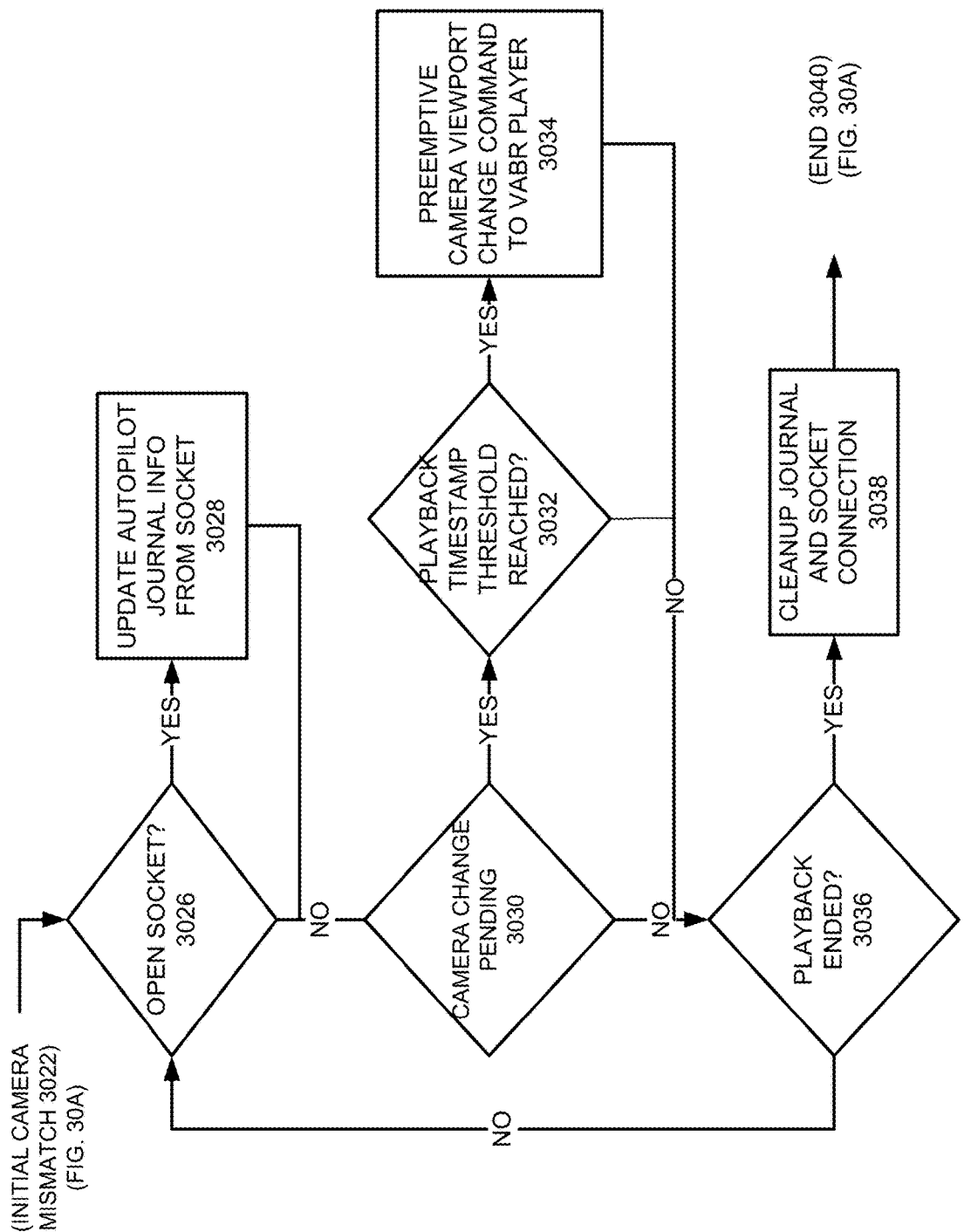

When client applications within an experience and displaying an experience subscribes to one of the autopilot channels, and the means of delivery is not via embedded metadata in the video tracks, the initialization sequence, depicted in FIGS. 30A-B, illustrates: The client application reads the information of the autopilot program selected using the "event journal file" mode of the autopilot distribution server 3012. In the case of ongoing live events, a socket tied to the autopilot server's real-time update manager mode is also opened to make it possible to receive the event's updated information 3018. On-demand content typically will rely only on journal event files and not need open sockets for real-time updates. Upon first parsing the journal file obtained, the client app can determine if, for the current playback timestamp, the locally selected camera matches the one indicated as current camera by the journal and issue a camera change command to the VABR player 3024 if there is a mismatch. This first camera change command works in the exact same way as if a user had issued the command from the user, as described in US 2018/0288363 A1.

Once the initialization occurs, an ongoing update and checking process is run at the client app: If a socket has been opened as part of the initialization 2864, then, as soon as the server sends new information in that socket, the client app will parse the updated information on camera selection and timestamp and update the autopilot event journal file locally 3028. Periodically, the client app checks the timeline of playback and the journal to determine if a camera change is pending. A camera change is determined to be pending if there is in the journal information about a camera selection at a timestamp ahead of the current playback timestamp being presented to the user, and the current playback position is within a pre-configured threshold of this future timestamp (if there is more than one such future events, the client will consider only the one closest to the current playback position). When a pending camera change is determined to exist, a preemptive camera change command is issued to the VABR player 3034. The difference between this camera change command and the one performed at initialization 2864 is that the one at initialization attempts to load and substitute video chunks from the new camera as close as possible to the current playback position, similar to how a camera change issued by the user is done, whereas the change done within the autopilot ongoing mode will only load and substitute at the future timestamp specified in the updated journal. This means that substitutions and segments discarded in this mode should be almost completely eliminated (depending on buffer length configurations). In order to achieve this effect, the logic just described must be part of the VABR player as a new "autopilot monitor" module, which extends the gaze position monitor of US 2018/0288363 A1 to perform this monitorization and preemptive camera changes. This mechanism also helps ensure that clients see the change at the intended timestamps as per the signaling (see FIGS. 31A-B), with the threshold time in advance helping to mitigate the possible differences due to network related issues.

Once the playback is determined to be ended, both journal information and socket connections are cleared 3038.

When client applications within an experience and displaying an experience subscribes to one of the autopilot channels, and the method of delivery is embedded metadata in the video track, the alternate tracks in the video-managed manifest are downloaded. Located within the downloaded track, the information on the preferred camera, according to each declared autopilot program, is provided which makes it unnecessary to open separate network sockets to obtain the autopilot journal at the cost of having to use a subtitle track to carry this information. Thanks to the fact that the signaling of the next camera, instead of the current camera, is provided, it is possible for the gaze/camera position monitor to always know which camera to load next, effectively serving as a substitute form an updated journal file for the autopilot program.

If the experience contains more than one autopilot program, users can switch between them at any point of the experience. Switching between autopilot programs by the user also triggers a new initialization process. Other actions that create a discontinuity in the playback can trigger re-initializations of the autopilot logic (e.g. with a "seek to" command in the user interface ("UI")). A user can also opt out of autopilot programs, In which case the camera selected at the moment of disengaging will be kept and the user will continue to have the ability to perform manual camera changes.

In this implementation, the data feed will typically be ahead of the video presentation time, which implies the client application will have a "local lag" logic since it must wait for the timestamp criteria to be met before applying the changes. This local lag is used in favor of the implementation to allow for the preemptive camera changes to occur and attain the exact timestamps intended by broadcasters when using the autopilot feature. Preemptive camera changes also help achieve efficient network usage but reducing the probability of duplicative segment downloads, as opposed to reactive camera changes where the VABR player may need to download overlapping segments in different cameras in order to speed-up perceived adaptation time.

Special considerations are taken for dynamic assets in the VABR player timeline monitor for autopilot scenarios. Where the expected future camera position is factored in, taking further advantage of the local lag mechanic explain previously. For example, if a camera change from camera A to camera B is expected 1 second into the future, as soon as this information is parsed by the autopilot manager, the timeline monitor considers Camera B to be the active camera for all elements situated from time "t+1second" onwards, instead of continue to consider the asset set for camera A. This allows for a more precise delivery and presentation of the desired times and elements of camera change provided by the autopilot in the client system by reducing the need to act reactively to camera changes. It also allows for more efficient network usage than a fully reactive mode would, as it takes into consideration the times at which assets will not need to be further updated so that download loops for them are not even initiated.

Figure 31A:
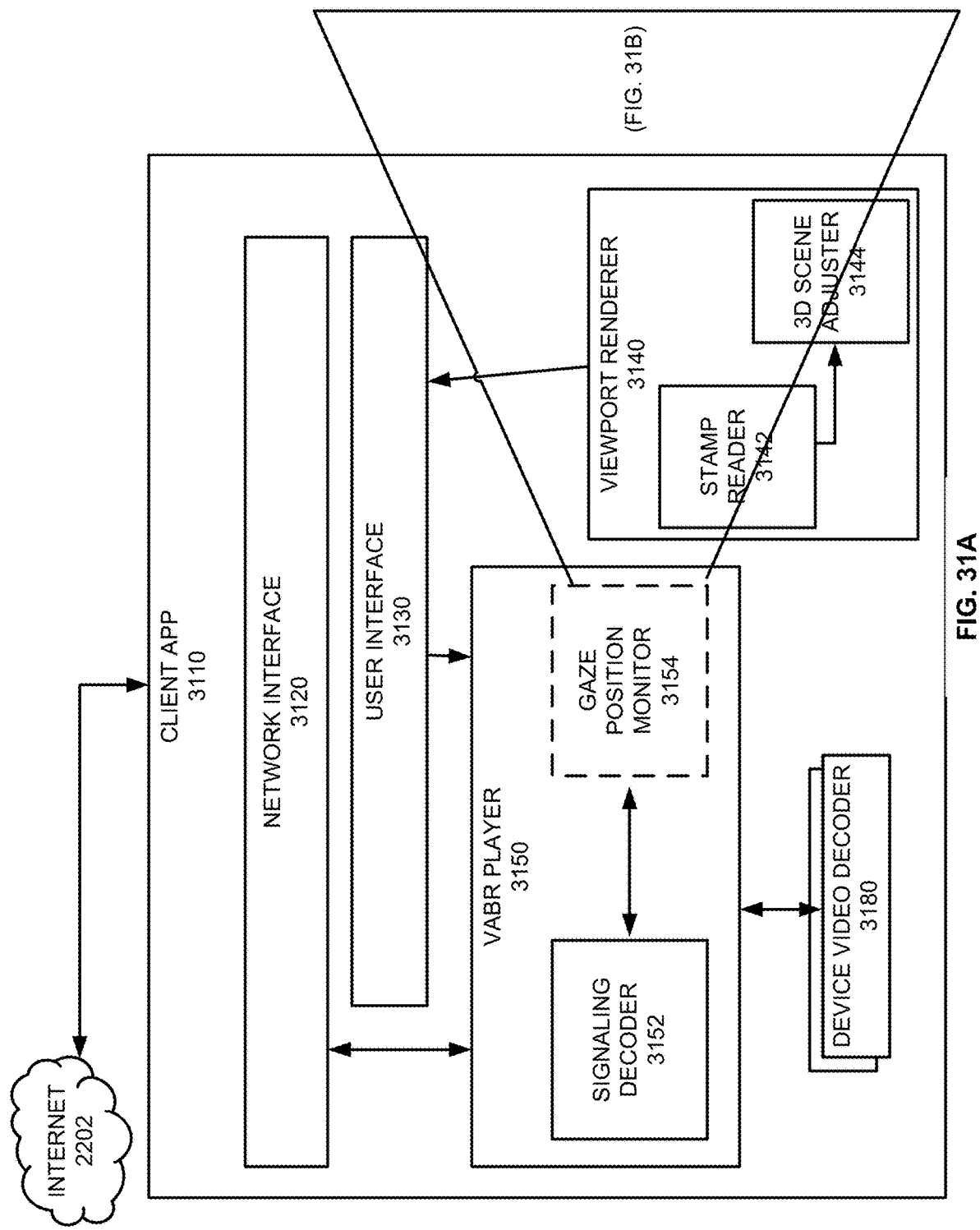
FIGS. 31A-B illustrate addition of an autopilot manager as part of a client stack.
Figure 31B:
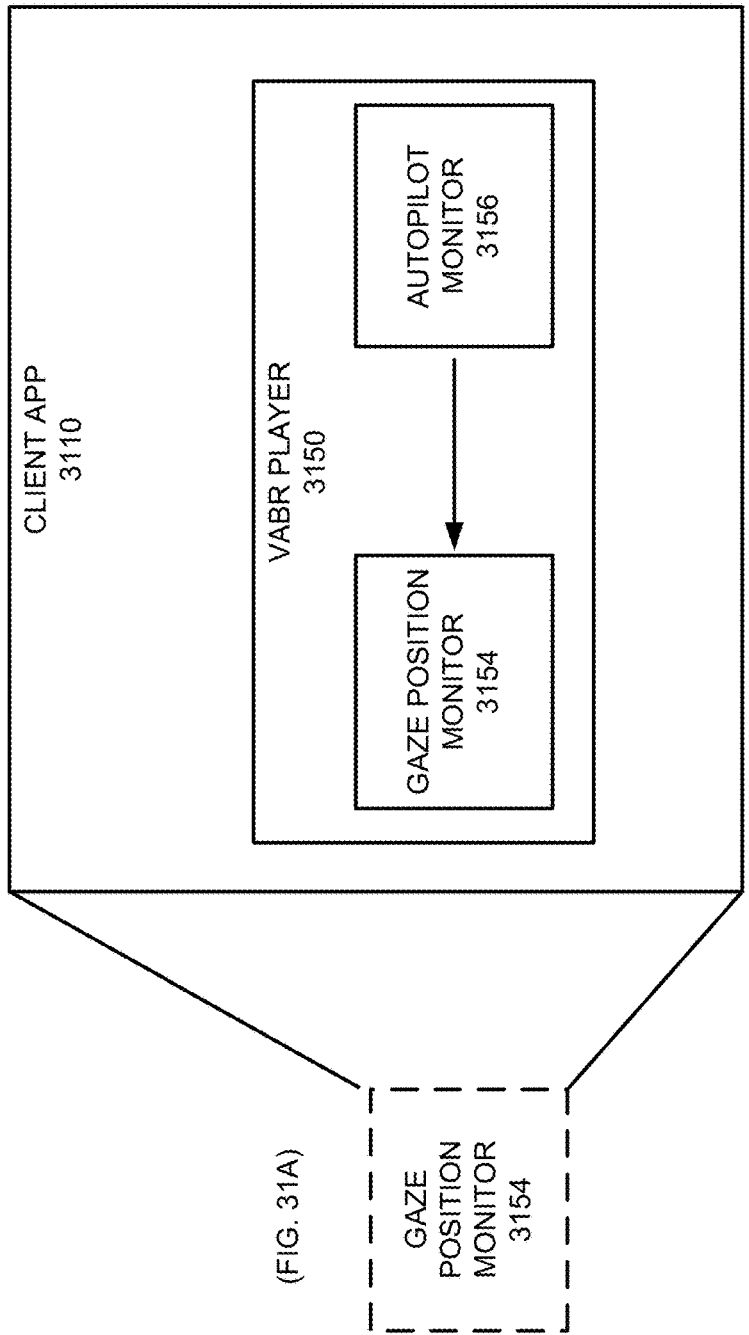

As shown in FIGS. 31A-B, the client app 3110 is in communication with the internet 2202. The client app has a network interface 3120 and a user interface 3130 both of which are in communication with the VABR player 3150. The network interface 3120 sends and receives information from the VABR player 3150, which the user interface 3130 sends information to the VABR player 3150. The VABR player 3150 in turn includes a signaling decoder 3152 and a gaze position monitor 3154 that are in communication with each other. The VABR player 3150 is also two way communication with device video decoder 3180. A viewport renderer 3140 having a stamp reader 3142 in communication with a 3D scene adjuster 3144, also communicated with the user interface 3130. The gaze position monitor 3154 receives data from the autopilot monitor 3156.

More specifically, as shown in FIGS. 30A-B, once the process starts 3000, the system determines if an autopilot program is selected 3010. If an autopilot program is not selected (NO), then the process ends 3040. If an autopilot program is selected (YES), then the latest jor is fetched from remote folder/CDN 3012 accessing remote folder/CDN 3014. Next the system determines if the event is an ongoing event 3016. If the event is ongoing (YES), then the system opens the socket with the autopilot processing engine 3018 using direct socket connections 3020 before proceeding to determine if there is an initial camera mismatch 3022. If the event is not ongoing (NO), then the system proceeds to determine if there is an initial camera mismatch 3022. If there is a mismatch (YES), then a reactive camera viewpoint change command is provided to the VABR player 3024 before determining if there is an open socket 3026. If there is no mismatch (NO), then the system proceeds to determining if there is an open socket 3026. If there is an open socket (YES), then the system updates the autopilot journal information from the socket 3028 before proceeding to determine whether a camera change is pending 3030. If there is no open socket (NO), then the system proceeds to determine whether a camera change is pending 3030. If a camera change is pending (YES), the system determines if a playback time threshold has been reached 3032. If a playback time threshold has been reached (YES), then a preemptive camera viewport change command is sent to VABR player 3034 before proceeding to determine if playback has ended 3036. If a camera change is not pending (NO) or the playback timestamp threshold has not been reached (NO), then it is determined whether playback has ended 3036. If playback has not ended (NO), the system returns to determine whether there is an open socket 3026. If playback has ended (YES), then the system finalizes the socket connection with the client, thus ending the socket session and freeing the network resources before ending 3040 the process. The cleanup journal and socket connection step 3038 ensures that the data session ends with the media session so that no sessions are orphaned and using the server resources inefficiently.

Figure 33:
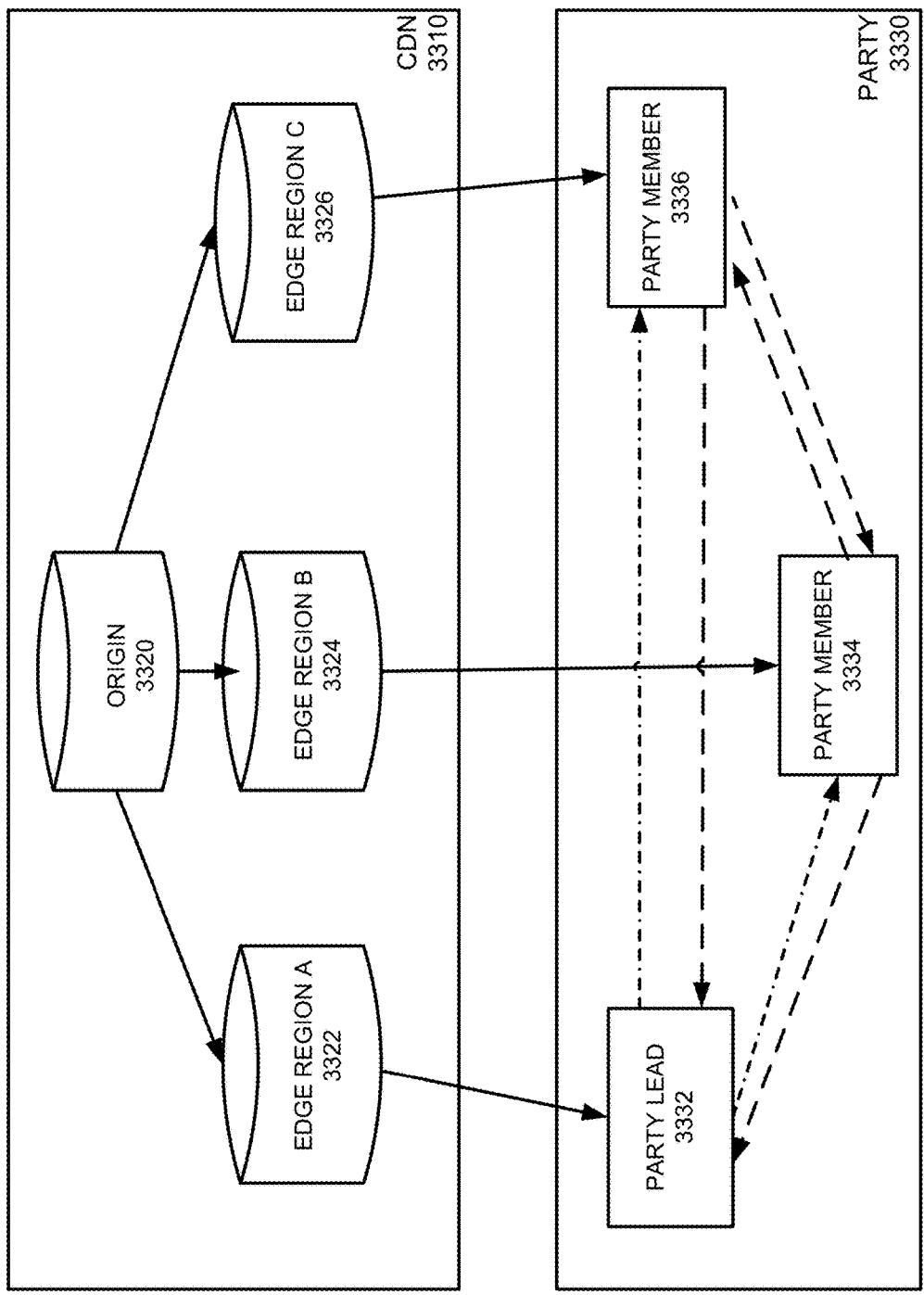
FIG. 33 illustrates an overall network interaction in a shared experience scenario with a plurality of users.

Experiences transformed and consumed by users using the disclosed systems and methods can be experienced individually or as a group (e.g., as a "shared experience"). Standard tools such as Oculus® Avatars, Facebook® or similar frameworks that can be integrated for creating viewing groups with existing groups of friends in these external platforms (see FIG. 33). In the context of this system, a plurality of people viewing (e.g., a group) are called "parties" 3330, and the organizer of the party is designated by the system as the "party lead" 3332 and those joining the party lead 3332 are called party members 3334. The party lead 3332 is also considered a party member 3336, but its lead status is used later in the experience to dictate synchronization. The party 3330 receives the media from the CDN nodes 3310 which includes, for example, an origin 3320, an edge region A 3322, an edge region B 3324, an edge region C 3326.

Figure 32:
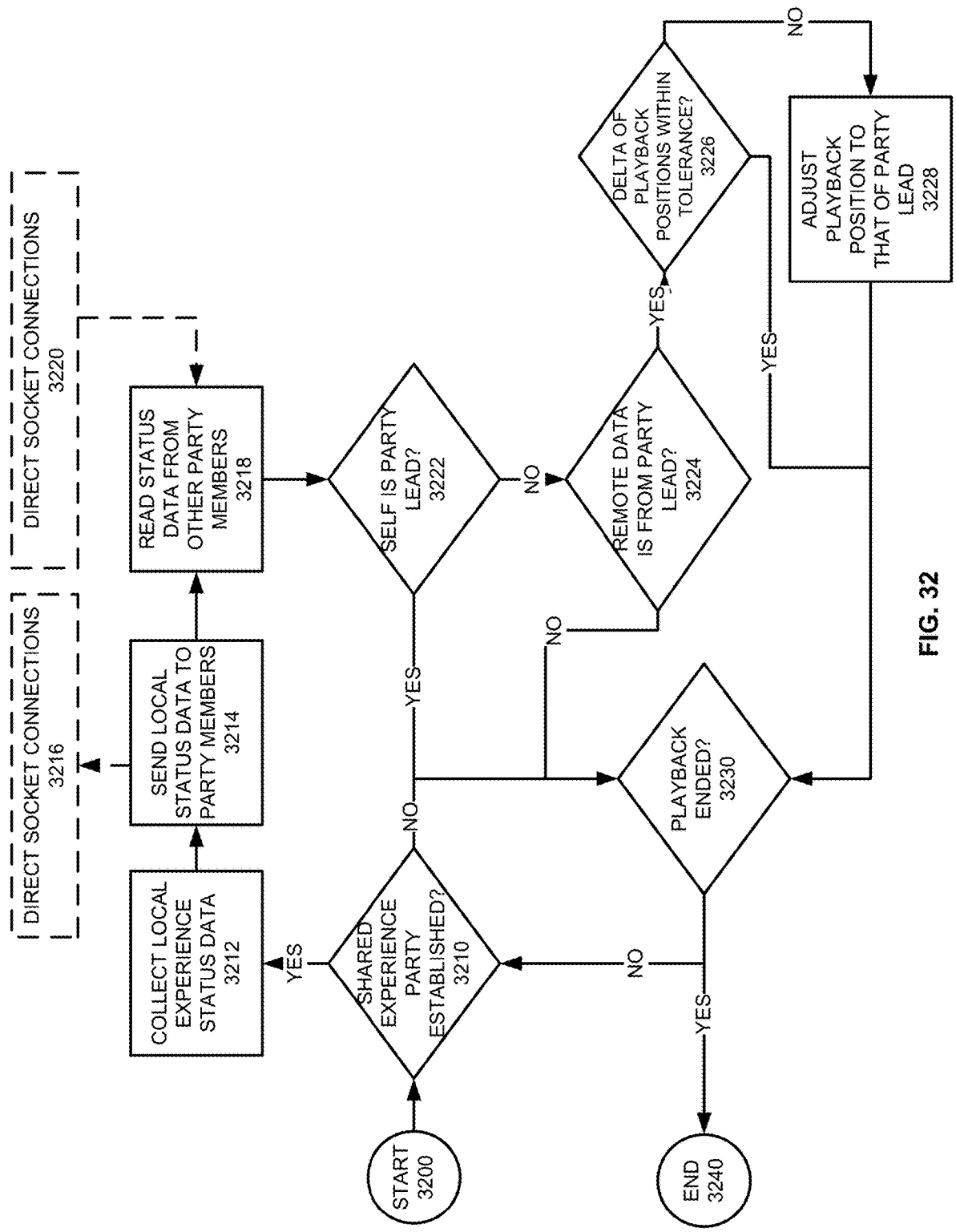
FIG. 32 illustrates a shared experiences sync flow.

Once a party has been established, FIG. 32 shows a flow the method includes to provide the communication mechanism for party members to share the status of their individual experience playback status 3212, most importantly, the content ID of the experience and the playback position within that experience. In some implementations, this occurs on a peer-to-peer basis, instead of using centralized systems, which implies direct socket connections towards each member to send the local status data 3214 and from each part member to read their status data 3218. In some implementations, this communications channel is the extension of channels already defined within the frameworks of the shared experiences platforms it relies upon (e.g. on Oculus avatars, it can be by extending the peer-to-peer user datagram protocol ("UDP") messaging system between each of the members of a party). Party members viewing the same experience as the party lead will take the lead's playback position as reference and align their playbacks to the lead's playback 3228, ensuring that, within that party, all members are at the same playback position.

Because of network fluctuations, both between members and between each member and the CDN nodes serving the content to them, in practical applications it becomes necessary to have tolerance periods, defined as a maximum acceptable deviation between the timestamp of each member of the party with the self-reported timestamp of the party lead that will not be considered to be significant enough for a re-alignment of the playback position to be triggered. Values of about 500 to 750 milliseconds for this tolerance period should be enough in most real world scenarios, and this value is fully configurable in the system The time-alignment mechanism preserves the freedom of each party member to select their camera angles, with camera position being shared among all members so they can be aware of each other's camera choice.

More specifically, the process in FIG. 32 starts 3200 and determines if a shared experience party has been established 3210. If a shared experience party has been established (YES), then local experience status data is collected 3212 and sent to party members 3214 via direct socket connections 3216. Then the status data from other party members is read 3218 via direct socket connections 3220 before determining if the party receiving the data is the party lead 3222. If it is the party lead (YES), then the process proceeds to determine if the playback has ended 3230. If it is not the party lead, then the process proceeds to the step of determining if the remote data is from the party lead 3224. If the remote data is not from the party lead (NO), the process proceeds to determine if the playback has ended 3230. If the remote data is from the party lead (YES), then the process proceeds to determine if a delta (difference) of playback positions is within tolerance 3226. If the delta is within tolerances (YES), then the process proceeds to determine if the playback has ended 3230. If the delta is not within tolerances (NO), the process proceeds to adjust playback position to that of the lead party 3228 before proceeding to the step of determining if playback has ended 3230. If playback has not ended (NO), then the process returns to the step of determining if a shared experience has been established 3210 and loops through the process. If playback has ended (YES), then the process ends 3240.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the claims define the scope of the invention and that methods and structures within the scope of these claims and their equivalents be covered thereby.

What is claimed is:

1. A product comprising one or more tangible computer-readable non-transitory storage media comprising computer-executable instructions operable to, when executed by at least one processor, enable the at least one processor to cause an experience management system to:
   receive one or more media assets over a computing network from one or more media sources;
   mux one or more media assets into media asset outputs for a single monitoring feed which is consumed by one or more autopilot servers to allow generation of one or more autopilot programs;
   prepare autopilot program distribution wherein a first mode of distribution is generating autopilot journals from one or more commands received from each autopilot generator, and a second mode of distribution is embedding autopilot information as an alternative track into the media asset outputs;
   generate autopilot metadata describing available autopilot programs in the experience management system;
   deliver the media asset outputs including any embedded autopilot information to one or more end user devices via an experience management system connected to the experience management system over the computer network;
   read the autopilot information, wherein the step of reading is selected from obtaining autopilot information from embedded metadata in the media asset outputs, and fetching information from an event journal based on the generated autopilot metadata;
   operate an autopilot in an ongoing mode;
   select a camera match based on the autopilot information;
   issue a camera change command wherein the camera change command is optimized based on local lag mechanics to enable a preemptive camera changes;
   load and substituting video chunks from a new camera based on a playback position; and
   load a camera change when the autopilot is in the ongoing mode at a future timestamp in an updated autopilot information.

2. The product of claim 1, further comprising ingest the one or more media asset on a plurality of ingest servers.

3. The product of claim 2, wherein the plurality of ingest servers are peer ingest servers.

4. The product of claim 3, wherein experience is one or more of immersive and non-immersive.

5. The product claim 4, wherein the ingest servers are managed by a node.

6. The product of claim 1, further comprising fetch a remote configuration from the experience management system.

7. The product of claim 6, further comprising determine if the fetched remote configuration is a new configuration.

8. The product of claim 6, further comprising push a remote configuration to one or more LAN nodes.

9. The product claim 1, further comprising scanning for changes in one or more LAN nodes.

10. The product of claim 1, further comprising determine whether new devices are in communication with the experience management system.

11. The product of claim 1, further comprising determine if an ingest trigger has been activated.

12. The product of claim 1 further comprising one or more of request and parse a manifest, decode signaling information on one or more available viewports, decode one or more videos, monitor a gaze position, monitor a camera position, and adjust a video prior to output.

13. The product of claim 1 further comprising a client stack wherein the client stack further comprises a dynamic asset manager configured to monitor consumption of content and a dynamic asset renderer configured to present a dynamic asset to a user.

14. The product of claim 1 further comprising at least one of subscribe and unsubscribe from autopilot programs.

15. The product claim 1, further comprising determine if a given media asset output is approaching a presentation time.

16. The product claim 1, further comprising signal an asset download manager to fetch the media asset.

17. The product of claim 16 wherein the at least one processor causes the experience management system to at least one of subscribe and unsubscribe from autopilot programs.

18. The product of claim 17, wherein the at least one processor causes the experience management system to determine if a given media asset output is approaching a presentation time wherein if the presentation time is approached is determined by at least one of timeline reaching a threshold of proximity with a present time.

* * * * *